US012742890B2

(12) United States Patent
Soualle et al.

(10) Patent No.: US 12,742,890 B2
(45) Date of Patent: Sep. 22, 2026

(54) METHOD FOR ACQUISITION OF A RADIO SIGNAL COMPONENT OF A PLURALITY OF RADIO SIGNAL COMPONENTS, A RELATED RADIO NAVIGATION SYSTEM, A RELATED RADIO TRANSMITTER AND A RELATED RADIO RECEIVER

(71) Applicant: THE EUROPEAN UNION, REPRESENTED BY THE EUROPEAN COMMISSION, Brussels (BE)

(72) Inventors: Francis Soualle, Taufkirchen (DE); Jean-Jacques Floch, Taufkirchen (DE); Till Schmitt, Noordwijk (NL); Giacomo Da Broi, Noordwijk (NL)

(73) Assignee: THE EUROPEAN UNION, REPRESENTED BY THE EUROPEAN COMMISSION, Brussels (BE)

( * ) Notice: Subject to any disclaimer, the term of this patent is extended or adjusted under 35 U.S.C. 154(b) by 191 days.

(21) Appl. No.: 18/843,733

(22) PCT Filed: Mar. 6, 2023

(86) PCT No.: PCT/EP2023/055626

§ 371 (c)(1), (2) Date: Sep. 4, 2024

(87) PCT Pub. No.: WO2023/166227

PCT Pub. Date: Sep. 7, 2023

(65) Prior Publication Data

US 2025/0189679 A1 Jun. 12, 2025

(30) Foreign Application Priority Data

Mar. 4, 2022 (EP) .................................... 22160281

(51) Int. Cl.

*G01S 19/29* (2010.01)
*G01S 19/30* (2010.01)

(52) U.S. Cl.

CPC .............. *G01S 19/29* (2013.01); *G01S 19/30* (2013.01)

(58) Field of Classification Search

CPC ................................ G01S 19/29; G01S 19/30

(Continued)

(56) References Cited

FOREIGN PATENT DOCUMENTS

| | | | | |
|---|---|---|---|---|
| CA | 2613583 A1 * | 1/2007 | .............. | H04J 13/10 |
| CN | 106646546 B * | 5/2019 | ............ | G01S 19/30 |

(Continued)

OTHER PUBLICATIONS

Mouad Addad et al: "Adequate spreading codes to reduce MAI in quasi-synchronous MC-DS-CDMA system", IET Communications, The Institution of Engineering and Technology, GB, vol. 14, No. 12, Jul. 1, 2020.

*Primary Examiner* — Harry K Liu

(74) *Attorney, Agent, or Firm* — FisherBroyles, LLP; Roger L. Browdy; Ronni S. Jillions

(57) ABSTRACT

The present invention relates to a method, related devices and a related system for acquisition of at least one radio signal component of a plurality of radio signal components at a radio receiver, each radio signal component being transmitted by a respective radio transmitter of a plurality of radio transmitters, each radio signal component comprising a data signal carrier, for carrying a data signal component of said radio signal component, said data signal component comprising a spreading code, said spreading code comprising a predetermined number of chips (L), each chip of said spreading code having a duration wherein said predetermined number of chips is such that the criterion calculated as the ratio between the product of the radio receiver (Continued)

front-end bandwidth with the spreading code length and with the chip duration, and the overall number of radio signal components of the radio navigation system, shall not exceed 25.

20 Claims, 36 Drawing Sheets

(58) Field of Classification Search
USPC .................................................... 342/357.68
See application file for complete search history.

(56) References Cited

FOREIGN PATENT DOCUMENTS

| | | | | |
|---|---|---|---|---|
| EP | 3839569 | A1 * | 6/2021 | ......... H04L 27/2278 |
| WO | 2013019986 | A1 | 2/2013 | |
| WO | WO-2019048341 | A1 * | 3/2019 | ............. G01S 19/30 |

* cited by examiner

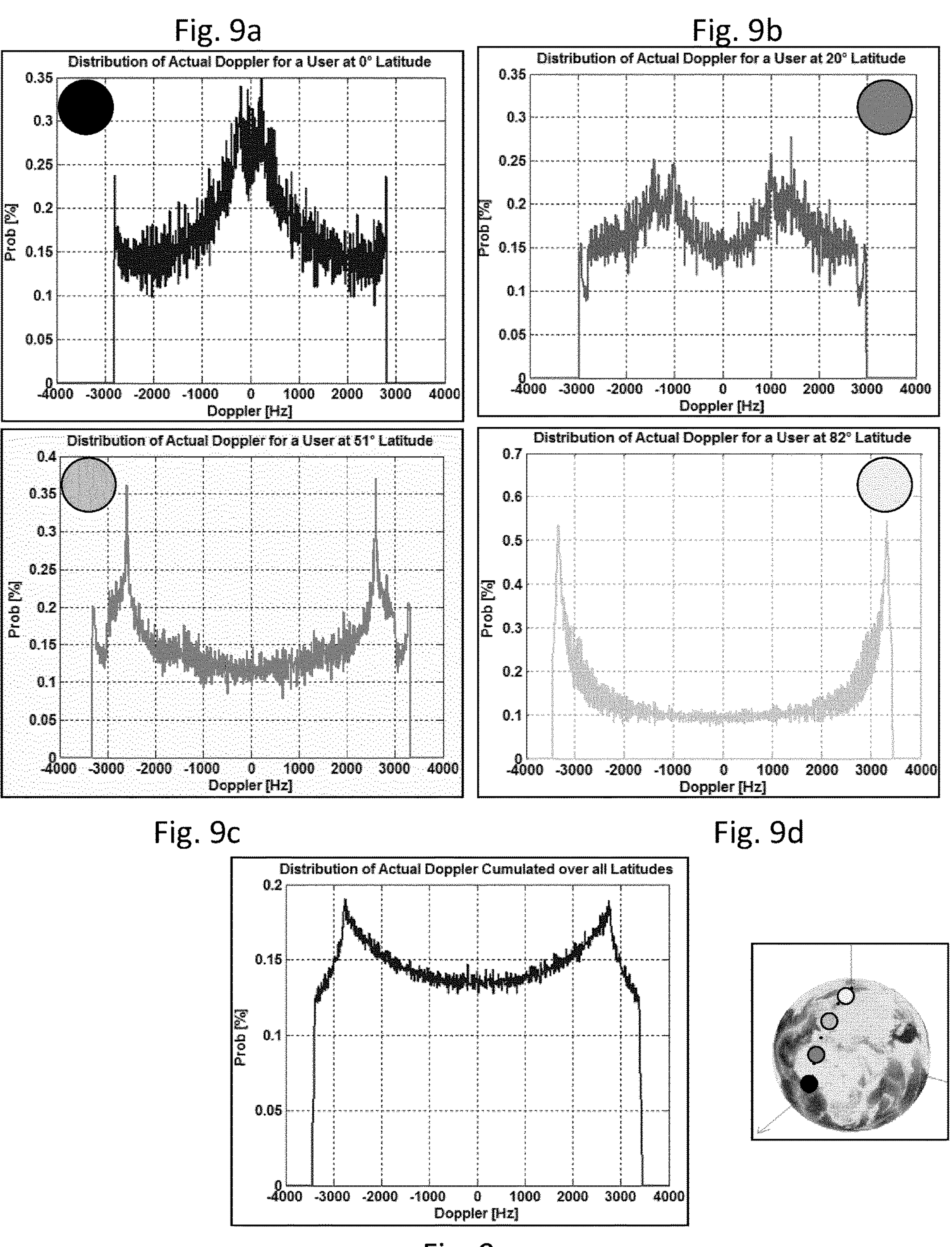
Fig. 9a
Distribution of Actual Doppler for a User at 0° Latitude
Prob [%]
Doppler [Hz]
Fig. 9b
Distribution of Actual Doppler for a User at 20° Latitude
Prob [%]
Doppler [Hz]
Distribution of Actual Doppler for a User at 51° Latitude
Prob [%]
Doppler [Hz]
Distribution of Actual Doppler for a User at 82° Latitude
Prob [%]
Doppler [Hz]
Fig. 9c
Fig. 9d
Distribution of Actual Doppler Cumulated over all Latitudes
Prob [%]
Doppler [Hz]
Fig. 9e

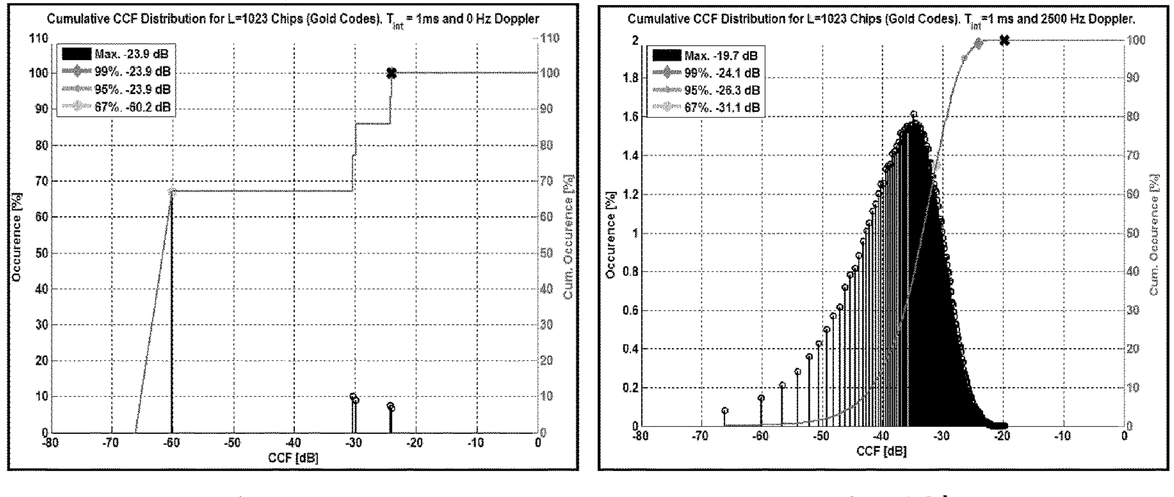
Fig. 13a
Fig. 13b
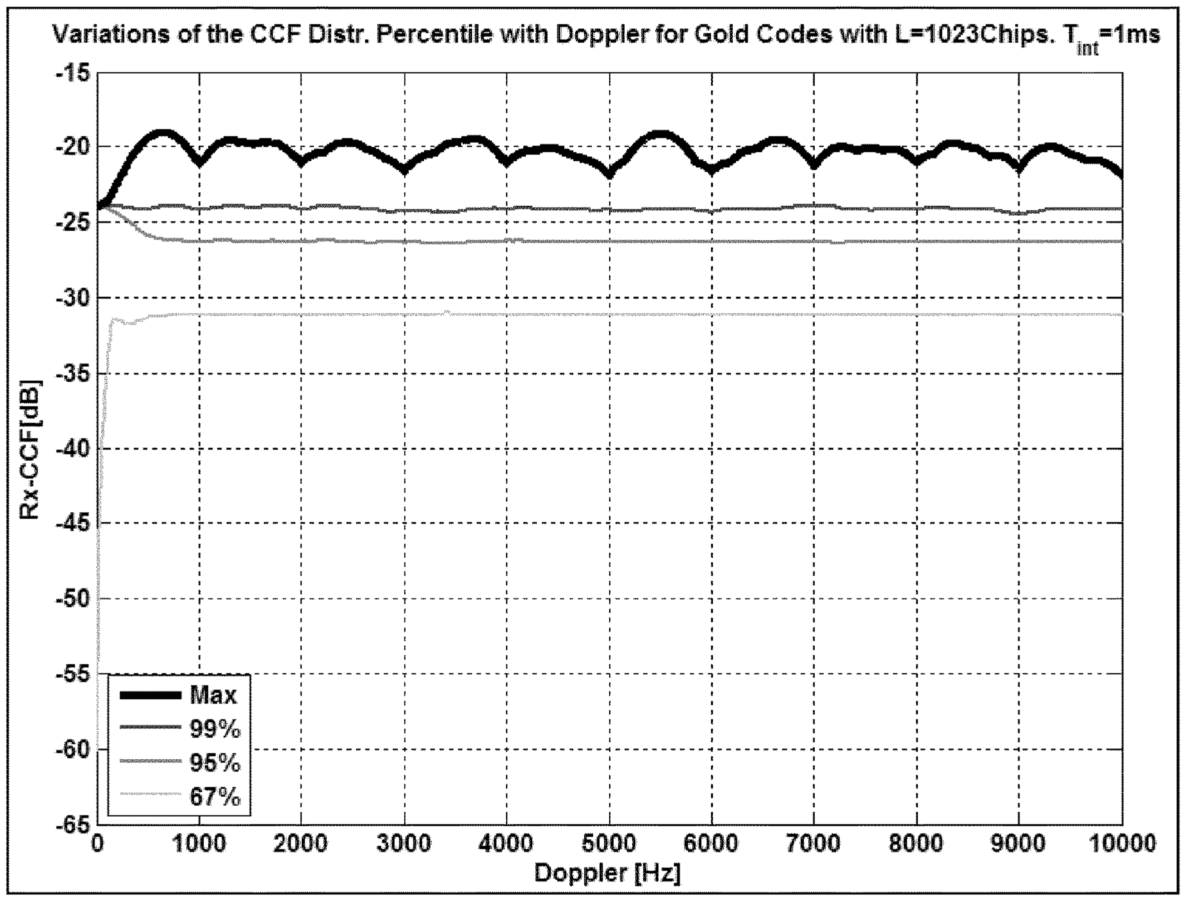
Fig. 13c

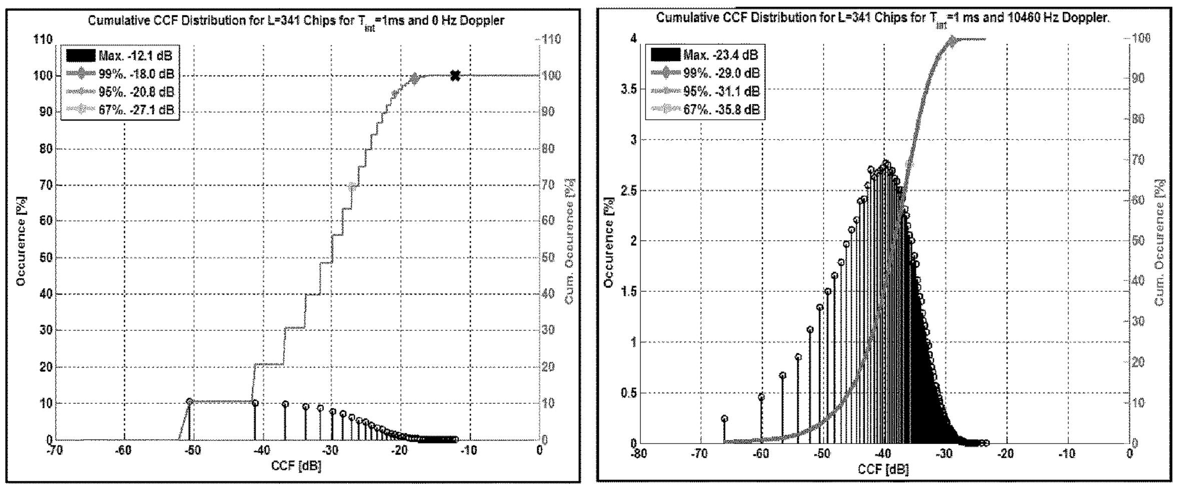
Fig. 14a
Fig. 14b
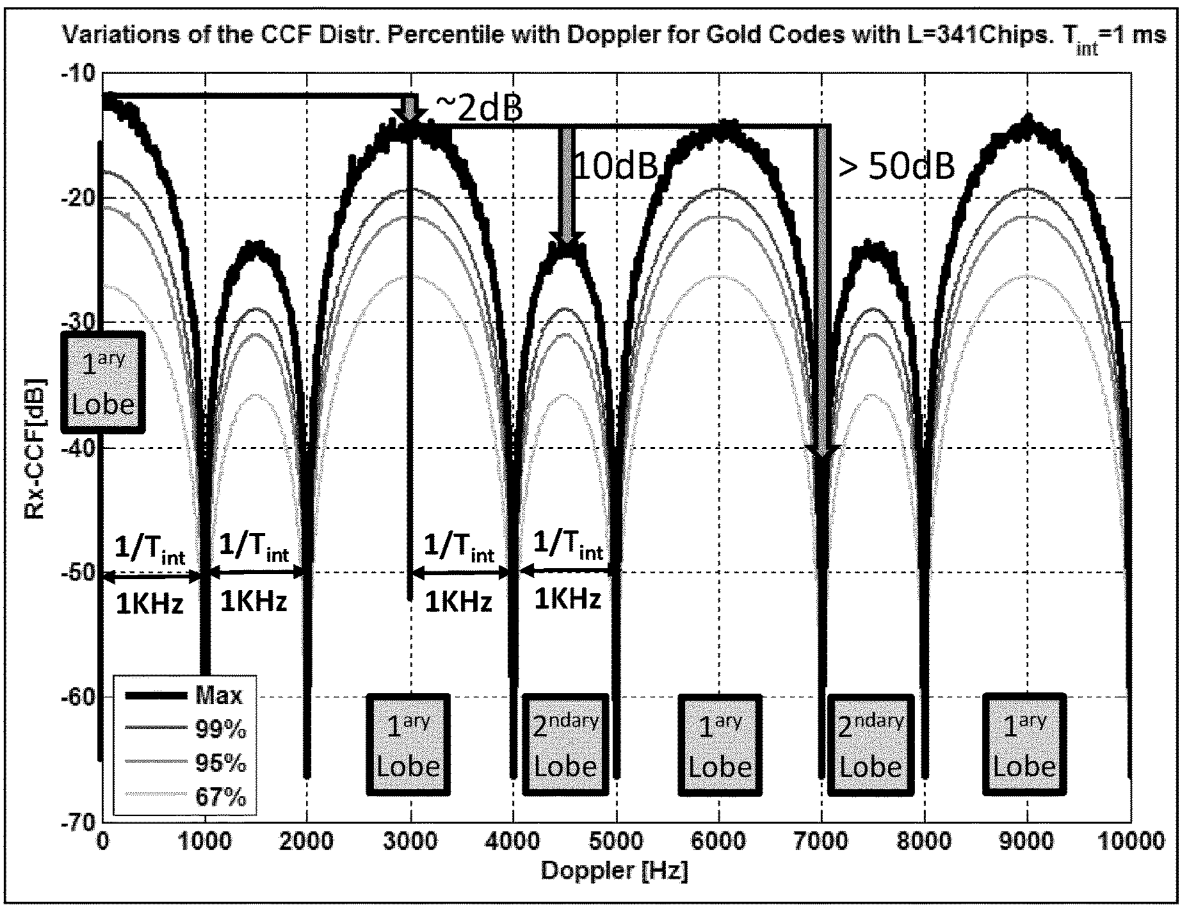
Fig. 14c

Variations of the CCF Distr. Percentile with Doppler for L=31Chips and $T_{int}$=1ms $1/T_{int}$ $1/T_{int}$ ~3dB

~25B $2^{ndary}$ Lobes $1^{ary}$ Lobe $1^{ary}$ Lobe

Max

99%

95%

67%

Rx-CCF[dB]

Doppler [Hz]

x $10^4$

Variations of the CCF Distr. Percentile L=31Chips over $T_{int}$=1.0 ms
Rx-CCF[dB]
Max
99%
95%
67%
Analogue Carrier
Complex Digital Carrier
Real Digital Carrier
Corresponds to 0KHz + Doppler
Doppler [Hz]

Corresponds to 8,25KHz + Doppler

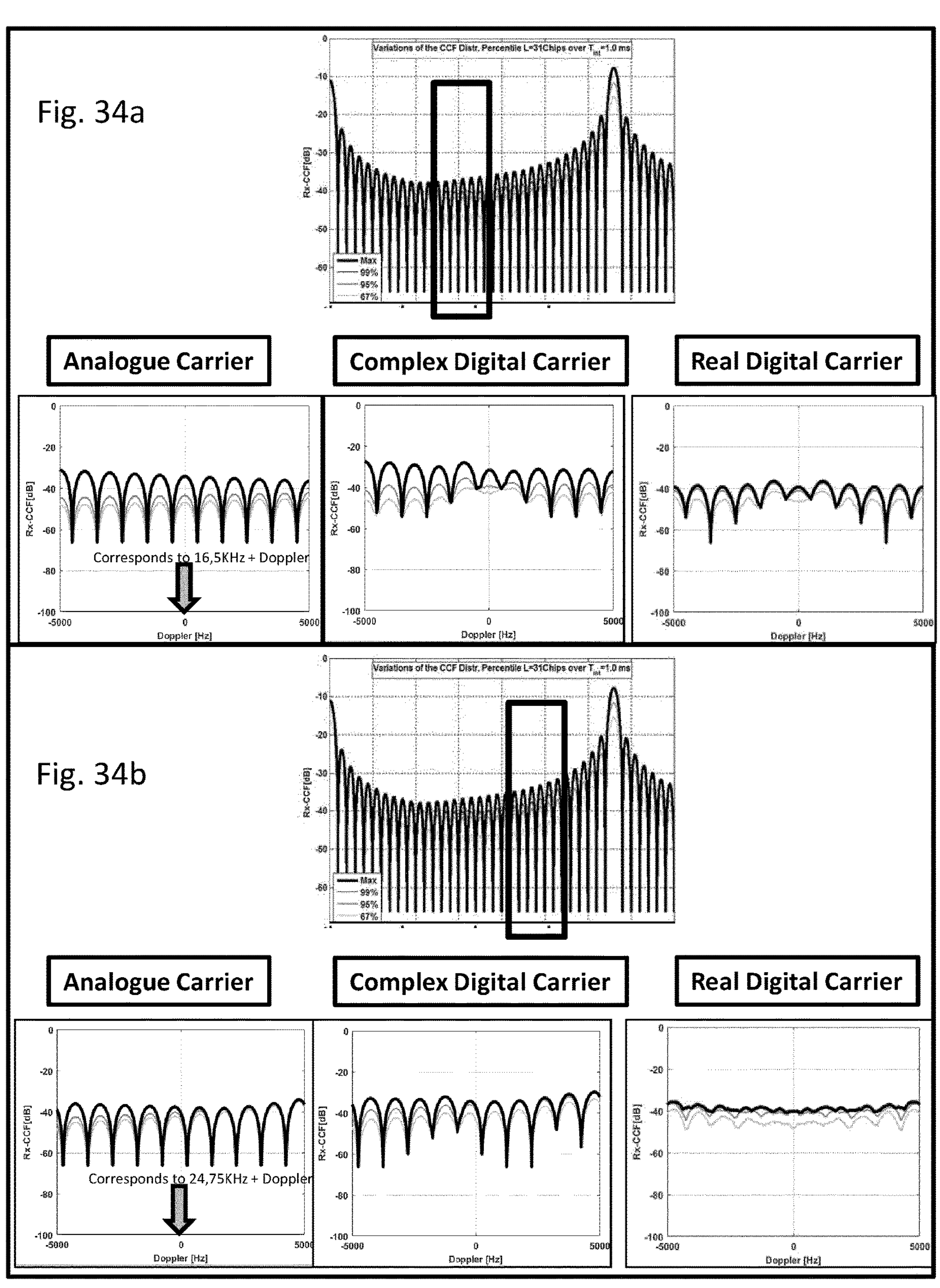
Fig. 34a
Variations of the CCF Distr. Percentile L=31Chips over T_int=1.0 ms
Rx-CCF[dB]
Max
99%
95%
67%
Analogue Carrier
Complex Digital Carrier
Real Digital Carrier
Corresponds to 16,5KHz + Doppler
Doppler [Hz]
Fig. 34b
Variations of the CCF Distr. Percentile L=31Chips over T_int=1.0 ms
Rx-CCF[dB]
Max
99%
95%
67%
Analogue Carrier
Complex Digital Carrier
Real Digital Carrier
Corresponds to 24,75KHz + Doppler
Doppler [Hz]

Variations of the CCF Distr. Percentile L=31Chips over T_int=1.0 ms
Rx-CCF[dB]
Max
99%
95%
67%
Analogue Carrier
Complex Digital Carrier
Real Digital Carrier
Corresponds to 33KHz + Doppler
Doppler [Hz]

METHOD FOR ACQUISITION OF A RADIO SIGNAL COMPONENT OF A PLURALITY OF RADIO SIGNAL COMPONENTS, A RELATED RADIO NAVIGATION SYSTEM, A RELATED RADIO TRANSMITTER AND A RELATED RADIO RECEIVER

TECHNICAL FIELD

Embodiments of the present invention relate to a method for providing a Multiple Access Scheme supporting the acquisition of a radio signal component of a plurality of radio signal components, a related radio navigation system, a related radio transmitter and a related radio receiver of such a radio navigation system.

BACKGROUND ART

The determination of the receiver position supported by Global Navigation Satellite Systems, further referred to as GNSSs, requires the reception and processing of multiple GNSS signals. The current GNSS systems are conceived such that each satellite transmits several GNSS signals which might have the same carrier frequency, such as the GPS C/A and P signals transmitted both at 1575.42 MHz for the GPS system, or the Galileo E1-B and E1-C signals transmitted both at 1575.42 MHz for the Galileo system, or might have different carrier frequencies, but still lying in a same spectral region, such as the GPS L5 signals, or the Galileo E5a-I/E5a-Q/E5b-I/E5a-Q signals, all transmitted at 1191.795 MHz, which is spectrally close to the 1575.42 MHz carrier frequency of the formerly introduced GPS C/A and P signals, and Galileo E1-B and E1-C signals. From now the term radio signal component will be applied to define each of those signals transmitted by the GNSS satellites.

[Ref 1]*: "Understanding GPS Principles and Application*", Kaplan Artech House Publish, ISBN 0-89006-793-7.

Typically at least four GNSS radio signal components transmitted by four different GNSS satellites are required to determine the receiver position (i.e. X, Y and Z coordinates) and time. In the following description F will denote the number of radio signal components transmitted per satellite. Furthermore, in the following description it is considered that V satellites are in visibility to a radio receiver and that each satellite transmits one radio signal component, F=1, for simplification. Therefore $P_v$=V×F=V different radio signal components are received at a radio receiver over an overall number of P=Q×F=Q radio signal components provided by a radio navigation system, such as a GNSS, and comprising Q satellites. For example the nominal number Q of satellites is 24 for the GPS system and 30 for the Galileo system. Furthermore, it is considered that the radio receiver might only process a sub-set of W radio signal components out-of-the V visible ones, transmitted by the $P_v$ satellites ($W \le P_v = V \le P = Q$), for example due to receiver complexity limitation. Therefore, to ensure a position and time estimation of the receiver, W needs to be at least 4. The conventional way, described in more details in [Ref 1], to determine the receiver position and time consists then to estimate the Pseudo-Ranges (PR) between the receiver and each of the at least four different GNSS satellites, based on the processing of each radio signal component transmitted by those satellites. The pseudo-range is defined as the estimated distance between the transmitting source (i.e. GNSS satellite) and the radio receiver. The PR comprises, in addition to the actual distance, the contribution from the receiver clock offset, the contribution from the measurements noise (including interference and other local effects such as multipaths), and the contribution of the correction residuals for the satellite clocks and orbits, or for atmospheric effects such as for Ionospheric delay. In the following description, when one radio signal component is processed to estimate the PR between the receiver and the GNSS satellite transmitting this specific radio signal component, then this specific radio signal component will be defined as radio signal component of interest. The presence and reception of several radio signal components cohabiting in the same spectral region and showing some spectral overlap, unavoidably yields to a degradation of the radio receiver performance. Hence, when processing one radio signal component of interest among the W needed by the receiver, the ($P_v$−1=V−1) other radio signal components transmitted by the $P_v$ visible satellites are called interfering radio signal components. Thus, the term Mutual Access Interference (MAI) is usually employed to describe the effects of interfering radio signal components which are mutually received when processing one radio signal component of interest. When the receiver processes sequentially each of the W radio signal components of interest to estimate the corresponding pseudo-ranges, the role of the radio signal component of interest and of the interfering radio signal components will then permute.

The typical structure of each radio signal component of conventional GNSSs comprises a spreading code also called spreading sequence, or Pseudo-Random Noise (PRN) sequence, composed of L elementary binary symbols, also called chips. Typical spreading codes transmitted in GNSSs are periodic, and the corresponding periodicity, i.e. the number L of chips within the spreading code, is called spreading code length, but can also be called spreading code period when expressed in unit of seconds. Thus typical GNSS signals are built with a chip stream obtained by concatenating "infinitely" the same spreading code. According to the type of radio signal component transmitted by the GNSS satellites, the chip duration, $T_c$, typically varies between approximately one micro-second (i.e. corresponding to a distance of 300 m) and one tenth of micro-second (i.e. corresponding to a distance of 30 m). The chip rate $f_c$ is defined as the inverse of the chip duration $T_c$. Each spreading code can, but does not have to be modulated with symbols. When symbol modulation is applied, the corresponding radio signal component is called radio signal component for data transmission. In absence of symbol modulation, i.e. when the spreading code is not modulated, the corresponding symbol-less or data-less radio signal component is called pilot radio signal component. The symbols can but do not have to be mapped into binary data, by applying a so-called coding technique such as a convolutional coding or a LDPC one (which are the most encountered types of coding technique in GNSS radio signal components for data transmission). Coding techniques are especially suited to improve demodulation performance. The spreading code can itself be composed of a first layer of spreading code, called primary code, or alternatively it can be obtained by combining a primary code layer and a secondary code layer, where each primary code is modulated with a symbol of the secondary code. Finally, the pulse waveform, also called pulse shape, of each chip of the spreading code can take the form of a simple Binary Phase Shift Keying (BPSK) waveform, called BPSK(N), where N is the normalized chip rate. The actual chip rate $f_c$, of a BPSK(N) waveform equals $N \times f_0$, where $f_0$ equals 1.023 MCps Beside the BPSK(N) waveform another important type of waveform applied by GNSS radio signal components, is the Binary Offset Carrier, called BOC(M,N), where N represents again the normalized chip rate and M represents the normalized sub-carrier rate. It is noted that other more complex waveforms, such as the AltBOC waveform applied to the Galileo radio signal components used to modulate and multiplex the four E5aI, E5aQ, E5bI and E5bQ Galileo radio signal components can also be encountered. From now, it is considered that in the frame of the current description, the use of BPSK or BOC waveform modulations is sufficient to provide the necessary background. However, and without loss of generality, this background can then be extended for such other more complex waveforms. The former description provides the main characteristics and constituents of the most encountered radio signal components transmitted by satellite navigation systems.

FIG. 1 represents in the lower part a navigation signal structure of a radio signal component, composed of a periodical binary sequence, or spreading code, comprising L chips, and which is modulated with symbols. FIG. 1 also shows on the upper part the method to generate such a radio signal component. Here each chip applies a BPSK(N) waveform. In the following $f_s$ will designate the symbol rate. The FIG. 1 also represents $N_s$ different symbol epochs. The maximal authorized symbol rate, $f_{s,max}$, is typically driven by the inverse of the spreading code period, also called spreading code duration, with $f_{s,max}=f_c/L$. For example, the duration of the spreading code of the Galileo E1-B radio signal component equals 4 ms and the symbol rate equals 250 sps. However it is also possible to concatenate K different spreading codes within one symbol in which case $f_s=f_c/(K\times L)$. For example, the GPS C/A signal concatenates K=20 spreading codes, called Gold Codes, of 1 ms spreading code period each, within a symbol duration of 20 ms.

The coding process used to generate the symbols from the binary data generated at a data rate $f_d$ is also represented on the FIG. 1. The Coding Rate (CR) represents the ratio between the data rate and the symbol rate (the Coding Rate is for example 1/2 for the typical coding rate applied by the GPS or Galileo radio signal components for data transmission). In absence of coding, one binary data is directly represented by one binary symbol, where the logical levels of [0, 1] are mapped to symbol levels of [+1, −1] following the phase shift keying principle. In absence of symbol modulation, the signal structure at baseband of the pilot radio signal component is just the repetition of the primary codes, concatenated one after the other. As stated formerly, the symbol generator can be substituted by a secondary code generator, based on a predefined sequence corresponding to the secondary code.

The generic signal generation chain applicable for typical GNSS signals, and implemented on-board the radio navigation satellites is represented on FIG. 2 and comprises:

- An on-board Frequency and Time Generation Unit (FTGU), encompassing one or more high stable clocks (typically Atomic clocks) and responsible to provide to the other payload units a very stable timing or frequency source.
- An On-Board Navigation Signal Generation Unit (NSGU), responsible to generate the navigation signals transmitted by the satellite. As already pointed-out, the GNSS satellite usually transmits simultaneously one or more radio signal components, which implies that the NSGU shall be capable to generate those different radio signal components. For example, the satellites of the US Global Position System (GPS) generates and transmits the GPS C/A and P signals, both at a reference carrier frequency of $f_{carr}$=1575.742 MHz. Similarly, the satellites of the European Galileo system generate and transmit the E1-B and E1-C radio signal components also at the same carrier frequency, $f_{carr}$=1575.742 MHz. Therefore NSGU is responsible to generate but also to multiplex those different radio signal components at Base-Band (BB) or at an Intermediate Frequency ($f_{IF,TX}$), and to up-convert them to the RF carrier frequency (e.g. 1575.742 MHz). The up-conversion to the appropriate RF carrier frequency is typically achieved by multiplying the BB or IF signals with a complex exponential $\exp(2\pi j(f_{carr}-f_a)\times t)$ where $f_a$ equals 0 if the radio signal components are initially generated at base-band in the digital domain, and where $f_a$ equals $f_{IF,TX}$ if the radio signal components are initially generated at the intermediate frequency, $f_{IF,TX}$ in the digital domain. Furthermore, the digital-to-analogue interface (comprising a Digital-to-Analogue Converter, DAC) can also take place at different sections of the signal generation chain. Nevertheless, and despite this variability of actual implementations, the aforementioned functionalities are all encountered in a generic Navigation Signal Generation Unit.
- A block responsible to amplify the navigation radio signal component(s) and possibly to filter it to avoid undesired Out-of-Band emissions.
- A navigation antenna responsible to radiate the generated navigation radio signal component(s) towards the earth. It is usual to consider the Apparent Centre of Phase (ACoP) as the geometrical reference point for the navigation signal transmission.

The main functional blocks of a conventional GNSS receiver and the related processing steps are summarized. FIG. 3, taken from [Ref 1] represents a typical architecture for a GNSS receiver.

- The signal received with the GNSS antenna is fed to a pre-amplifier stage, whose aim is to increase the received signal power to a level (voltage) compatible to the following sections of the receiver front-end. The amplifier stage can comprise a single or several amplifiers mounted in cascade, and the first amplifier, called Low Noise Amplifier (LNA) is usually characterized by a small Noise Figure (NF). In some receiver architectures, the LNA can also be embedded within the antenna.
- The signal at RF (for example 1575.42 MHz for the GPS C/A signal) is first down-converted to an Intermediate Frequency, $f_{IF,Rx}$ (which does not have to relate to the Intermediate Frequency, $f_{IF,TX}$, at transmission side). This down-conversion is usually performed in the analogue stage (before the Analogue to Digital Converter, ADC), but could also be performed in the digital stage, if the sampling frequency of the ADC is large enough (following Nyquist condition). To perform the down-conversion the signal at RF is multiplied, or mixed, with a cosine or sinus function at the [RF-IF] frequency (for example 1575.42 MHz-IF). Before and after the actual mixing, the signal bandwidth is limited by filter stages (tuned to the dedicated signal or band) to decrease the effect of interferences, reject images of the mixing process, and avoid aliasing. It is outlined that some radio receiver architectures propose to down-convert the received and amplified signal directly at base-band, rather than at an intermediate frequency. In that case, the term direct down-conversion is applied to describe this type of receiver architectures.

Then the signal, once down-converted at IF is sampled and digitized by an ADC. It is usual to call the part before the ADC, the "Analogue Front-End" and the part following the ADC the "Digital Front-End".

In order to optimize the quantization within the dynamic range of the ADC, an Automatic Gain Control (AGC) monitors the power level of the samples and provides an information to multiply the received signal at RF with a variable gain, for example into the down-converter block as illustrated in the FIG. 3.

Finally the output of the ADC is fed to a blanker whose aim is to set to e.g. 0 the samples which contain large interfering signals on top of the received signals. In the FIG. 3 the proposed blanker is implemented in the Digital front-end, but other receiver implementations also proposed to implement the blanker into the analogue front-end.

The digital samples are then injected to W digital receiver channels, where W represents the number of processed radio signal components judged necessary by the radio receiver manufacturer to estimate the corresponding pseudo-ranges needed to estimate a receiver position fix, and for a specified target position and timing estimation performance (usually the more channels, and the better shall be the position accuracy). A compromise is therefore applied between positioning and timing estimation performance, and receiver complexity (directly depending on the number of W digital receiver channels). Each digital receiver channel aims at processing the IF signals, by wiping-off the remaining carrier frequency, $f_{IF,Rx}$, and at feeding at base-band the different correlator channels, necessary for signal acquisition but also for the code and carrier estimations, and finally for the navigation data demodulation. The wiping-off is typically obtained by multiplying the received signal at IF with a complex exponential exp $(2\pi j f_{IF,Rx} \times t)$. It is noted that this stage of down-conversion is not necessary when the RF signals are directly down-converted to Base-Band.

[Ref 2]: *"On the Detection Probability of Parallel Code Phase Search Algorithm in GPS Receivers?"*. B. C. Geiger. 21*st* *Annual IEEE International Symposium on Personal, Indoor and Mobile Radio Communications.*

[Ref 3]: *"Resource and Performance Comparisons for Different Acquisition Methods that can be Applied to a VHDL-based GPS Receiver in Standalone and Assisted Cases"*. J. Leclère. *IEEE* 2010.

Once having described the general features of GNSS radio signal components but also the generic functional blocks of GNSS satellite transmitter and GNSS receivers, it is possible to present the acquisition process of radio signal components transmitted by GNSS satellites, which represents one of the most important and demanding processing steps for GNSS radio receivers potentially incorporated in a user device. The acquisition of a GNSS radio signal component, also called signal acquisition, is indeed the very first step of the receiver processing chain necessary to estimate the pseudo-range between the transmitter and the radio receiver used for the radio receiver position determination, but also to retrieve the data modulated onto the radio signal components, when applicable.

Signal acquisition aims at estimating, with a coarse accuracy, the distance and Doppler offset between the transmitting GNSS satellite and the radio receiver. As stated before, radio signal components are modulated with spreading codes constituted of (binary) symbols, called Chips. Hence the coarse distance estimation reduces to determine in which chip, or more exactly which fraction of chip, of the whole spreading code the radio receiver belongs to on a "virtual line" starting at the transmitting satellite and ending at the radio receiver, or equivalently to determine the coarse spreading code delay, or shift, that needs to be applied to a un-delayed version of spreading code (called spreading code replica) known at radio receiver to match the actual received radio signal component comprising the delayed spreading code. In the following the term code hypothesis will be also applied to denote the aforementioned spreading code delay to be coarsely estimated. Furthermore, the Doppler offset which also needs to be coarsely estimated, is the consequence of the relative motion between the GNSS satellite and the radio receiver, which yields to a shift or offset of the actual, or observed, received carrier frequency w.r.t. its nominal value (equal for example to 1575.42 MHz in the case of the GPS C/A, or Galileo E1-B or E1-C radio signal components). In the following, the term Doppler will be often used in place of Doppler offset for sake of simplification. When deemed necessary, distinction regarding the use of Doppler or Doppler offset will be made, according to the context.

In the following, it is considered that the actual coarse distance expressed in chips belongs to a code uncertainty region, comprising many candidate code hypotheses which will have to be tested by the radio receiver during the acquisition process. Without a priori information, the code uncertainty region covers the complete period of the spreading code, i.e. the spreading code length. Similarly, it is considered that the correct Doppler belongs to a Doppler uncertainty region, comprising many candidate Doppler hypotheses which will have to be tested by the radio receiver during the acquisition process. Without such a-priori information, acquisition is operated in a "cold start", which represents the most challenging acquisition scenario. Signal acquisition might also use some a-priori information to narrow-down the uncertainty regions for both the spreading code delay and Doppler offset. The corresponding a-priori information in the spreading code delay and Doppler can be deduced from the last position fix, if this one is not too dated, or provided by an external source of information to the receiver/UD, in which case the term aided acquisition is usually meant. Hence during the acquisition process, the candidate code and Doppler hypotheses of the uncertainty regions are tested to determine the closest correct values to the actual spreading code delay and Doppler offset.

The granularity of the code hypotheses, also called code binwidth, is defined as the minimal distance (usually expressed in chips) between two candidate code hypotheses. Similarly, the granularity of the Doppler hypotheses, also called Doppler binwidth, is defined as the minimal distance (expressed in Hz) between two candidate Doppler hypotheses. Both code and Doppler binwidths are specific to the acquisition process and will directly impact the complexity of the acquisition search process, but also the performance. Furthermore, the different tests for the spreading code and Doppler hypotheses can be performed simultaneously (in which case parallel acquisition is meant), or performed sequentially (in which case serial acquisition is meant), depending on the acquisition algorithm and hardware set-up available for this search.

The hardware complexity necessary for the signal acquisition typically depends on the physical memory (i.e. "cells"), the memory usage with the number of charge/discharge cycles per unit of time, and finally the number of operations (multiplications and additions). The two latter contributions will impact the power consumption of the user device hosting the radio receiver and therefore its autonomy with embedded battery, while the first one drives the cost of the chipset.

Hence, if the hardware set-up is not dimensioned to test all code and Doppler hypotheses simultaneously, different clusters of hypotheses will have to be tested successively. This processing slows the acquisition time, defined as the time necessary to estimate coarsely both correct code and Doppler hypotheses, and which represents the most representative figure of merit for the acquisition performance. This highlights a trade-off between the hardware complexity, and acquisition performance.

In order to coarsely estimate the code delay and the Doppler offset of the radio signal component of interest, a set of $N_{Hyp,Code}$ code delay hypotheses and $N_{Hyp,Dopp}$ Doppler offset hypotheses is tested, and wherein $N_{Hyp,Code}$ (resp. $N_{Hyp,Dopp}$) represents the number of code delay (resp. Doppler) hypotheses to be tested over the code (resp. Doppler) uncertainty region.

When no a priori information about the code delay between the satellite and receiver is available (case of a “cold start” acquisition scenario), the code delay uncertainty region usually correspond to one spreading code period (expressed in unit of seconds), and $N_{Hyp,Code}$ is proportional to spreading code length, L (for GNSS radio signal components having periodical spreading codes). The spreading code length equals L=1023 chips for the GPS C/A signals, corresponding to a spreading code period of 1 ms, and equals L=4092 chips for the Galileo E1-B and E1-C signals, corresponding to a spreading code period 4 ms. Similarly, when no a priori information regarding the observed Doppler for the satellite-to-user link, all $N_{Hyp,Dopp}$ Doppler hypotheses have to be scrutinized over a Doppler uncertainty region which can cover up to ±10 KHz (see [Ref 3]). This span mainly accounts for the Doppler dynamic for the satellite-to-user link, ranging from ±3.5 KHz to ±4.5 KHz according to the altitude of MEO satellite orbits, as well as for the satellite and user clock (un)-stabilities, knowing that the user clock stability dominates. In [Ref 3], it is shown that for a medium to low grade receiver clock (±3.5 pp,) the contribution of the receiver clock stability to the (observed) Doppler uncertainty region equals ±5.25 KHz.

When a priori is available, the actual code uncertainty region and Doppler uncertainty region to be scrutinized are usually narrower, which enables to reduce the number of code hypotheses, $N_{Hyp,Code}$, and/or Doppler hypotheses, $N_{Hyp,Dopp}$, for the same sensitivity, or inversely to keep the same number of code or Doppler hypotheses for improved acquisition performance, for example by reducing the spreading code and/or Doppler search granularity (i.e. binwidths).

For each pair of code and Doppler hypotheses, a replica is firstly generated at receiver side by shifting with the code delay to be tested the spreading code corresponding to the satellite transmitting the radio signal component of interest and yielding thus a so-called spreading code replica. Secondly, this spreading code replica is multiplied with a carrier modulated at the tested Doppler hypothesis to generate the replica. Then the received signal is correlated with this replica generated for the code and Doppler hypotheses to be tested, by computing the integral of the product between the received signal and the replica over a so-called coherent integration time, $T_{int}$, yielding to a complex correlation value. Finally, the corresponding complex correlation value is typically modulus-squared to build the acquisition detector (equivalent to a power estimator). One usual detection strategy consists in comparing the detector output to a threshold usually set to a desired Probability of False Alarm (PFA) caused by the unavoidable thermal noise. Other strategies consist in comparing with another threshold also set according to some specified PFA level, the ratio between the largest and second largest detector outputs calculated over the whole uncertainty regions of code and Doppler hypotheses (see [Ref 2]). Such alternative strategies are especially suited for parallel acquisition methods (i.e. when several detector outputs corresponding to several code and Doppler tested hypotheses are available simultaneously). A typical trade-off mostly encountered in the design of acquisition algorithms is to limit the PFA level with an higher detection threshold value, but still satisfying the Probability of Detection (PD) obtained when the code and Doppler hypotheses match closely the actual code and Doppler of the radio signal component of interest contained in the received signal, or equivalently by minimizing the Probability of Mis-Detection (PMD).

In order to improve the acquisition performance, it is possible to add the squared modulus of successive correlation values between the received signal and the replica generated with the same spreading code delay and Doppler offset hypotheses to be tested. This process is defined as non-coherent summation. The number of non-coherent summations is called $N_{NC}$, and the product $N_{NC}\times T_{int}$ is called dwell-time. Squaring losses have to be taken into account, due to non-coherent summations. To avoid such squaring losses, it is possible to increase the coherent correlation time, $T_{int}$, but in that case the Doppler mis-alignment losses originating in the correlation process will increase. The selected configuration of the acquisition scheme (spreading code delay and Doppler binwidths, coherent correlation time, number of non-coherent summations, PFA and PMD rate, . . . ) is set by the receiver manufacturer, in order to match the specified acquisition performances (i.e. acquisition time) of the supported position applications, and also to account for radio receiver or user device hardware complexity and power consumption.

The determination of the number of code and Doppler hypotheses, or equivalently the granularity of the code and Doppler hypotheses, i.e. code and Doppler binwidths, within the respective uncertainty regions is usually dictated by the so-called code and Doppler mis-alignment losses that will affect the detector magnitude. Indeed, the code (resp. Doppler) binwidth equals the code (resp. Doppler) uncertainty region divided by the number of Code (resp. Doppler) hypothesis. The search space granularity answers a trade-off between the complexity (the finer the code and Doppler binwidth, the larger the number of hypotheses to be tested and the higher becomes the computation load) and the code and Doppler mis-alignment losses (the furthest is the code and Doppler hypothesis from the actual one, the largest are the losses). Hence, to limit the code and Doppler mis-alignment losses during the correlation process to a few dBs (1 to 3 dB typically), the typical values for the code hypothesis are $T_c/2$ or $T_c/4$ (applicable for BPSK waveform), and typical values for the Doppler binwidth are 50 to 100 Hz. As an example, for the GPS CA signal, modulated with a BSPK(1) waveform and having a spreading code length of 1023 chips, at least $N_{Hyp,Code}$=2046 code hypotheses can be tested. Note that those values are only given as indicative of the orders of magnitude, and the former quantitative settings will depend on the actual a priori, the radio receiver complexity specifications, but also actual characteristics of radio signal components such as the pulse waveform (i.e. BPSK, BOC).

The FIG. 4 illustrates the acquisition architecture with the functional blocks formerly explained for a conventional radio receiver and based on the digital receiver channel shown in FIG. 3.

The FIG. 5 represents an "ideal" Auto-Correlation Function (ACF) for a unfiltered BPSK(1) pulse waveform, which is used to detect the presence of the radio signal component of interest for the proposed code and Doppler Hypotheses. This ideal ACF is obtained by correlating the received signal "only" containing the radio signal component of interest (i.e. without neither the other interfering radio signal components nor the additive noise) and the spreading code replica corresponding to the satellite transmitting the radio signal component of interest, for different values of the code delay to be tested. Furthermore, and to simplify representation, it is considered that the Doppler hypothesis to be tested exactly matches the actual Doppler in such a way that the ACF is real. In this illustrative example, two hypotheses per chip are tested, yielding to a code binwidth equal to $T_c/2$. The FIG. 5 also highlights the worst case alignment between the actual position of the correlation function and the code hypothesis grid, corresponding to a code delay equals to half the code binwidth, $T_c/4$. Here the Code-Misalignment losses (2.5 dB) are therefore evaluated for code delay of $T_c/4$.

The method to share a same resource such as a spectral region by different radio signal components transmitted by different sources, i.e. GNSS satellites is called Multiple Access schemes. Currently, two major Multiple Access schemes are used to avoid the MAI, between the different radio signal components received simultaneously from the different GNSS satellites.

A first Multiple Access scheme is the Code-Division Multiple Access, further referred to as CDMA, in which GNSS radio signal components transmitted by the Q different GNSS satellites at the same carrier frequency are modulated with a different spreading code per GNSS satellite. Considering again that the radio receiver sees V satellites transmitting each one (F=1) radio signal component, then the number of received radio signal components becomes $P_v$=V. The radio signal component of interest can be then isolated from the other ($P_v$−1) interfering radio signal components by correlating at radio receiver side the received signal comprising the sum of the $P_v$ received radio signal components, of the possible multipath, and of the additive noise, with a replica, whose generation process has been described earlier, in the context of the acquisition phase. To avoid interference between the different received GNSS radio signal components, orthogonal spreading codes are required to ensure satisfactory cross-correlation isolation. The cross-correlation isolation is a measure of the mismatch between the replica corresponding to radio signal component of interest and the received and interfering radio signal component. It is calculated on the basis of the Cross-Correlation Function (CCF) accounting for the spreading code orthogonality but also the pulse waveforms of both aforementioned signal types, and finally the interfering Doppler residual as the difference between the Doppler offset hypothesis and the actual observed Doppler offset of the interfering radio signal component. The cross-correlation isolation is usually expressed in dB applied either to the maximal value of the CCF values calculated over all possible code and Doppler hypotheses, but can also be calculated based on other statistics of the distribution of the CCF values. As stated earlier, typical spreading code lengths are L=1023 chips for the GPS C/A signals, L=4092 chips for the Galileo E1-C signals. If a longer spreading code length, L, is beneficial in term code-cross correlation isolation, it forces however to increase the number of code hypotheses to be tested during the signal acquisition phase since the code uncertainty region is proportional to the spreading code length in a "cold start" acquisition mode. Furthermore, in absence of information regarding the V satellites which are actually visible among the overall Q satellites of the GNSS system, the radio receiver will have to agnostically consider Q different spreading codes to generate later the spreading code replicas. Methods based on some a priori information, for example regarding the very coarse location of the radio receiver on the earth surface enable to reduce below Q, the actual number of different spreading codes needed to feed the different acquisition channels, further referred to as $W_{acq}$. A typical number of acquisition channels (i.e. different spreading codes) is $W_{acq}$ varying between 8 and 12, for a nominal number of 24 GPS satellites, but $W_{acq}$ can also be identical to the overall number of satellites, Q, (e.g. 24) for radio receivers which benefit of more computational resources. It is underlined, that $W_{acq}$ does not have to be equal to the number of W radio signal components of interest that are later processed to estimate the pseudo-ranges, and usually at receiver initialization, $W \leq W_{acq}$. The reason is that the acquisition engine and the module containing the tracking loops for PR estimation are separate in typical receiver architectures. Altogether, the CDMA scheme currently introduces complexity in a GNSS receiver, as more memory is needed for processing the received signal when considering on a one side the different spreading code replicas to be generated for the $W_{acq}$ acquisition channels, and on the other side when considering the number of tested code hypotheses per spreading code replica, and belonging to the code uncertainty region which is proportional to the spreading code length L. When further considering the impact of CDMA schemes onto the receiver complexity, it can also be stated that the required bandwidth of the receiver front-end ensuring minimal performance can be reduced to the main lobe width of the spectral representation of the radio signals component, which corresponds to twice the chip rate ($2 \times N \times f_o$) for a BPSK(N) waveform, e.g. 2.046 MHz for the GPS C/A signal. For a BOC(M,N) modulated (CDMA) signal, this minimal bandwidth increases to ($2 \times (M+N) \times f_o$), e.g. 4.092 MHz for the Galileo (BOC(1,1)) E1-C signals.

The second Multiple Access scheme is the Frequency-Division Multiple Access, further referred to as FDMA, in which the radio signal components transmitted by the different GNSS satellites are transmitted on different carrier frequencies, each carrier frequency depending on each GNSS satellite. The interference between the different GNSS radio signal components is avoided by strictly separating the different transmitted GNSS radio signal components in the frequency domain. In order to reduce the MAI, the separation of the carrier frequency of the transmitted radio signal components is designed such that no overlap between the spectral occupations of signals of the same type exists, such that each FDMA signal occupies a FDMA frequency channel disjoint from the frequency channels of the other FDMA signals of the same type. Because the spectral occupation of each radio signal component transmitted by the GNSS satellite is typically expressed in MHz, it means that the spectral separation between the different radio signal components transmitted by the GNSS satellites is also expressed in MHz. The direct consequence is that to ensure a sufficient low MAI between the Q respective radio signal components a rather large bandwidth, comprising several MHz, is required for the transmission and reception of the different GNSS radio signal components, which moreover introduces complexity in a GNSS radio receiver as the analogue front end needs to support acquisition of radio signals for this large bandwidth. If the FDMA scheme also enables to efficiently reduce MAI thanks to the frequency separation, it is still necessary to modulate the corresponding carrier with spreading codes as for the CDMA case to ensure satisfactory performances for the PR estimation between the transmitting satellites and the receiver. Therefore, chip rates in the order of magnitude of MCps are still necessary for FDMA, which also explains the order of magnitude in MHz for the spectral occupation of the FDMA channels. One example of operational FDMA scheme is the one implemented in the Russian GLONASS GNSS for the transmission of the L1OCd radio signal component type, and applying 20 carrier frequencies spaced by 562.5 KHz between 1609.3125 MHz and 1598.0625 MHz in the "L1 sub-band" and 20 others carrier frequencies spaced by 437.5 KHz between 1251.6875 MHz and 1242.9375 MHz in the "L2 sub-band". Each of the GLONASS L1OCd radio signal components applies a BPSK(0.5) waveform, having thus a chip rate of $f_c$=0.5 MCps, and comprises a spreading code of 511 chips. One major and recognized drawback of the classical FDMA scheme is that it forces the GNSS receiver to implement an analogue receiver bandwidth proportional to the number of FDMA carrier frequencies, or channels. In the GLONASS case, the overall receiver bandwidth can therefore cover between 10 to 20 MHz (depending on the number of W processed signals needed to achieve target positioning performance, but also on the receiver grade). The FIG. 6 represents one example of FDMA spectral allocation for Q=12 radio signal components and thereof 12 different FDMA carrier frequencies, and corresponding channels. On this illustrative example (which is different to the GLONASS signal structure), each FDMA channel corresponding to a different signal component modulated with a BPSK(1) occupies a bandwidth of 4 MHz (comprising the main lobe with 2 MHz bandwidth and the first left and right secondary lobes with 1 MHz bandwidth each).

It is now proposed to present the main effects of MAI onto the acquisition performance. In presence of ($P_v$−1) interfering radio signal components (F=1) the effective correlation function will then be the combination of the Auto-Correlation Function (ACF) previously described on FIG. 5, with ($P_v$−1) so-called Cross-Correlation Functions (CCF), each obtained as the correlation between the replica corresponding to the radio signal component of interest generated for the code and Doppler hypotheses to be tested, and each of the ($P_v$−1) interfering radio signal components having each their respective code delays and observed Doppler offset. The presence of additive CCF values will therefore impact both probabilities of False Alarm and of Mis-Detection. When the code and Doppler hypotheses to be tested do not correspond to the actual ones, the magnitude of the acquisition detector will raise due to the presence of undesired and additional CCF values. A detection threshold derived from the PFA, only assuming thermal noise will then yield to an increase of the effective PFA. Similarly, when the code and Doppler hypotheses to be tested correspond to actual ones, the CCF values might add negatively to the main peak of auto-correlation function, when the phases of the interfering radio signal component(s) are opposite to the phase of the radio signal component of interest. This will reduce the acquisition detector magnitude, and therefore increase the PMD for an acquisition detection threshold set when only accounting for the thermal noise.

The former descriptions therefore highlight that the signal features of the Multiple-Access schemes employed in current GNSSs, yield to a non-optimal solution for the trade-off accounting firstly at the received side for a low computational complexity, small memory resources, a small impact onto the receiver hardware such as its front-end bandwidth, secondly at the transmitter side for a small transmitter bandwidth, and finally at MAI performance side for good cross-correlation performance, i.e. cross-correlation isolation between the replica corresponding to signal component of interest and the interfering signal components.

Summarizing the main advantages and drawbacks between the existing CDMA and FDMA Multiple-Access Schemes applied in the current GNSSs represents a proof for this non-optimum. On a one side the bandwidth of the receiver acquiring a CDMA GPS C/A radio signal component can be as low as 2.046 MHz, but the spreading code length is quite large with 1023 chips. On the other side, the spreading code length of the GLONASS signal components is smaller with 511 chips, but the bandwidth of the receiver processing the FDMA GLONASS L1OCd signals is as large as 12.276 MHz, so much higher than receiver bandwidth used to process the CDMA GPS C/A radio signal components. For MAI reasons, the length of the CDMA code and the frequency offset of the FDMA signals cannot be reduced.

WO2019048341A1, additionally, discloses a method and related device for signal acquisition of a Generalized Binary Offset Carrier, G-BOC, modulated signal comprising K elementary BOC(Mk,Nk)-modulated signals. The method comprises retrieving for each of the K elementary BOC(Mk, Nk)-modulated signals a lower sideband signal and an upper sideband signal by respectively up-converting and down-converting the respective elementary BOC(Mk,Nk)-modulated signal under use of a sub-carrier frequency fsc,k corresponding to the respective elementary BOC(Mk,Nk)-modulated signal and by respectively low-pass filtering the up-converted and down-converted respective elementary BOC(Mk,Nk)-modulated signal. The method comprises respectively correlating a replica modulated with the primitive pulse shape involved in the generation of the BOC(Mk, Nk)-modulated signal such as binary phase shift keying, BPSK, pulse shape with the retrieved lower and upper sideband signals. The replica has a chip rate, for example fc,k=Nk×f0, and a spreading sequence according to the respective elementary BOC(Mk,Nk)-modulated signal. The chip rate can be expressed as chips per second, abbreviated Cps. The spreading sequence can be a binary noise like sequence. The replica is generated on the basis of a code delay hypothesis and a Doppler frequency hypothesis. The method comprises multiplying the respective correlation results by complex or complex conjugate multiplication. The method further comprises generating a first detector output by adding the corresponding K complex or K complex conjugate multiplications and/or generating a second detector output by adding NNC successive detector outputs, each being the sum of the K complex or K complex conjugate multiplications.

DISCLOSURE OF THE INVENTION

An object of embodiments of the present invention is to provide a method for acquisition of at least one radio signal component of interest of a plurality of radio signal components, a related radio navigation system, a related radio transmitter and radio receiver of such a radio navigation system of the above known type but wherein the aforementioned shortcoming or drawbacks of the known solutions are alleviated or overcome.

In particularly, it is an object of embodiments of the present invention to reduce the required bandwidth at both transmitter and receiver sides, and furthermore to reduce the computational complexity and required memory of a radio receiver, but also the required power consumption, but without impacting the Mutual Access Interference in a negative manner.

Indeed this objective is achieved by first applying, by each said radio transmitter, before transmission of each radio signal component, a frequency offset $\Delta f_{carr,p}$, with $1 \le p \le P$, that is relative to a central carrier frequency, $f_{central}$, to said data signal carrier of said radio signal component to obtain a data signal carrier having a data signal carrier frequency $f_{car,p}=f_{central}+\Delta f_{carr,p}$ with a frequency offset $\Delta f_{carr,p}$, $1 \le p \le P$, said frequency offset corresponding to said radio signal component of a plurality of signal components, where said frequency offset value being smaller than the chip rate of the spreading code and hence the distance between spectral spikes, possibly accounting for the symbol modulation, of the spectral representations of the different received radio signal components being small, so that the overall bandwidth required for transmitting the radio signal components per transmitter, but also combined, as said plurality of radio signal components, over all transmitters of the radio navigation system, is small. Each said frequency offset corresponds to a respective radio signal component of a plurality of radio signal components $S_1 \ldots S_P$ where the frequency offset $\Delta f_{carr,p}$, relates to the radio signal component $S_p$.

Additionally, by combining this frequency offset value being smaller than the chip rate of the spreading code, with the use of a data signal component comprising a short spreading code having a predetermined number of chips L of said data signal component where the number of chips L, also called spreading code length, is such that that the criterion calculated as the ratio between the product of the receiver front-end bandwidth B (expressed in Hz) with the spreading code length L and with the chip duration ($T_c$) at the criterion numerator, and the overall number P of radio signal components of the radio navigation system at the criterion denominator shall not exceed 25, and still combining with the constraint that the frequency offset value depends on a specified cross-correlation isolation applied to each of the cross-correlation function values calculated for the interfering Doppler residual values computed as the difference between the tested Doppler hypothesis, also accounting for said receiver oscillator stability $D_{oscil,Rx}$ and the observed Doppler ($D_{TRX1}, \ldots, D_{TRXP}$) for each of the further interfering radio signal components of said plurality of radio signal components, extended with the frequency offset corresponding to said interfering radio signal components, then the occupied bandwidth for each radio signal component of the plurality of radio signal components at transmission can be small and hence the entire required bandwidth for transmitting said plurality of radio signal components is small compared to known systems. Applying the former criterion usually yields on a one side to short spreading code lengths comprising e.g. a few tenths of chips which enables to reduce the number of code hypotheses to be tested, and on the other side to reduce the required receiver front-end bandwidth, and both enable to simplify the receiver hardware complexity but also the power consumption. Having a smaller bandwidth at transmission side is also advantageous because it reduces the hardware and implementation complexity. Having a small spectral occupancy for all transmitters of the radio navigation system also represents an advantage for frequency access and procurement, i.e. cost, in regulatory framework.

Subsequently, a radio receiver $R_x$, for acquisition of at least one radio signal component, i.e. radio signal components of interest, indicating that this at least one radio signal component of interest is selected for basing the estimation of the code delay and the Doppler offset of the received signal, of a plurality of radio signal components $S_1 \ldots S_P$, being transmitted by a respective radio transmitter of a plurality of radio transmitters $T_{X1} \ldots T_{XQ}$, where each radio signal component of said plurality of radio signal components $S_1 \ldots S_P$ comprises a data signal carrier for carrying a data signal component and where said data signal component comprises a spreading code, comprising a predetermined number of chips L, each chip of said spreading code having a duration $T_c$ which duration is equal to the inverse of the chip rate $R_c$. The radio receiver $R_x$ has an oscillator with stability, $D_{oscil,Rx}$ and possesses a velocity $V_{TRX1} \ldots V_{TRXQ}$ relative to each radio transmitter of said plurality of radio transmitters $T_{X1} \ldots T_{XQ}$, and is configured to receive each radio signal component of the plurality of radio signal components $S_1 \ldots S_P$. Each said radio signal component having an observed Doppler $D_{TRX1} \ldots D_{TRXP}$ which depends on said velocity of said radio receiver $R_x$ relative to said corresponding radio transmitter and on said data signal carrier frequency of said data signal carrier corresponding to said respective radio signal component. Based on the received radio signal components of the plurality of radio signal components $S_1 \ldots S_P$, the radio receiver by means of a processing means acquires, said at least one radio signal component of interest of said plurality of radio signal components $S_1 \ldots S_P$, being transmitted by a respective radio transmitter of a plurality of radio transmitters $T_{X1} \ldots T_{XQ}$, said data signal component modulated onto said data carrier of said corresponding radio signal component, by comparing a detection threshold with an acquisition detector, where said acquisition detector is based on at least one cross-correlation value obtained for a tested code and Doppler hypothesis among a set of code and Doppler hypotheses to be tested, where the correlation value is generated by correlating over a coherent integration time, by said radio receiver Rx, a received signal comprising said plurality of the received radio signal components with a local replica of said data signal component comprising a spreading code corresponding to said signal component of interest, where said correlation value comprising a combination of cross-correlation function values corresponding to the interfering signal components and one auto-correlation function value corresponding to the signal component of interest.

The difference between the tested Doppler hypothesis for the at least one radio signal component of interest, and the observed Doppler for each of the further interfering signal components which does not include the radio signal component of interest, $D_{TRX1} \ldots D_{TRXP}$ (without comprising $D_{TRXp}$) and extended with the frequency offset corresponding to said interfering radio signal components, will directly impact the cross-correlation values calculated between the local replica and each of the interfering radio signal components. It is effectively shown that a general trend between the Doppler magnitude and the reduction of cross-correlation value exists, considering also regrowth of the cross-correlation values for some specific intervals of the Doppler difference that also depends on the spreading code length. Therefore by including a frequency offset between the different transmitted radio signal components, frequency offset which can be also interpreted as an artificial Doppler, the overall Doppler span of possible Doppler differences between the tested Doppler for the received radio signal component of interest and each of the interfering radio signal components, extended with the frequency offset corresponding to said interfering radio signal components, will augment which will enable reducing the cross-correlation values, and therefore improve the cross-correlation isolation. In this way an optimum radio signal component acquisition is obtained allowing to estimate, without impacting the receiver complexity and power consumption, with a coarse accuracy the distance and Doppler between the transmitting GNSS satellite and the radio receiver, as consequence of the decrease of required bandwidth, as consequence of the low offset frequency applied to the data signal carrier of each radio signal component in combination with the low predetermined number of chips of the spreading code. Hence, another advantage of a small spectral occupancy for the whole of the transmitted signals is that the bandwidth of the receiver front-end is also small which enables reducing hardware cost and complexity for the analogue section of the receiver. Altogether, the smaller bandwidth with this low predetermined number of chips of the spreading code allows reducing the complexity of a radio receiver impacting the use of power and the required memory.

An embodiment of the present invention relates to a method for acquisition of at least one radio signal component of interest wherein said method comprises the step of correlating said received signal comprising said plurality of the received radio signal components, with a local replica comprising said spreading code and also said frequency offset ($\Delta f_{carr,p}$, $1 \leq p \leq P$) both corresponding to said signal component of interest.

An alternative embodiment of the present invention relates to a method for acquisition of at least one radio signal component of interest wherein said method further comprises the step of wiping-off, by said radio receiver, before said step of correlating, said respective frequency offset corresponding to said signal component of interest ($\Delta f_{carr,p}$, $1 \leq p \leq P$) from the received signal comprising said plurality of the received radio signal components; and correlating said received signal comprising said plurality of the received radio signal components and wherefrom said respective frequency offset ($\Delta f_{carr,p}$, $1 \leq p \leq P$) is wiped-off, with a local replica of said data signal component comprising a spreading code corresponding to said signal component of interest.

A further embodiment of the present invention relates to a method for acquisition of at least one radio signal component is characterized in that said spreading code is modulated with symbols, each symbol having a duration $T_s$, implicating that the coherent integration time used to compute the cross-correlation may be limited by symbol duration $T_s$.

One advantage is to allow the provision of symbols with the radio signal component, symbols used for improving the performance of the radio receiver position and timing estimation, and without degrading significantly the acquisition performance, and still offering the advantages described earlier, and especially the reduced receiver hardware complexity together with the reduced spectral footprint at transmission.

In order to not degrade the cross-correlation properties obtained with the short spreading codes, cross-correlation properties which are also function of the Doppler difference, it is important to ensure that the symbol duration be larger than the coherent integration time used to calculate the cross-correlation function. If this constraint is not fulfilled, the good cross-correlation properties would be destroyed yielding again to unacceptable MAI level.

Still another characterizing embodiment of the present invention is that the radio transmitter by means of said frequency offset applying means further is configured to apply to said data signal carrier of said radio signal component, a frequency offset ($\Delta f_{carr,p}$, $1 \leq p \leq P$), relative to a central carrier frequency, ($f_{central}$) by multiplying with a complex or real offset carrier depending on said frequency offset.

In this way by applying this first alternative to implement the frequency offset, by multiplying with an appropriate analogue complex or real offset carrier depending on said frequency offset, the distance between spectral spikes, possibly accounting for the symbol modulation, of the spectral representations of the different received radio signal components being small, so that the overall bandwidth required for transmitting the radio signal components per transmitter, but also combined, as said plurality of radio signal components, over all transmitters of the radio navigation system, is small.

Another characterizing embodiment of the present invention is that the radio transmitter by means of the frequency offset applying means, to apply to said data signal carrier of said radio signal component, a frequency offset, $\Delta f_{carr,p}$, $1 \leq p \leq P$, relative to a central carrier frequency, $f_{central}$, by multiplying with a quantized complex or real offset carrier depending on said frequency offset.

In this way by applying this further alternative to implement the frequency offset, by multiplying with an appropriate quantized complex or real offset carrier depending on said frequency offset, the distance between spectral spikes, possibly accounting for the symbol modulation, of the spectral representations of the different received radio signal components being small, so that the overall bandwidth required for transmitting the radio signal components per transmitter, but also combined, as said plurality of radio signal components, over all transmitters of the radio navigation system, is small.

Furthermore the quantized version of the real or complex carrier offset can be implemented in a simpler way for satellite navigation generation chains where digital stage applies a high sampling frequency. Reducing the number of quantization levels of the generated signal waveform enables to operate at higher sampling frequency, and for example to apply a direct up-conversion at the final RF carrier with an appropriate Digital-to-Analogue converter. One extreme case for a digital or quantized implementation of the carrier offset consists to use a binary offset carrier, of the form $\text{sign}(\sin(2\pi\Delta f_{carr,p})$ when considering a real binary carrier offset, or of the form $[\text{sign}(\cos(2\pi\Delta f_{carr,p})+j\times\text{sign}(\sin(2\pi\Delta f_{carr,p})]$ when considering a complex binary carrier offset, and where sign(x) is the function providing the sign of argument x.

Another alternative embodiment of the present invention is that the radio transmitter by means of the frequency offset applying means, further is configured to apply to said data signal carrier of said radio signal component, a frequency offset, $\Delta f_{carr,p}$, $1 \leq p \leq P$, relative to a central carrier frequency, $f_{central}$, by modulating a secondary NRZ code of complex or real symbols depending on said frequency offset onto the spreading code.

In this way by applying this further alternative to implement the frequency offset, by modulating a secondary NRZ code of complex or real symbols depending on said frequency offset onto the spreading code, the distance between spectral spikes, possibly accounting for the symbol modulation, of the spectral representations of the different received radio signal components being small, so that the overall bandwidth required for transmitting the radio signal components per transmitter, but also combined, as said plurality of radio signal components, over all transmitters of the radio navigation system, is small.

One advantage of modulating the secondary NRZ codes of complex or real symbols onto the spreading sequence is that the offset is no more perceived as a carrier but rather as a modified spreading code. The consequence is that the corresponding offset can be implemented using similar schemes used to modulate symbols or secondary codes, onto a spreading code which takes the role of primary codes.

Furthermore, a further advantage of this alternative implementation of the frequency offset, originates from the order of magnitude of the frequency offset which is smaller than the chip rate, and which enables to comprise several chips per NRZ code. This corresponds to a differentiator when compared to existing schemes like FDMA where the frequency offset is larger than the chip rate, and wherein several NRZ codes are comprised within each chip.

Another alternative embodiment of the present invention relates to a radio transmitter that by means of the frequency offset applying means, further is configured to apply to said data signal carrier of said radio signal, a frequency offset, $\Delta f_{carr,p}$, $1 \le p \le P$, relative to a central carrier frequency, $f_{central}$, by modulating a longer spreading code obtained as combination of said secondary NRZ code of complex or real symbols depending on said frequency offset modulated on said spreading code.

In this way by applying this further alternative to implement the frequency offset, by modulating a longer spreading code obtained as combination of the NRZ code of complex or real symbols depending on said frequency offset with the spreading code, the distance between spectral spikes, possibly accounting for the symbol modulation, of the spectral representations of the different received radio signal components being small, so that the overall bandwidth required for transmitting the radio signal components per transmitter, but also combined, as said plurality of radio signal components, over all transmitters of the radio navigation system, is small.

One advantage of modulating a longer spreading code as the combination of the original spreading code and the NRZ code of complex or real symbols is that it is possible to save the complete and longer spreading code into a memory on-board the satellite payload, out of which the symbols of the longer spreading code are cyclically read.

Still another alternative embodiment of the present invention relates to a radio receiver that is by means of the processing means is configured to generate said local replica by multiplying said spreading code with a complex or real offset carrier depending on said frequency offset.

In this way by generating the local replica comprising the frequency offset obtained by multiplying said spreading code with a complex or real offset carrier, it is possible to implement in a simpler way the correlation already in the digital domain or stage, as long as the sampling frequency authorized this operation.

Still another alternative embodiment of the present invention relates to a radio receiver that is by means of the processing means is configured to generate said local replica by multiplying said spreading code with a quantized complex or real offset carrier depending on said frequency offset.

In this way by multiplying with a quantized complex or real offset carrier it is possible to reduce the number of quantization levels which simplifies digital implementation. One extreme case for a digital implementation consists to use a binary offset carrier, of the form $\text{sign}(\sin(2\pi\Delta f_{carr,p})$ when considering a real binary carrier offset, or of the form $[\text{sign}(\cos(2\pi\Delta f_{carr,p}) - j \times \text{sign}(\sin(2\pi\Delta f_{carr,p})]$ when considering a complex binary carrier offset, and where sign(x) is the function providing the sign of argument x. Such a two-level carrier waveform is especially suitable to relax digital implementation.

Still another alternative embodiment of the present invention relates to a radio receiver that is that is by means of the processing means is configured to generate said local replica by modulating a secondary NRZ code of complex or real symbols depending on said frequency offset on said spreading code.

In this way by multiplying the received signal with the local replica comprising the frequency offset obtained by modulating a secondary NRZ code of complex or real symbols on said spreading code, it is possible to implement in a simpler way the correlation already in the digital stage, as long as the sampling frequency authorized this operation.

Still another alternative embodiment of the present invention relates to a radio receiver that is by means of the processing means is configured to generate said local replica by generating a longer spreading code obtained by combining a secondary NRZ code of complex or real symbols depending on said frequency offset with said spreading code.

In this way by multiplying the received signal with the local replica comprising the frequency offset obtained by generating a longer spreading code combining the said secondary NRZ code of complex or real symbols with the said spreading code, it is possible to implement in a simpler way the correlation already in the digital stage, as long as the sampling frequency authorized this operation. One advantage of modulating a longer spreading code as the combination of the original spreading code and the NRZ code of complex or real symbols is that it is possible to save the complete and longer spreading code into a memory at the radio receiver, out of which the symbols of the longer spreading code are cyclically read.

Still another alternative embodiment of the present invention relates to a radio receiver that is by means of the processing means (22) is configured to wipe-off said frequency offset from said received signal by multiplying said received signal with a complex or real offset carrier depending on said frequency offset.

In this way by multiplying the said received signal with a complex or real offset carrier to wipe-off the said frequency offset, it is possible to implement standard techniques applied for FDMA schemes, in order to correlate the output signal obtained from the aforementioned multiplication with a spreading code replica comprising only the spreading code. Still the proposed alternative embodiment authorizes applying a frequency offset which is smaller than the chip rate and which enables to reduce the receiver bandwidth.

Still another alternative embodiment of the present invention relates to a radio receiver that is by means of the processing means (22) configured to wipe-off said frequency offset from said received signal by multiplying said received signal with a quantized complex or real offset carrier depending on said frequency offset.

In this way by multiplying the radio signal by multiplying said data signal acquired with a quantized complex or real offset carrier enables to simplify the implementation at receiver side, and especially by applying the frequency wipe-off in the digital stage, for those receivers where sampling frequency is sufficient.

BRIEF DESCRIPTION OF THE DRAWINGS

The invention will be further elucidated by means of the following description and the appended figures.

FIG. 9*a*, FIG. 9*b*, FIG. 9*c* and FIG. 9*d* and FIG. 9*e* represent the distribution of the observed Doppler offset due to the relative satellite-to-user motion for a GNSS radio navigation satellite, such as a Galileo one, and for different latitudes of the terrestrial user at 0° for FIG. 9*a*, 20° for FIG. 9*b*, 51° for FIG. 9*c* and 82° for FIG. 9*d*.

FIG. 11*a* and FIG. 11*b* represent respectively Auto and Cross-Correlation functions when applying a 0 Hz Doppler residual between the received radio signal component and the replica. FIG. 11*a* and FIG. 11*b* represent respectively Auto and Cross-Correlation functions when applying a 3500 Hz Doppler residual between the received radio signal component and the replica.

FIG. 12*a* and FIG. 12*b* represent the percentiles of the ACF values, while FIG. 12*c* and FIG. 12*d* represent the percentiles of the CCF values.

FIG. 13*a*, FIG. 13*b* and FIG. 13*c* represent respectively the CCF distribution, cumulative CCF distribution together with the corresponding percentiles when the CCF is calculated for an interfering Doppler residual $\Delta f_{Dopp,test,p}$ equal to 0 Hz and obtained for a family of Q=24 spreading codes similar to the Gold codes applied by the GPS C/A signals, (FIG. 13*a*), the CCF distribution, cumulative CCF distribution together with the corresponding percentiles when the CCF is calculated for an interfering Doppler residual $\Delta f_{Dopp,test,p}$ equal to 2500 Hz for the same code family (FIG. 13*b*), and finally the variations of the corresponding maxima, the 99%, 95% and 67% percentiles are provided over a Doppler span, ranging from 0 Hz to 10 KHz (FIG. 13*c*).

FIG. 14*a*, FIG. 14*b* and FIG. 14*c* represent respectively the CCF distribution, cumulative CCF distribution together with the corresponding percentiles when the CCF is calculated for an interfering Doppler residual $\Delta f_{Dopp,test,p}$ equal to 0 Hz and obtained for a family of Q=24 spreading codes with a shorter spreading code length L=341 chips (FIG. 14*a*), the CCF distribution, cumulative CCF distribution together with the corresponding percentiles when the CCF is calculated for an interfering Doppler residual $\Delta f_{Dopp,test,p}$ equal to 10460 Hz for the same code family (FIG. 14*b*), and finally the variations of the corresponding maxima, the 99%, 95% and 67% percentiles are provided over a Doppler span, ranging from 0 Hz to 10 KHz (FIG. 14*c*).

FIG. 26*a* represents the two chip streams corresponding to the radio signal components and constructed as the concatenation of the respective elementary spreading codes over a time duration corresponding to the coherent integration time. FIG. 26*b* represents the Doppler dependent percentiles of the distribution of the CCF calculated between Q=24 concatenated elementary spreading codes (randomly generated) having length of 31 and 33 chips. FIG. 26*c* represents the Doppler dependent percentiles of the distribution of the CCF calculated between Q=24 spreading codes (also generated randomly, i.e. not Gold Codes) and having a length of 1023 chips.

FIG. 30 can also support the understanding for the implementation of the frequency offset of 33 KHz, when considering the modulation of a secondary NRZ code onto the spreading code.

FIG. 34*a* and FIG. 34*b* represent the Doppler variations of the percentiles for the distribution of the CCF when applying three different implementation options of a frequency offset of 16.5 KHz (CCF FIG. 34*a*) or of 24.75 KHz (CCF FIG. 34*b*).

MODES FOR CARRYING OUT THE INVENTION

Figure 1:
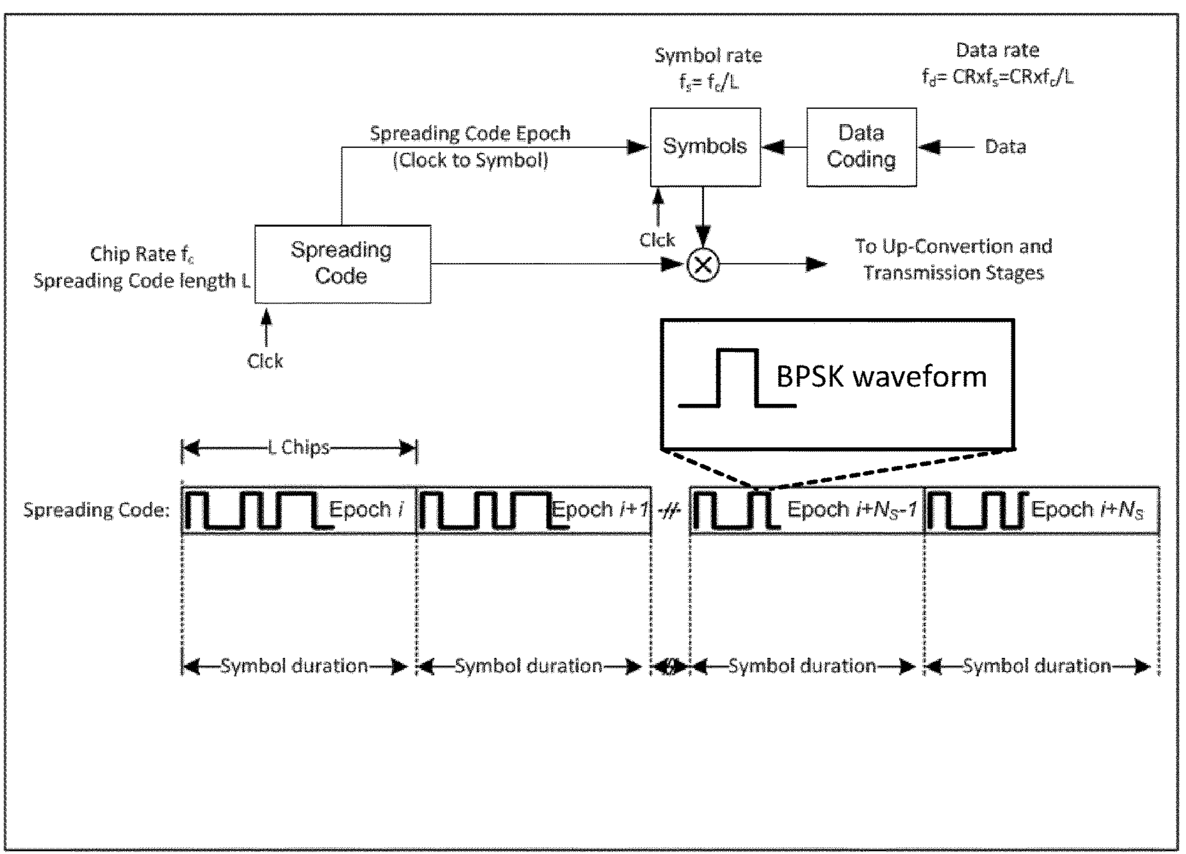
FIG. 1 represents a navigation signal structure of a radio signal component, composed of a periodical binary sequence comprising L chips, and which is modulated with symbols, together with the method to generate such a radio signal component.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Figure 7:
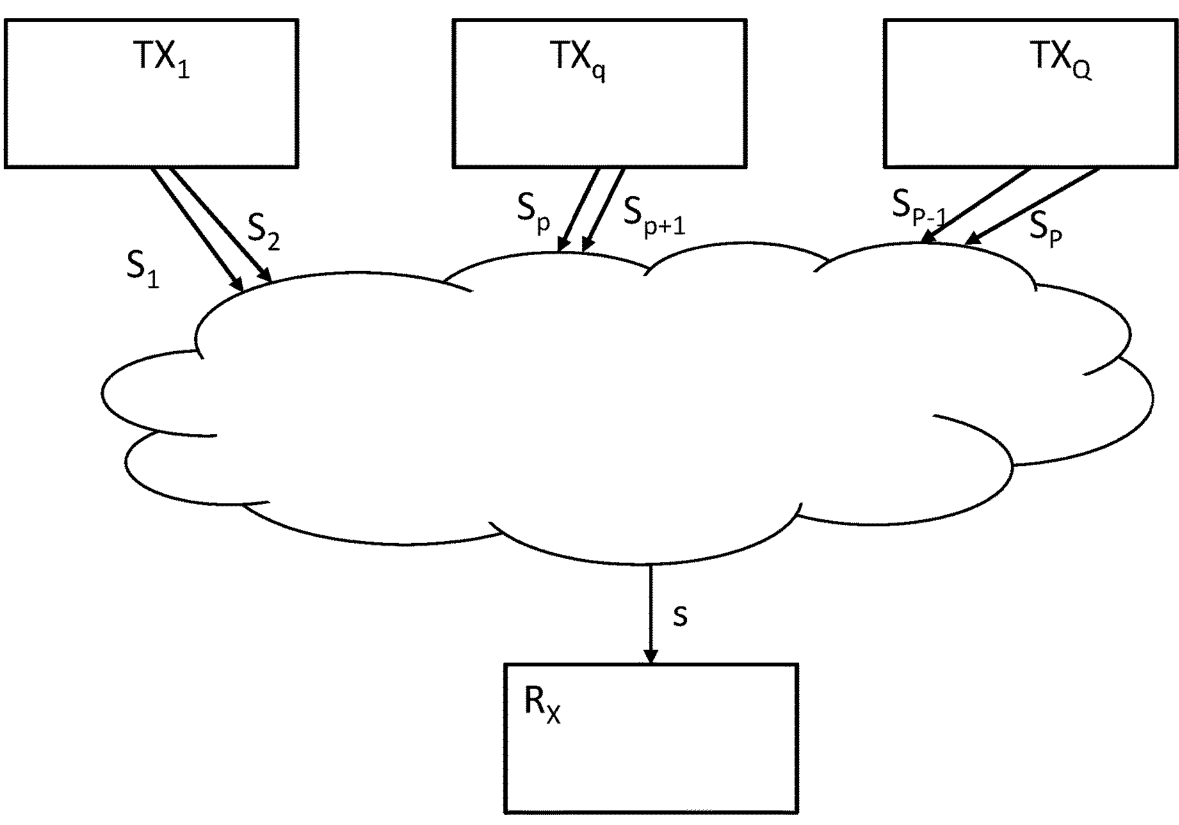
FIG. 7 represents a system for acquisition of a radio signal component of interest of a plurality of radio signals, at a radio receiver, where the radio-navigation system comprises a plurality of radio transmitters and a radio receiver.

In the following paragraphs, referring to the drawing in FIG. 7, an implementation of the radio navigation system for acquisition of at least a radio signal component of interest of a plurality of radio signal components at a radio receiver, where the radio navigation system comprising a plurality of radio transmitters for transmitting the plurality of radio signal components and a radio receiver, according to an embodiment of the present invention is described. In a further paragraph, all connections between mentioned elements are defined.

Figure 8:
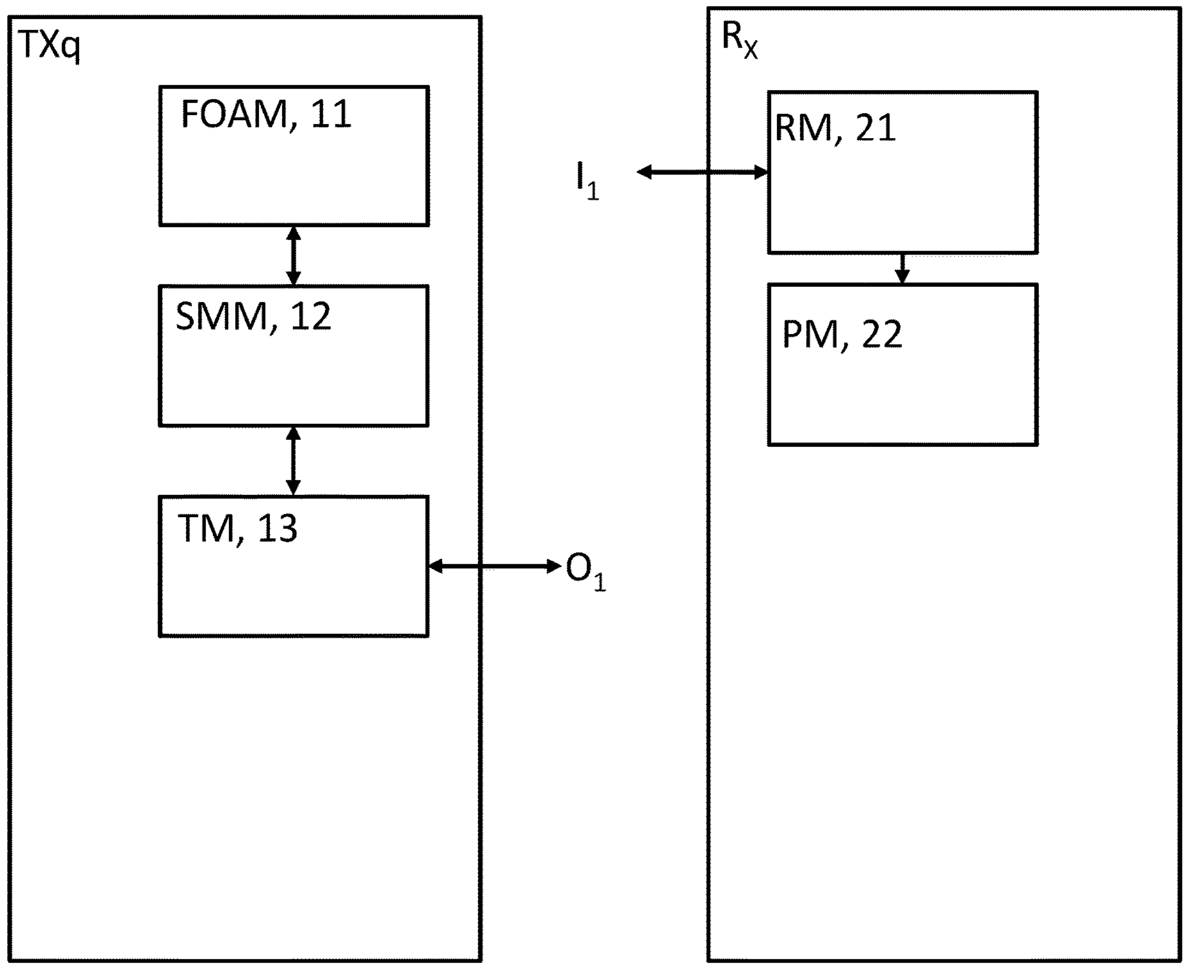
FIG. 8 represents the functional elements of the radio transmitter $TX_q$ and a radio receiver $R_x$ according to the embodiments of the present invention.

Subsequently all relevant functional means of a radio transmitter of the plurality of radio transmitters $TX_1 \ldots TX_Q$ and the radio receiver, $R_X$, according to an embodiment of the present invention as presented in FIG. 8 are described followed by a description of all interconnections of these functional means.

In the succeeding paragraph the actual implementation of a radio navigation system for acquisition of at least a radio signal component of interest of a plurality of radio signal components at a radio receiver, according to an embodiment of the present invention is described.

The radio navigation system comprising a plurality of radio transmitters $TX_1 \ldots TX_Q$, each radio transmitter being configured to transmit at least one radio signal component, amongst others for navigation and synchronization purposes, towards at least one radio receiver $R_x$ of said radio navigation system. Based on at least certain number of radio signal components received at the radio receiver $R_x$, the radio receiver $R_x$ is able to determine amongst others the location of the radio receiver based on the information derived from the received radio signal components.

Such a radio receiver may be a GNSS receiver being incorporated in a user device such as a navigation device or a personal mobile device like a smartphone, being a device comprising a processor with coupled memory and interfacing means like a display and a keyboard. Such a user device, in turn, may be configured to install a multiplicity of different kinds of applications where the execution of each such application is meant for performing a different kind of task, such as navigation. The radio navigation system according to embodiments of the present invention may be a satellite radio navigation system such as the Global Navigation Satellite System GNSS or a single positioning beacon such as a Pseudo-Lite or a network of positioning beacons or be a terrestrial system such as wireless communication network requesting synchronizations to the User Terminal or device. The embodiment of the present invention can be further applied for radio communication systems where MAI also represents a degrading effect to be overcome. Details of this enhanced frame of the application are provided later in this document.

A first essential element of the radio navigation system is a radio transmitter $TX_q$ of said plurality of radio transmitters $TX_1 \ldots TX_Q$ which radio transmitter is configured to transmit at least one radio signal component to said radio receiver $R_x$ amongst others for navigation and synchronization purposes.

The radio transmitter $TX_q$ first comprises a frequency offset applying means (11), that is configured to apply before transmission, to each radio signal component to be transmitted, a frequency offset, $\Delta f_{carr,p}$, $1 \le p \le P$, relative to a central carrier frequency, $f_{central}$, to a data signal carrier of said radio signal component to obtain a data signal carrier frequency ($f_{car,p}=f_{central}+\Delta f_{carr,p}$) with a frequency offset, $\Delta f_{carr,p}$, $1 \le p \le P$. Each radio signal component is denoted, $S_p$, with index p, where p can have a value between 1 and P, and comprises said data signal carrier, also being denoted $D_p$, with same index p, for carrying a data signal component. The said data signal component comprises a spreading code, said spreading code comprising a predetermined number of chips, L, each chip of said spreading code having a duration $T_c$ being equal to the inverse of the chip rate $f_c$.

The frequency offset corresponds to said radio signal component of a plurality of radio signal components. Each radio signal component has an own dedicated frequency offset. The frequency offset applying means is configured to apply a frequency offset value being smaller than said chip rate of said spreading code. The meant spreading code comprises a predetermined number of chips L such that the product $B \times L \times T_c/P$ shall not exceed 25, where B represents the bandwidth of the receiver front-end, expressed in Hz. Each respective data signal carrier is assigned to a frequency offset where the frequency offset, $\Delta f_{car,p}$, $1 \le p \le P$, is applied relative to a central carrier frequency, $f_{central}$, to a data signal carrier of said radio signal component to obtain a data signal carrier frequency ($f_{car,p}=f_{central}+\Delta f_{carr,p}$) with a frequency offset $\Delta f_{carr,p}$, $1 \le p \le P$; and Such frequency offset applying means 11 may comprise a micro-processor for amongst others processing the radio signal component to be transmitted and the processing means further may comprise a memory device, coupled to said microprocessor, for storing electronic information such as computer instructions, results of the signal processing including final and intermediate results and further information.

The radio transmitter $TX_q$ additionally comprises a signal modulation means (12) that further is configured to modulate a data signal component which comprises a spreading code, which is optionally modulated with symbols, onto said data signal carrier of said radio signal component having a dedicated frequency offset.

Such frequency offset applying means (11), for instance is configured to apply to said data signal carrier of said radio signal component, a frequency offset, ($\Delta f_{carr,p}$, $1 \le p \le P$) relative to a central carrier frequency, $f_{central}$ by multiplying with a complex or real offset carrier depending on said frequency offset.

Such frequency offset applying means (11), for instance is configured to apply to said data signal carrier of said radio signal component, a frequency offset, ($\Delta f_{carr,p}$, $1 \le p \le P$) relative to a central carrier frequency, $f_{central}$ by multiplying with a quantized complex or real offset carrier depending on said frequency offset.

Such frequency offset applying means (11), for instance is configured to apply to said data signal carrier of said radio signal component, a frequency offset, ($\Delta f_{carr,p}$, $1 \le p \le P$) relative to a central carrier frequency, $f_{central}$ by modulating a secondary NRZ code of complex or real symbols depending on said frequency offset onto the spreading code.

Such frequency offset applying means (11), for instance is configured to apply to said data signal carrier of said radio signal component, a frequency offset, ($\Delta f_{carr,p}$, $1 \le p \le P$) relative to a central carrier frequency, $f_{central}$ by modulating a longer spreading code obtained as combination of the said secondary NRZ code of complex or real symbols depending on said frequency offset modulated with said spreading code.

This radio transmitter $TX_q$ further comprises a transmission means (13) that is configured to transmit said at least one radio signal component where each radio signal component carries a data signal component which is modulated onto a data signal carrier of said corresponding radio signal component. Such data signal component comprises a spreading code, where the spreading code comprises a predetermined number of chips L where each chip of said spreading code having a duration $T_c$. Such a spreading code optionally is modulated with symbols.

The data signal carrier may for example apply a waveform to modulate a spreading code or a primary code with a Binary Phase Shift Keying (BPSK) as for the GPS C/A signal, or a Binary Offset Carrier (BOC) as for the Galileo E1-B/-C or GPS L1C.

It is to be noted that each of the radio transmitters $TX_1 \ldots TX_x$ has the same functional structure as radio transmitter $TX_q$.

Such a radio navigation system according to embodiments of the present invention further comprises a radio receiver $R_x$ that is configured to acquire at least one radio signal component of interest of a plurality of radio signal components $S_1 \ldots S_P$, each radio signal component of said plurality of radio signal components $S_1 \ldots S_P$ being transmitted by a respective radio transmitter of a plurality of radio transmitters $T_{X1} \ldots T_{XQ}$.

Each such radio signal component of said plurality of radio signal components $S_1 \ldots S_P$ comprises a data signal carrier for carrying a data signal component of said corresponding radio signal component, said data signal component comprising a spreading code where the spreading code comprises a predetermined number of chips L, each chip of said spreading code having a duration $T_c$.

Said radio receiver ($R_x$) has a velocity ($VT_{RX1} \ldots VT_{RXQ}$) relative to each radio transmitter of said plurality of radio transmitters ($TX_1 \ldots TX_Q$).

The radio receiver $R_x$ may be any kind of device embedding a GNSS receiver.

Such radio receiver $R_x$ first comprises a reception means (21) that is configured to receive, said plurality of radio signal components, each radio signal component having an observed Doppler offset $D_{TRX1} \ldots D_{TRXP}$ that depends on said velocity of said radio receiver ($R_x$) relative to said corresponding radio transmitters and on said data signal carrier frequency of said data signal carrier corresponding to said respective radio signal component.

Such radio receiver $R_x$ has a receiver front-end bandwidth B, and an oscillator or clock having stability $D_{oscil,Rx}$.

The radio receiver $R_x$ further comprises a processing means (22) that is configured to acquire, from each of said at least one radio signal component of interest, of said plurality of radio signal components $S_1 \ldots S_P$, said data signal component modulated onto said data signal carrier of said corresponding radio signal component, by comparing a detection threshold with an acquisition detector, where said acquisition detector is based on at least one correlation value obtained for a tested code and Doppler hypothesis among a set of code and Doppler hypotheses to be tested, said correlation value being generated by correlating, by means of processing means (22), over a coherent integration time, by said radio receiver ($R_x$), a received signal(s) comprising said plurality of the received radio signal components with a local replica of said data signal component comprising a spreading code corresponding to said signal component of interest, said correlation value comprising a combination of cross-correlation function values corresponding to the interfering radio signal components and one auto-correlation function value corresponding to the signal component of interest.

According to one embodiment of the present invention the processing means (22) of the radio receiver $R_x$ is configured to perform said correlation of the received signal comprising said plurality of received radio signal components, with a local replica comprising said spreading code and also said frequency offset ($\Delta f_{carr,p}$, $1 \le p \le P$) both corresponding to said signal component of interest.

According to an alternative embodiment of the present invention, the processing means (22) of the radio receiver $R_x$ is configured to wipe-off, before step of correlating, said respective frequency offset corresponding to said signal component of interest ($\Delta f_{carr,p}$, $1 \le p \le P$) from the received signal comprising a plurality of the received radio signal components; and in that the processing means (22) further is configured to correlate said received signal comprising said plurality of the received radio signal components and wherefrom said respective frequency offset ($\Delta f_{carr,p}$, $1 \le p \le P$) has been wiped-off, with a local replica of said data signal component comprising a spreading code corresponding to said signal component of interest.

The frequency offset applying means (11) of the radio transmitter $T_{X1}$ is coupled with an output-terminal to an input-terminal of the signal modulation means (12) that in turn is coupled with an output-terminal to an input-terminal of the transmitting means (13) that in turn has an output-terminal that is at the same time an output-terminal $O_1$ of the radio transmitter $T_{xq}$.

The radio receiver $R_x$ has an input-terminal 11 that is at the same time an input-terminal of the reception means (21) that in its turn is coupled with an output-terminal to an input-terminal of the processing means (22).

In order to explain an embodiment of the present invention it is assumed that the user equipment needed to estimate the user position and time is only based on a radio receiver processing radio signal components transmitted by satellites belonging to the same radio navigation system such as a GNSS, and therefore that the user equipment does not comprise any further sensors, such as barometer, accelerometers or gyrometers as part of an Inertial Measurement Unit (IMU). This simplifying assumption does however not impact the general applicability of the embodiment of the present invention which can be extended to other user equipment comprising additional sensors, atop the radio receiver. Furthermore, the following conventions will be applied all along the description of the embodiments:

- Q represents the number of radio transmitters, such as satellites, comprised in the radio navigation system, such as a GNSS.
- F represents the number of radio signal components transmitted by each radio transmitter of the radio navigation system.
- P represents the overall number of radio signal components transmitted by the Q radio transmitters, with P=F×Q.
- V represents the number of visible radio transmitters from the radio receiver.
- $P_v$ represents the number of received radio signal components, with $P_v$=F×V.
- W represents the maximal number of received and processed radio signal components, for Pseudo-Range estimation, that is implemented into the radio receiver and considered sufficient to reach target or specified position and timing estimation performance.
- $W_{acq}$ represents the maximal number of received and acquired radio signal components that is implemented into the radio receiver for example to account for limited radio receiver complexity.

Based on those assumptions and conventions, at least four Lines-of-Sight (LoS) are needed to determine the user position and time: three for the three X, Y and Z user coordinates and one additional for the user clock offset (time). Because obstacles typically hinder visibility to the satellites, it is necessary to have a higher number of visible satellites for a free Horizon to ensure that at least four LoS are effectively available for a non-free horizon (e.g. with a user masking angle of 5° to 15° in elevation). In addition, it is shown that the position accuracy is inversely proportional to the number of processed LoS (i.e. visible satellites), assuming a uniform spatial distribution of LoS. Finally, and contrarily to Regional Satellite Navigation Systems (RNSS), all main GNSSs offer a Global positioning service, i.e. an ability to position with a given accuracy anywhere on the earth. When combining the aforementioned elements, the number of radio navigation satellites, Q, and flying at Medium Earth Orbit around 19E3-to-23E3 km altitude, typically reaches Q=24 to 30 satellites, in order to satisfy both availability and position performance.

In the following embodiments of the present invention, reference will be often made to the GPS C/A radio signal components, as representative radio signal components applying the CDMA scheme. Quantitative performance comparisons, such as the cross-correlation isolation, or receiver complexity assessments, will also be provided between the performance achieved with the scheme proposed in the embodiment of the present invention and the ones obtained with the GPS C/A signals. Similar assessments will also be proposed with the GLONASS L1COd radio signal components, as representative radio signal components applying the FDMA scheme. To support aforementioned comparisons, a similar number of radio transmitters, i.e. satellites, as the one of the GPS or GLONASS constellations, having approximately the same altitude, will also be considered for the scheme described in the embodiment of the present invention to propose a first dimensioning and assignment of the frequency offsets. Nevertheless, it is already outlined that the embodiment of the present invention is not restricted to this working point used for comparison, and that it can be applied for other dimensioning parameters, such as the pulse waveform, the number and the velocity of the radio transmitters, or the MAI levels to be ensured with the specified cross-correlation isolations.

In the following, it is proposed to describe in more details the mathematical background for the correlation process applied at a said radio receiver, $R_x$, to support the acquisition of the signal component of interest. In more particular, it explains the means of correlating over a coherent integration time, $T_{int}$, by said radio receiver (Rx), a received signal (s(t)) comprising said plurality of the received radio signal components with a local replica of said data signal component comprising a spreading code corresponding to said signal component of interest, and yielding to a correlation value, said correlation value comprising a combination of cross-correlation function values corresponding to the interfering radio signal components and one auto-correlation function value corresponding to the radio signal component of interest Two main types of correlation functions will thus be identified. The first one is the Auto-Correlation Function (ACF), obtained when correlating the radio signal component of interest contained in the received signal, s(t), with the replica which matches to the corresponding radio signal component of interest. The second one is the Cross-Correlation Function (CCF), obtained when correlating each of the interfering radio signal components, different to the radio signal component of interest, and which are also contained in the received signal, s(t), beside the radio signal component of interest. Those CCF values corresponding to all interfering radio signal components comprised in the received signal will constitute a degrading factor for the acquisition, and represent the MAI effects during the acquisition process.

To support those formal descriptions, the following equation provides a model for the $p^{th}$ transmitted radio signal component $u_p(t)$ at the output of the antenna mounted onboard the radio transmitter platform, i.e. the satellite:

$$u_p(t) = \sqrt{P_p^{Tx}}\, d_p(t) g_p(t) e^{j(\varphi_{p,init})} \tag{1}$$

For each of the P transmitted navigation radio signal components, with index $$p: - P_p^{Tx}$$

represents the transmitted power at transmit antenna phase center, also called Equivalent Isotropic Radiated Power (EIRP).

- $d_p(t)$ is the stream of symbols having a symbol duration $T_s$ and applicable for radio signal component for data transmission. It is outlined that some radio signal components, called Pilot radio signal components, do not contain symbols modulated atop the spreading code.
- $g_p(t)$ is the pulse-modulated spreading code whose expression is:

$$g_p(t) = \sum_{m=-\infty}^{+\infty} c_{p,m} p(t - mT_c) \tag{2}$$

where p(t) is the pulse shape, or pulse waveform, which is non-zero over an interval of duration $T_c$, equal to the chip duration. Each of the spreading code $c_{p,\bullet}$ has a spreading code period $T_p=L_p \times T_c$ where $L_p$ represents the length of the spreading code assigned to the satellite of index p. In conventional GNSSs, it is usual to consider that the spreading code lengths $L_p$ are identical for all radio transmitters ($L_p=L$ for all p), but in some alternative embodiments of the present invention, this assumption will not be applied. Note that several spreading code periods can be contained within a symbol duration: $T_s=K \times T_P$.

$\varphi_{p,init}$ is an arbitrary, but known, initial phase applied for the $p^{th}$ transmitted radio signal component. Typically $\varphi_{p,init}$ is set to 0.

Re-using the conventions formerly introduced, and considering that the radio receiver is in visibility to V satellites transmitting each F radio signal components, and that among those V visible satellites one transmits the signal component of interest, the output of the correlation will comprise (V−1)×F+(F−1) values of the Cross-Correlation functions corresponding to the (V−1)×F+(F−1) different interfering radio signal components, and one value for the Auto-Correlation Function corresponding to the radio signal component of interest. To ease explanations, in the following it is considered that only one signal component is transmitted by each satellite (F=1). However, the following assessments and justifications for the proposed scheme can be extended for the case when F is larger or equal to 2.

For those simplifying assumptions, the received signal, s(t), will combine the aggregation of the $P_v=F \times V=V$ ($\leq P$) transmitted radio signal components, $u_p(t)$, that are received at the radio receiver side. The following model for the received signal s(t), using a complex notation and obtained after direct down-conversion to base-band at the radio receiver, is proposed:

$$s(t) = \sum_{p=0}^{P_v-1} \sqrt{P_p^{Rx}}\, d_p(t-\tau_p) g_p(t-\tau_p) e^{j(2\pi f_{Dopp,p} t + \varphi_p)} + n(t) \tag{3}$$

For each of the $P_v$ received radio signal components, with index p, then:

$$-P_p^{Rx}$$

represents the received power which can be derived with a link budget from the individual transmitted power, $$P_p^{Tx}$$

after application of space losses and any contributions to the received signal power, such as obstacle (e.g. walls, trees) attenuations.

$\tau_p$ is the code delay observed at reception.

$\varphi_p$ and $f_{Dopp,p}$ are respectively the residual phase, and observed Doppler offset (frequency), obtained after down-conversion and which are thereof affected by the receiver clock stability, called $D_{Osc,Rx}$.

n(t) is the complex base-band additive noise, representative of the thermal noise. It is supposed to be Gaussian distributed with a one-sided power spectral density $N_0$.

It is finally noted that the former equation can also model the received signal obtained after a two-stages down-conversion (i.e. from RF to IF ($f_{IF,Rx}$) and then from IF ($f_{IF,Rx}$) down-to baseband).

In order to acquire the radio signal component of interest and especially to coarsely estimate the code delay and Doppler offset, the received signal s(t) is passed through a matched filter. This filter correlates the received signal with a replica corresponding to the radio signal component of interest after application of a delay, $\tau_{test,0}$, corresponding to the code hypothesis and a frequency modulation corresponding to the Doppler offset hypothesis, $f_{popp,test,0}$. Per convention, and for sake of simplification, it is considered that the index p, for the signal component of interest is set equal to p=0. The expression for the correlation function is as follows:

$$r(\tau_{test,0}, \Delta f_{Dopp,test,0} + \varphi_{test,0}) = \frac{1}{T_{int}} \int_0^{T_{int}} s(t) \times g_0(t-\tau_{test,0}) e^{-j(2\pi f_{Dopp,test,0} t + \varphi_{test,0})} dt \tag{4}$$

In this expression, $\tau_{test,0}$, $f_{Dopp,test,0}$, and $\varphi_{test,0}$ respectively represent the tested code delay, the tested Doppler offset and the tested phase for the desired satellite. It is already highlighted that because the common acquisition techniques are based on the exploitation of the squared magnitude of the correlation function, then the tested phase, $\varphi_{test,0}$, does not impact the corresponding detector output, and does not need to be tested. Therefore a single and constant arbitrary tested phase, $\varphi_{test,0}$, can be applied over the whole acquisition process, for example $\varphi_{test,0}=0$. The term $\Delta f_{Dopp,test,0}$ represents the desired Doppler residual and will be described later.

The correlation operation (4) will be applied to digital signals, i.e. after the ADC module formerly described. For simplicity it will be assumed that the different delays $\tau_p$ and the estimated delay $\tau_{test,0}$ are all multiple of the sampling interval $T_{samp}$, which in the case of acquisition corresponds to the code bin width (e.g. $T_{samp}=T_c/2$ or $T_c/4$). Furthermore and still to ease explanations, it is considered that the sampling rate, $f_{samp}$, is commensurate to the chip rate, i.e. multiple of the chip rate, with $f_{samp}=U \times f_c$. Those simplifications are usually applied in specialized literature. Nevertheless, the justifications and main conclusions for the proposed scheme are not altered when those simplifying assumptions are released.

[Ref 4]: *"Correlation and Randomness Properties of the Spreading Coding Families for the Current and Future GNSSs"*. F. Soualle. *Signal Workshop at DLR*, Oberpfaffenhofen, December 2009.

By correlating the received signal s(t), two main types of correlation functions will then be distinguished.

The first one is called to Auto-Correlation Function (ACF) and indicates how the received radio signal component transmitted by the desired satellite and the corresponding replica corresponding to the radio signal component of interest match together for a given tested code delay and Doppler offset:

$$r_a(p_0, \Delta f_{Dopp,test,0}) = \frac{\sqrt{P_0^{Rx}}}{U \times L} \times \sum_{n=1}^{U \times L} R_p(n, p_0) \overline{c}_{0,\lfloor \frac{n}{U} \rfloor} c_{0,\lfloor \frac{n}{U} - p_0 \rfloor} \times e^{j(2\pi \Delta f_{Dopp,test,0} n T_{samp} + \Delta\varphi_{test,0})} \tag{5}$$

Where:

$p_0$ is the delay estimation error expressed in unit of (fraction of) chips between the received radio signal component of interest and the spreading code replica corresponding to radio signal component of interest: $\Delta\tau_{test,0}=\tau_0-\tau_{test,0}=p_0\,T_{samp}$, and varies between 0 and L. This delay is applied to the spreading code replica, $c_{0,\cdot}$.

$\Delta f_{Dopp,test,0}=f_{Dopp,0}-f_{Dopp,test,0}$ is the desired Doppler residual, or desired Doppler coarse estimation error, and denotes the difference between the actual observed Doppler offset corresponding to the satellite transmitting the radio signal component of interest ($f_{Dopp,0}$), also referred to as $D_{TRx0}$, and the tested Doppler offset for the radio signal component of interest ($f_{Dopp,test,0}$).

$\Delta\varphi_{test,0}=\varphi_0-\varphi_{test,0}+2\pi\Delta f_{Dopp,test,0}\tau_0$ corresponds to the phase estimation error (ignored in further assessments after application of the squared magnitude operation)

$R_p(n,p_0)=R_p(u_0)$, with $$u_0=\left(\frac{n+U\times p_0}{U\times L}-\left[\frac{n+U\times p_0}{U\times L}\right]\right)\times T_c,$$

where in this expression, the operator [x] designates the closest (upper or lower) integer to x. $R_p(u_0)$ represents the auto-correlation for the pulse waveform, p(t), also called Auto-Correlation Pulse Waveform Function (ACPWF), and wherein $u_0$ represents the infra-chip code delay, belonging to the support interval of the pulse waveform, $[-T_c,T_c]$.

$$R_p(u)=\frac{1}{T_c}\int_0^{T_c}p(t)\times p(t-u)dt \tag{6}$$

Furthermore, $$\overline{c}_{0,\lfloor\frac{n}{U}\rfloor}$$

is the data modulated spreading code and accounts for the effects of the data modulation when a data edge occurs within the period of the spreading code replica:

$$\begin{cases}\overline{c}_{0,m}=c_{0,m} \text{ if } d_0(m-K\times L\times U)T_s=d_0(m)\\ \overline{c}_{0,m}=-c_{0,m} \text{ if } d_0(m-K\times L\times U)T_s=-d_0(m)\end{cases} \tag{7}$$

If no symbols are modulated onto the radio signal component, $\overline{c}_{0,m}=c_{0,m}$, for all m.

It is noted that in the equation (5), the term $$\frac{1}{U\times L}\times\sum_{n=1}^{U\times L}\overline{c}_{0,\lfloor\frac{n}{U}\rfloor}c_{0,\lfloor\frac{n}{U}-p_0\rfloor}$$

represents the so-called code auto-correlation, which does not taken into account neither the modulated pulse shaped p(t) through the ACPWF, nor the received power $$P_0^{Rx}$$

(see [Ref 4]).

In order to be freed from the received power dependency of the received radio signal component of interest $$(P_0^{Rx}),$$

the so-called Normalized Auto-Correlation Function (corresponding to a unitary received power $$P_0^{Rx}=1)$$

will be considered for further quantitative assessments presented later in this present application, and will be also called abusively Auto-Correlation Function. However, and when deemed necessary, distinction will be made between ACF, and Normalized ACF according to the context of the analyses.

$$r_a(p_0,\Delta f_{Dopp,test,0})=\frac{1}{U\times L}\sum_{n=1}^{U\times L}R_p(n,p_0)\overline{c}_{0,\lfloor\frac{n}{U}\rfloor}c_{0,\lfloor\frac{n}{U}-p_0\rfloor}\times e^{j(2\pi\Delta f_{Dopp,test,0}nT_{samp}+\Delta\varphi_{test,0})} \tag{8}$$

The second correlation type is called the Cross-Correlation function (CCF) and indicates how the received interfering radio signal component transmitted by one of the other $(V-1)=(P_v-1)$ satellites which do not transmit the radio signal component of interest, mismatch to the replica corresponding to the radio signal component of interest. Its expression can be reduced to $$r_{c,p}(p_p,\Delta f_{Dopp,test,p})=\frac{\sqrt{P_p^{Rx}}}{U\times L}\sum_{n=1}^{U\times L}R_p(n,p_p)\times\overline{c}_{p,\lfloor\frac{n}{U}\rfloor}c_{0,\lfloor\frac{n}{U}-p_p\rfloor}e^{j(2\pi\Delta f_{Dopp,test,p}nT_{samp}+\varphi_{test,p})} \tag{9}$$

Where:

$p_p$ is the delay error expressed in unit of (fraction of) chips between the $p^{th}$ received interfering radio signal component and the spreading code replica. Hence, $\Delta\tau_{test,p}=\tau_p-\tau_{test,0}=p_pT_{samp}$ denotes the difference between the actual code delay for the $p^{th}$ received interfering radio signal component and applied the code delay hypothesis for the spreading code replica. This delay is applied to the spreading code replica, $c_{0,\cdot}$.

$\Delta f_{Dopp,test,p}=f_{Dopp,p}-f_{Dopp,test,0}$ is the interfering Doppler residual and denotes the difference between the actual observed Doppler offset of the $p^{th}$ received interfering radio signal component ($f_{Dopp,p}$), also referred to as $D_{TRxp}$, and the tested Doppler offset for the radio signal component of interest ($f_{Dopp,test,0}$).

$\Delta\varphi_{test,p}=\varphi_p-\varphi_{test,0}+2\pi\Delta f_{Dopp,test,p}$ denotes the difference between the actual phase of the $p^{th}$ interfering radio signal component and the tested phase for the radio signal component of interest.

$R_p(n,p_p)=R_p(u_p)$, with $$u_p=\left(\frac{n+U\times p_p}{U\times L}-\left[\frac{n+U\times p_p}{U\times L}\right]\right)\times T_c,$$

where in this expression, the operator [x] designates the closest (upper or lower) integer to x. $R_p(u_p)$ represents again the Auto-Correlation Pulse Waveform Function (ACPWF), and wherein $u_p$ represents the infra-chip code delay, belonging to the support interval of the pulse waveform, $[-T_c,T_c]$.

It is noted that in the equation (9), the term $$\frac{1}{U\times L}\times\sum_{n=1}^{U\times L}\overline{c}_{p,\lfloor\frac{n}{U}\rfloor}c_{0,\lfloor\frac{n}{U}-p_p\rfloor}$$

represents the so-called code cross-correlation, which does not taken into account neither the modulated pulse shaped p(t), nor the received power $$P_p^{Rx}.$$

Similarly, and in order to be freed from the received power dependency of the received interfering radio signal components $$(P_p^{Rx}),$$

the so-called Normalized Cross-Correlation Function (corresponding to a unitary received power $$P_p^{Rx}=1),$$

will also be considered for further quantitative assessments presented later in the present application, and will be also called abusively Cross-Correlation Function. However, and when deemed necessary, distinction will be made between CCF and Normalized CCF according to the context of the analyses.

$$r_{c,p}(p_p,\Delta f_{Dopp,test,p})=\frac{1}{U\times L}\sum_{n=1}^{U\times L}R_p(n,p_p)\times\overline{c}_{p,\lfloor\frac{n}{U}\rfloor}c_{0,\lfloor\frac{n}{U}-p_p\rfloor}e^{j(2\pi\Delta f_{Dopp,test,p}nT_{samp}+\varphi_{test,p})}\tag{10}$$

It is noted that the expression for the Cross-Correlation Function formerly derived applies for interfering radio signal components having the same pulse waveform, p(t), as the radio signal component of interest, which is a simplifying assumption for the explanation of the embodiment of the present invention. Similar statements can however be derived when extending the cross-correlation function to (interfering) radio signal component having different waveforms to the radio signal component of interest. In that case, the expression for the (normalized) Cross-Correlation function (eq. (10)) would be derived when replacing the Auto-Correlation Pulse Waveform Function (ACPWF), introduced in the derivation of the ACF function expression (see eq. (5) and (6)), with the Cross-Correlation Pulse Waveform Function (CCPWF). In the case when the waveform p(t) for the radio signal component of interest differs from the waveform q(t) of the interfering radio signal component, the expression for the CCPWF becomes.

$$R_{p,q}(u)=\frac{1}{T_c}\int_0^{T_c}q(t)\times p(t-u)dt\tag{11}$$

The expression of the Cross-Correlation function applying the CCPWF then becomes:

$$r_{c,p}(p_p,\Delta f_{Dopp,test,p})=\frac{1}{U\times L}\sum_{n=1}^{U\times L}R_{p,q}(n,p_p)\times\overline{c}_{p,\lfloor\frac{n}{U}\rfloor}c_{0,\lfloor\frac{n}{U}-p_p\rfloor}e^{j(2\pi\Delta f_{Dopp,test,p}nT_{samp}+\varphi_{test,p})}\tag{12}$$

In the following description of the embodiment of the present invention, the term Cross-Correlation Function will be applied in a wide sense, i.e. when the pulse waveform for the interfering radio signal component, q(t), is identical to the waveform of the radio signal component of interest (p(t)=q(t)), or differs from it ((p(t)≠q(t)).

As the cross-correlation function depends on the observed Doppler offsets for the signal component of interest, $D_{TRx0}$, also called $f_{Dopp,0}$, but also for the $(P_v-1)$ interfering radio signal components, among $D_{TRX1}\ldots D_{TRXPv}$, also called $(f_{Dopp,1},\ldots,f_{Dopp,P_v})$ depending on said velocity of said radio receiver $(R_x)$ relative to said corresponding radio transmitters, it is proposed in the following to describe the main characteristics of the observed Doppler offset, such as its boundaries, also called Doppler span, but also the distribution of the observed Doppler offset within the Doppler span. In the context of the signal acquisition, the observed Doppler offset covers both the effects of the satellite to radio receiver link dynamic, but also the satellite and radio receiver clock stability, for example due to the contribution of the payload satellite clock in the up-conversion process or the radio receiver clock in the down-conversion process. As a matter of fact, the Doppler span depends on the maximal dynamic of the satellite to radio receiver link, as well as the satellite clock stability, called $D_{osc,sat}$ and user clock stability, called $D_{osc,Rx}$. Because GNSS satellites are usually equipped with atomic clocks showing high performing stability, the receiver clock stability, $D_{osc,Rx}$, represents the main contribution to dimension the overall Doppler uncertainty region.

As far as the first contribution covering the link dynamic is concerned, the relative displacement of the satellite of index, p, w.r.t. the GNSS receiver or User Device will cause a time-varying shift of the received carrier frequency, w.r.t. the carrier frequency of the transmitted signals. The general expression for the observed Doppler offset, due the satellite-to-receiver link dynamic and experienced at a terrestrial radio receiver is given by the following equation.

$$f_{Dopp,p}(\text{user}) = -\left(\frac{(\vec{P_r}-\vec{P_t})^T(\vec{V_r}-\vec{V_t})}{\|(\vec{P_r}-\vec{P_t})\| \times c_0}\right) \times f_{carr,p} \quad \text{(eq. 13)}$$

Where $f_{carr,p}$ designates the reference or nominal carrier frequency transmitted by the satellite of index p, and is further referred as $f_{central}$ in the embodiments of the present invention.

$f_{Dopp,p}$ designates the (observed) Doppler offset as difference between the actual or observed received frequency $f_{carr,rx,p}$ and the transmitted reference carrier frequency $f_{carr,p}$. As an example, if the reference carrier frequency is $f_{carr,p}$=1575.42 MHz and the observed Doppler offset, $f_{Dopp,p}$, is 1 KHz, the observed received frequency $f_{carr,rx,p}$ equals 1575.4201 MHz $\vec{P}_r$ (resp. $\vec{P}_t$) designates the position vector of the radio receiver (respectively transmitter, i.e. satellite)

$\vec{V}_r$ (resp. $\vec{V}_t$) designates the velocity vector of the radio receiver (respectively transmitter, i.e. satellite)

It is also noted that the Doppler due to the link dynamic will not affect the carrier alone by shifting it, but will also affect other characteristics of the received signal, as a time companding effect on the spreading code. Indeed, the Doppler can also dilate or compress the apparent chip duration when compared to its reference duration at transmission. Such effects are however of smaller importance onto the acquisition performances (and especially on the correlation losses used for acquisition) when compared to the Doppler effects onto the Carrier.

The assignment of the frequency offset to the said radio signal component is deeply coupled with the properties of the Cross-Correlation function depending on the type (i.e. family), of spreading code and especially its length, L, the applied pulse waveform(s), p(t) and q(t), but also of the physical Doppler observed at radio receiver, as shown from equation (10). Therefore one first step consists in determining the span of the observed Doppler (offset) for the transmitter-to-receiver link. In the following example, the determination of the Doppler span is proposed for GNSS satellites, placed at a Medium Earth Orbit (MEO) altitude. The same methodology to estimate the Doppler span can however be applied for satellites at other altitudes (such as Geostationary Earth Orbit satellites (GEO) or Low Earth Orbit satellites (LEO)) or even other platform types such as HAPS, Drones and UAVs, or even static transmitters w.r.t. the receivers.

FIG. 9*a*, FIG. 9*b*, FIG. 9*c*, FIG. 9*d* and FIG. 9*e* aim at determining, thanks to equation (eq. 13), the span and the distribution of the observed Doppler offset, i.e. perceived at radio receiver, and only due to the relative satellite-to-user motion, when considering a terrestrial and fixed user and satellites of a GNSS such as the Galileo one having an altitude at ~23E3 km and an inclination of 56°. FIG. 9*a*, FIG. 9*b*, FIG. 9*c* and FIG. 9*d* respectively represent the Doppler span and the distribution of the Doppler offset for users respectively at latitudes of 0°, 20°, 51° and 82°. The lower FIG. 9*e* represents the aggregated distribution over all latitudes. From those results it can be verified that the actual received and observed Doppler offset, $f_{Dopp,q}$, of satellites, can vary between −3.5 KHz and +3.5 KHz for the Galileo system. The same order of magnitude can be stated for other GNSSs comprising MEO satellites. For example, for the GPS system the Doppler span equals ±4.9 KHz, from [Ref 3]. Still, in [Ref 3] it is also shown that this Doppler span of the satellite-to-user link will increase with ±190 Hz for a user with a motion of 130 km/h, which shows that the main contribution to the received and observed Doppler originates from the satellite dynamic (here the contribution of the received oscillator is no accounted).

Figure 10:
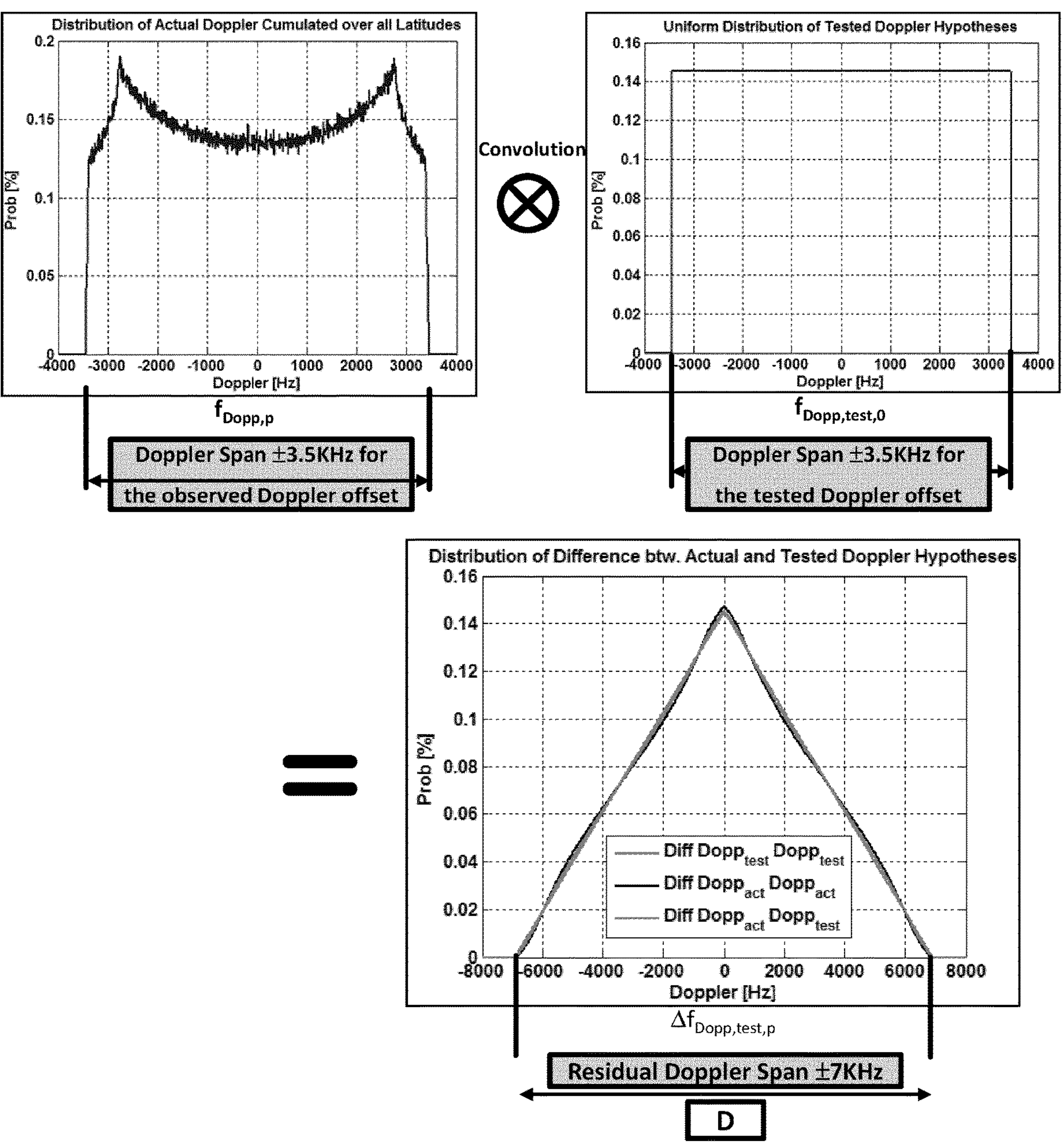
FIG. 10 represents the span for the distribution of the interfering (resp. desired) Doppler residual, $\Delta f_{Dopp,test,p}$ (resp. $\Delta f_{Dopp,test,0}$) calculated as $\Delta f_{Dopp,test,p}=f_{Dopp,p}-f_{Dopp,test,0}$, where $f_{Dopp,p}$ (resp. $f_{Dopp,0}$) represents the actual and observed Doppler offset for the $p^{th}$ (resp. $0^{th}$) interfering radio signal component, while $f_{Dopp,test,0}$ represents the tested Doppler offset hypothesis for the radio signal component of interest.

FIG. 10 represents the span for the distribution of the interfering Doppler residual, $\Delta f_{Dopp,test,p}$ calculated as $\Delta f_{Dopp,test,p}=f_{Dopp,p}-f_{Dopp,test,0}$, which is also applicable for the desired Doppler residual $\Delta f_{Dopp,test,0}=f_{Dopp,0}-f_{Dopp,test,0}$. Therefore, the following explanations provided for the interfering Doppler residual can be made also applicable for the desired Doppler residual. It is assumed that the tested Doppler applied to the replica, $f_{Dopp,test,0}$, is uniformly distributed over the span of the physical Doppler offset, which is the case in absence of a priori on the actual Doppler offset for the satellite transmitting the radio signal component of interest when considering a cold acquisition scenario (the only a priori available is the maximum Doppler span, e.g. ±3.5 KHz). The distribution for the interfering Doppler residual, $\Delta f_{Dopp,test,p}$ is then obtained by convoluting the distribution of the actual and observed Doppler offset shown on FIG. 9*e*, when averaged over all latitudes, and the distribution for the tested Doppler hypothesis applied to the replica. FIG. 10 shows that the span for the interfering Doppler residual expands over ±7 KHz (sum of the span for the tested Doppler applied to the replica, and to the observed Doppler offset of the received and interfering radio signal components). FIG. 10 also shows that the distribution for the interfering Doppler residual can be approximated by a triangular function with a basis ±7 KHz. In the following the Span for the interfering Doppler residual is referred as D. For the proposed example, D=+7 KHz−(−7 KHz)=14 KHz.

It is reminded that the corresponding span only considers the effects of the Doppler for the satellite-to-user link, and not the effects of the receiver oscillator or clock stability, $D_{osc,Rx}$ (considering negligible the effects of satellite clock stability, $D_{osc,sat}$). If the additional contribution of the receiver clock stability is considered, then the range or span for the tested Doppler hypothesis, $f_{Dopp,test,0}$, shall be extended, in the proposed example, to ±(3.5 KHz+$D_{osc,Rx}$), and a uniform distribution shall also be considered for the tested Doppler hypothesis in absence of further a priori. By applying the same methodology, the distribution for the interfering Doppler residual, $\Delta f_{Dopp,test,p}$ is obtained by convoluting the distribution of the observed Doppler offset shown on FIG. 9*e*, and the modified distribution for the tested Doppler hypothesis applied to the replica, and having a larger span. It can be shown that the distribution of the interfering Doppler residual can also be approximated by a triangular function with basis D=+(7 KHz+2$D_{osc,Rx}$)−(−7 KHz+2$D_{osc,Rx}$)=14 KHz+4$D_{osc,Rx}$. By considering again [Ref 3], it is shown that $D_{osc,Rx}$=5.25 KHz for a low grade oscillator with 3 ppm, and therefore the basis of the triangle model approximating the distribution of the interfering Doppler residual equals of D=35 KHz. The former calculations for the span can be applied to other altitudes of the platforms of the radio navigation system, but also other receiver oscillator grades.

Having introduced the definition of the Auto- and Cross-Correlation Functions, together with the definition of the Doppler, and the corresponding span for typical MEO satellite-to-radio receiver links, it is now proposed to compute the variations of the ACF and CCF values for realistic values of the Doppler offset in the case of a signal component such as a GPS C/A one, and to also represent the variations of the percentiles of the CCF as function of the desired or inferring Doppler residual value.

Figure 11A:
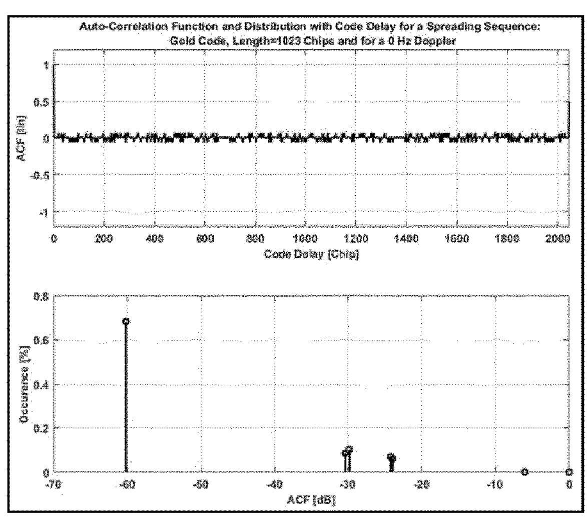
FIG. 11*a*, FIG. 11*b*, FIG. 11*c* and FIG. 11*d* represent each the values for the Auto-Correlation or Cross-Correlation functions on the upper part, and the corresponding distributions on the lower part.
Figure 11C:
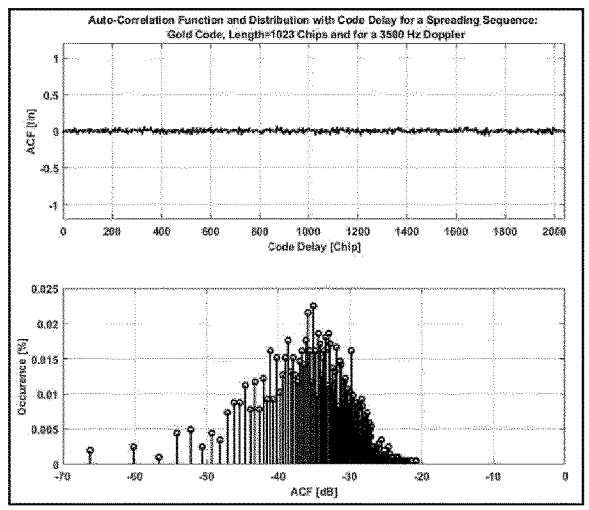
Figure 11B:
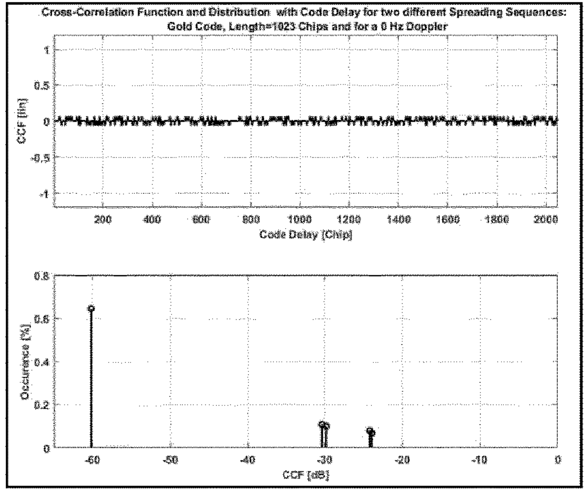
Figure 11D:
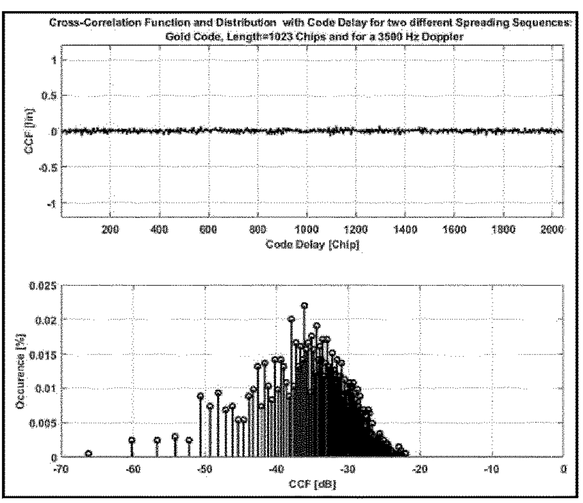

On each of the FIG. 11*a*, FIG. 11*b*, FIG. 11*c* and FIG. 11*d*, the values for the Auto-Correlation or Cross-Correlation functions are represented on the upper part, and the corresponding distributions on the lower part. For this example, spreading codes belonging to the Gold Code family, currently implemented for the GPS C/A radio signal components have been applied. Each code comprises 1023 chips and is modulated with a BPSK(1) pulse waveform. For both ACF (resp. CCF), the code delay between the spreading code replica and the received spreading code applied to the radio signal component of interest (resp. to the interfering radio signal component) covers the complete spreading code length, L, at a granularity corresponding to the code bin width (e.g. $T_c/2$). For the ACF computation, the Q=24 spreading codes, i.e. Gold Codes of the GPS C/A radio signal components have been considered. For the CCF computation, the Q×(Q−1)/2=276 possible pairs within the different GPS C/A Gold Codes have been considered. Furthermore, and to ease comprehension, normalized correlation functions (see eq. (8) for ACF, eq. (10) for CCF) are considered. Finally the coherent integration time, $T_{int}$, is set to 1 ms (corresponding to one spreading code duration, for a chip rate of $f_c$=1 MCps). For the determination of the ACF and CCF values a sampling frequency of twice the chip rate (U=2) was applied corresponding to 2 samples, or code hypotheses, per chip. FIG. 11*a* represents the variations of the ACF for all Q=24 Gold Codes, when applying a 0 Hz for the desired Doppler residual ($\Delta f_{Dopp,test,0}=0$). It can be observed that a maximal ACF peak of 1 is obtained for a 0 delay. Once the code delay differs from 0, the ACF values, also called side-peak-ACF rapidly degrade and are below ~0.05 (relative to the ACF peak of 1). The lower part of FIG. 11*a* represents therefore the corresponding distribution of the ACF values, expressed in dB ($20\times\log_{10}(|r_a|)$). The ACF peak of 1 for a 0 delay can be recognized with a single value reaching 0 dB, while the other side-peak-ACF reduces to −24 dB, −30 dB or −60 dB, as the side-peak ACF of Gold-Codes are so-called three-valued, and two samples per chip are considered to compute the ACF. FIG. 11*b* represents the CCF values between two different spreading codes, i.e. Gold Codes, one for the spreading code replica corresponding to the radio signal component of interest and another for one of the Q interfering radio signal components, and again for a interfering Doppler residual equal to 0 Hz ($\Delta f_{Dopp,test,p}=0$). No peak at 1 exists any more since no match between two different spreading codes exists. However, the same three-value property can be recognized in both the upper and lower figures, again due to the specific characteristics of the CCF for Gold Codes, observed for a 0 Hz interfering Doppler residual. This "three-valued CCF" can be also recognized in the lower plot of FIG. 11*b* showing the CCF distribution. FIG. 11*c* and FIG. 11*d* represents the ACF and CCF now when applying a Desired Doppler residual $\Delta f_{Dopp,test,0}$=3.5 KHz for the ACF, and an interfering Doppler residual $\Delta f_{Dopp,test,p}$=3.5 KHz for the CCF. It can be observed that in presence of Doppler residual the main ACF peak of 1 completely disappears, as a consequence of the phase rotation due the exponential term within the coherent integration time, observed in equation (8). A similar effect applies onto the CCF, with a strong reduction of the CCF values in presence of non-zero interfering Doppler residual, when considering equation (10). Furthermore, the ACF and CCF values have the same order of magnitude, which can also be confirmed by the corresponding distributions in the lower parts of both FIG. 11*c* and FIG. 11*d*.

Figure 12A:
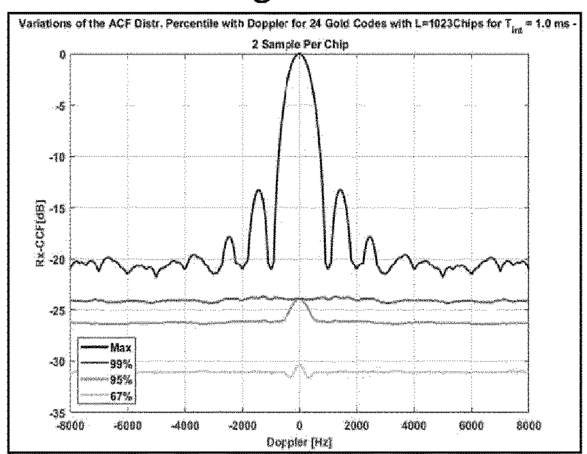
FIG. 12*a*, FIG. 12*b*, FIG. 12*c* and FIG. 12*d* represent the variations of the maximal ACF values, expressed in dB, as well as the 99%, 95% and 67% percentiles of the ACF distribution, as function of the desired Doppler residual (i.e. Doppler coarse estimation error), when this one varies between −8 KHz and 8 KHz, when applying either 1 ms (FIG. 12*a* and FIG. 12*c*) or 5 ms (FIG. 12*b* and FIG. 12*d*) as coherent integration time.
Figure 12C:
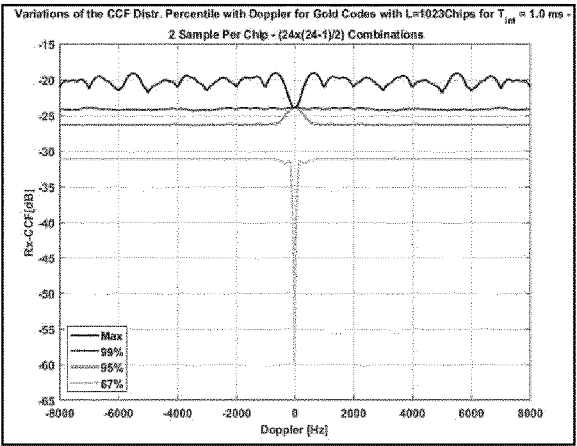
Figure 12B:
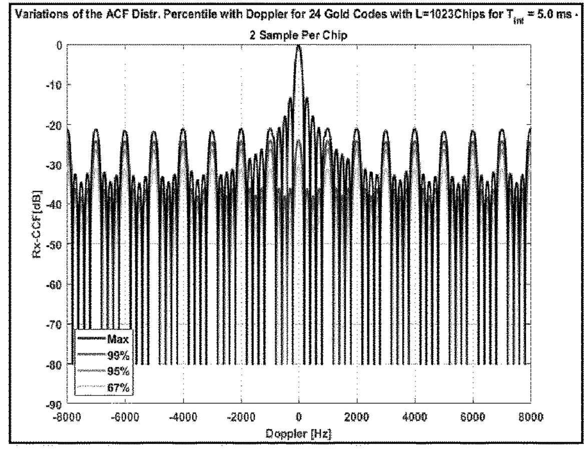
Figure 12D:
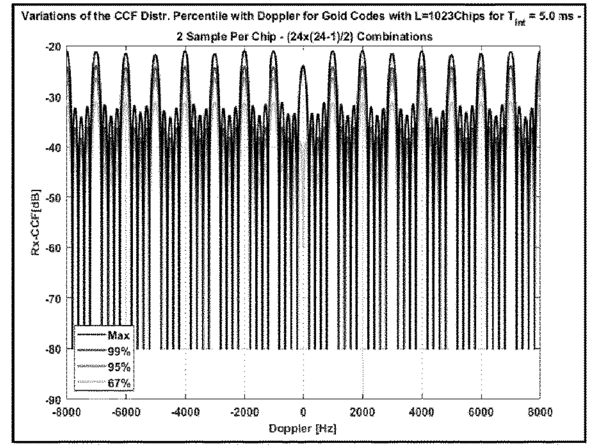

The FIG. 12*a* and FIG. 12*b* represent the Doppler variations of the maximal ACF values, expressed in dB, as well as the 99%, 95% and 67% percentiles of the ACF distribution, as function of the desired Doppler residual, when this one varies between −8 KHz and 8 KHz (corresponding to a range of 16 KHz, which is (slightly) larger than the span of desired Doppler residual equal to 14 KHz). Furthermore, two different coherent integration times have been considered with $T_{int}$=1 ms (shown on FIG. 12*a*), and with $T_{int}$=5 ms corresponding to X=5 spreading code periods of 1 ms (shown on FIG. 12*b*). The main ACF peak (0 dB) for a 0 Hz Doppler can be recognized on both FIG. 12*a* and FIG. 12*b*. Similarly, FIG. 12*c* and FIG. 12*d* represents the Doppler variations of the maximal CCF values, expressed in dB, as well as the 99%, 95% and 67% percentiles of the CCF distribution as function of the interfering Doppler residual, when this one varies between −8 KHz and 8 KHz (again corresponding to a range (slightly) larger than the one of interfering Doppler residual equal to 14 KHz). Again, two different coherent integration times have been considered with $T_{int}$=1 ms (shown on FIG. 12*c*) and with $T_{int}$=5 ms (shown on FIG. 12*d*). For both ACF and CCF cases, one can recognize that when the coherent integration time equals the code period, i.e. 1 ms, the maximal and the percentile values are quite "stable" with Doppler (FIG. 12*a* and FIG. 12*c*). However, when the coherent integration time is extended to 5 ms, an higher dynamic in the variations of the maximal values and of the percentile values for both ACF and CCF is observed (FIG. 12*b* and FIG. 12*d*). Finally, when $T_{int}$=5 ms regrowth of the ACF (resp. CCF) maxima can be observed at multiple of 1 KHz of desired (resp. interfering) Doppler residual, which corresponds to the inverse of the spreading code period (1/1 ms).

[Ref 5]: *"Impact of Galileo Spreading Code Selection and Data Rate onto Navigation Signal Interference"*. F. Soualle. ION GPS/GNSS 2003, 9-12 Sep. 2003, Portland, Oregon.

The former results highlight that the largest values of the CCF and thereof cross-correlation isolation is significantly sensitive to the Doppler, and in a more general sense to an offset, $\Delta f_{Dopp,test,p}$, of the actual received carrier frequency for the interfering signals w.r.t. carrier frequency tested for the radio signal component of interest. It is therefore now proposed to investigate how the CCF values, and the percentiles for the corresponding CCF distributions, varies over an interfering Doppler residual span, which is higher than D, when considering different types and especially spreading code lengths, L. One justification for an higher or extended, interfering Doppler residual value, out of the initial span D, is an additional offset frequency applied to the carrier frequency of the interfering signal component, w.r.t. the carrier frequency of the signal component of interest corresponding to the tested Doppler $f_{Dopp,test,0}$. This said offset frequency is the foundation of the proposed scheme described later in more details.

FIG. 13*a* represents the distribution and the cumulative distribution of the CCF calculated for an interfering Doppler residual $\Delta f_{Dopp,test,p}$ equal to 0 Hz and obtained for a family of Q=24 Gold Codes similar to the ones applied on the GPS C/A radio signal components. As for FIG. 12*c* the coherent integration time is set to $T_{int}$=1 ms with two samples per chip (U=2, $f_s=2\times f_c$). On FIG. 13*a*, the maximal CCF equal to −23.9 dB, and the 99%, 95% and 67% percentiles of the CCF distribution are also represented. FIG. 13$b$ represents now the distribution and the cumulative distribution of the CCF for an interfering Doppler residual $\Delta f_{Dopp,test,p}$=2500 Hz for the same family of 24 spreading codes. The corresponding maximal values together with the 99%, 95% and 67% percentiles of the CCF distribution are also represented. Finally on FIG. 13$c$, the variations of the corresponding maxima, the 99%, 95% and 67% percentiles are provided over a span for the interfering Doppler residual, ranging from 0 Hz to 10 KHz. Because FIG. 12$c$ showed that the behavior for negative Doppler (−8 KHz to 0 KHz) is identical as for positive Doppler (0 KHz to 8 KHz) only the positive part from 0 KHz to 10 KHz is shown on FIG. 13$c$. It can be observed that the corresponding percentile levels are quite stable. Furthermore, for the sake of later demonstration the span for the interfering Doppler residual is extended up to 10 KHz, so intentionally beyond the maximal value of 7 KHz for the "natural" Doppler residual span (+7 KHz when considering negative and positive parts) that would be obtained if the carrier frequency of the interfering signal component and the carrier frequency of the signal component of interest would be identical.

FIG. 14$a$, FIG. 14$b$ and FIG. 14$c$ represent the CCF and cumulative CCF distribution (with percentiles), also accounting for the interfering Doppler residual when the CCF is calculated for spreading codes with a shorter spreading code length L=341 chips (when compared to spreading code length L=1023 for the GPS C/A radio signal components), with $f_c$=1 MCps. The span for the interfering Doppler residual is set to −10 KHz to +10 KHz, but only the 0 KHz to 10 KHz is shown for reason of symmetry. Similarly, FIG. 15$a$, FIG. 15$b$ and FIG. 15$c$ represent the CCF and cumulative CCF distribution (with percentiles), also accounting for the interfering Doppler residual when the CCF is calculated for spreading codes with a shorter spreading code length L=31 chips. The spreading codes are also Gold-Codes but with a length of 31 chips (instead of 1023 chips), with $f_c$=1 MCps. The span for the interfering Doppler residual is set to −40 KHz to +40 KHz, but only the 0 KHz to 40 KHz is shown for reason of symmetry. For all figures, the CCF computation is based on a set of Q=24 spreading codes, yielding to 276 combinations of spreading code pairs. From FIG. 14$c$ and FIG. 15$c$, it can be observed that the curves for the 99%, 95% and 66% percentile derived from the CCF distribution show maxima for interfering Doppler residual multiple of the inverse of the Code Period: $K_{Harm}/(L\times T_c)$. For example, for L=341 Chips this corresponds to 0 Hz ($K_{Harm}$=0), 3000 Hz ($K_{Harm}$=1), 6000 Hz ($K_{Harm}$=2) and 9000 Hz ($K_{Harm}$=3). For L=31 Chips this corresponds to 0 Hz ($K_{Harm}$=0), 33 KHz ($K_{Harm}$=1). Those maxima correspond to "primary lobes", whose width equals twice the inverse of the coherent integration time, $2/T_{int}$. Between those primary lobes, "secondary lobes" having a width equal to the inverse of the coherent integration time, $1/T_{int}$ are also visible. For L=341 chips, the CCF percentiles show a strong reduction of 10 dB between primary lobes and secondary lobes, while for L=31 chips this reduction reaches an even stronger isolation of approximately 25 dB w.r.t maxima obtained for the main lobes.

It is noted that those characteristics (spacing between main lobes, shape and width of the lobes) observed for the CCF distribution as function of interfering Doppler residual are closely related to the properties of the spectral representation, and especially of the Power Spectral Distribution (PSD), of the GNSS radio signal components. The features of the corresponding GNSS PSD are now presented for different types of radio signal components structures.

Figure 16:
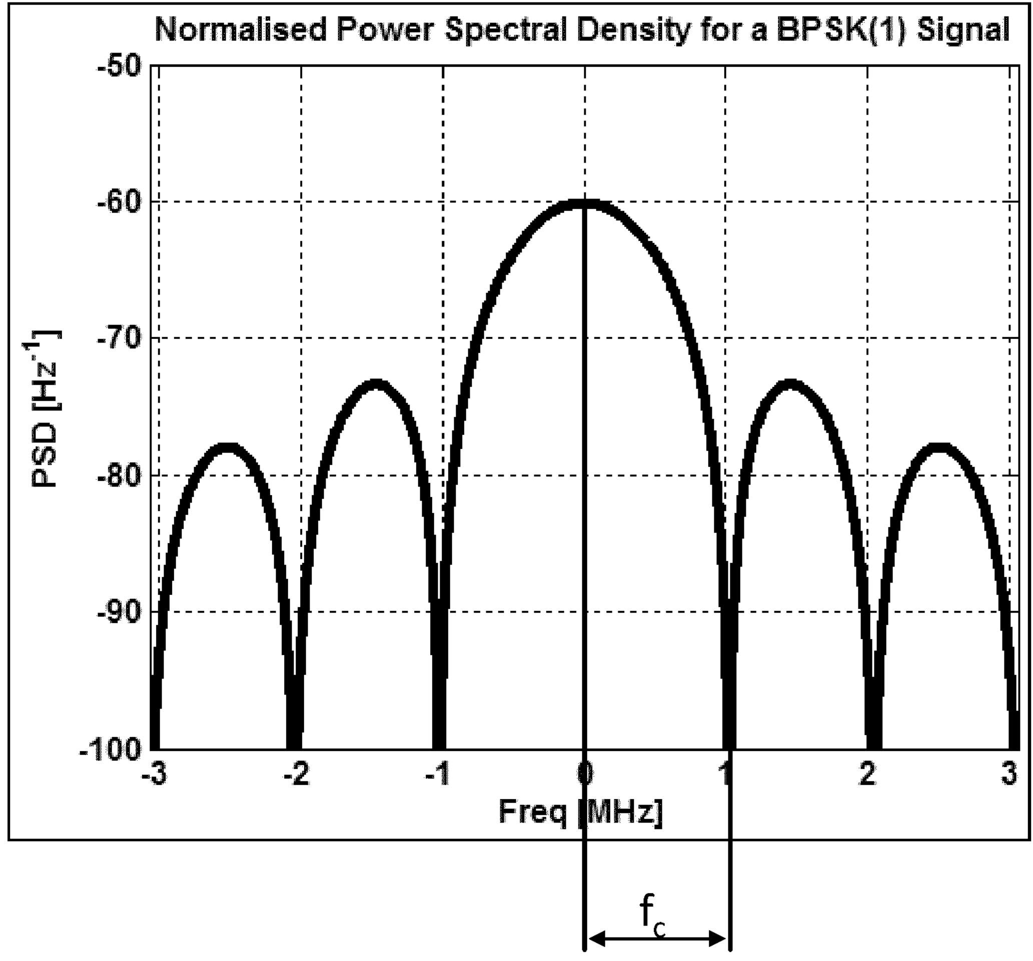
FIG. 16 provides a spectral representation, i.e. PSD, of a GNSS signal, generated with a spreading code having a very long or infinite length ($L\rightarrow\infty$), modulated with a BPSK(1) waveform.

First, FIG. 16 provides a spectral representation, i.e. PSD, of a GNSS radio signal component, generated with a spreading code having a very long or infinite length ($L\to\infty$), modulated with a BPSK(1) waveform. It is shown in [Ref 5] that the analytical expression for this specific normalized PSD is given by $\Gamma_c(f)=(1/f_c)\times\mathrm{sinc}^2(f/f_c)$. Because it is assumed that the spreading code has an infinite length, the resulting PSD is smooth. It is underlined that even for an infinite or very long spreading code length it is still possible to apply a data modulation onto the signal.

Figure 17A:
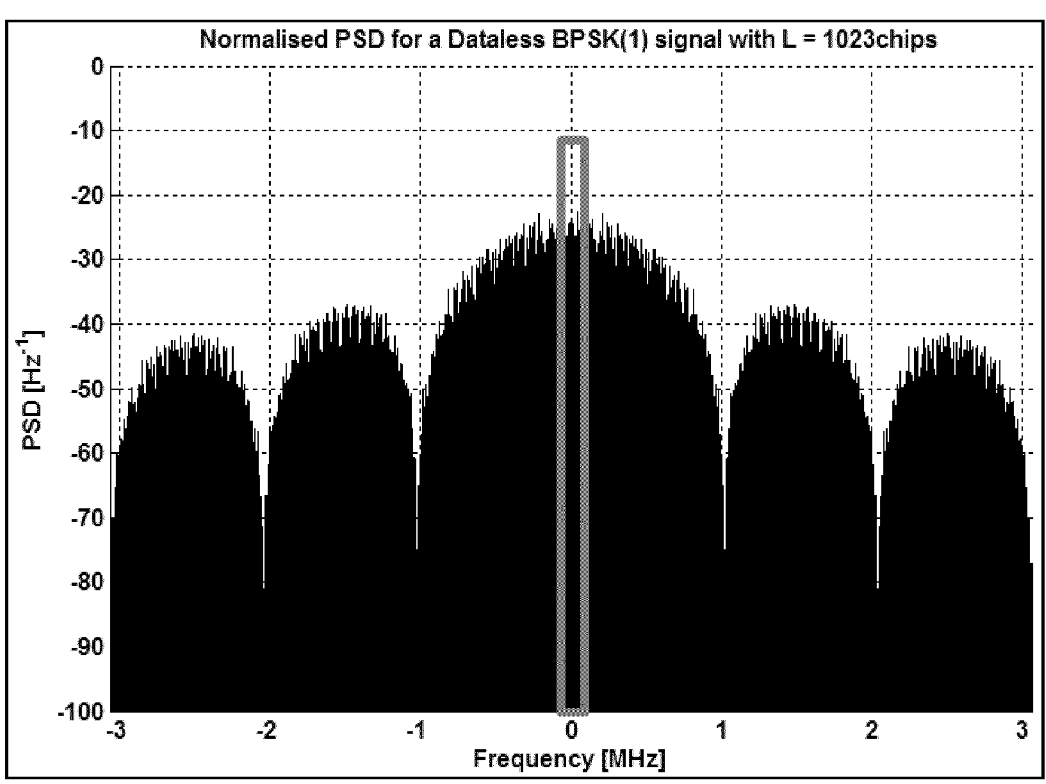
FIG. 17*a* and FIG. 17*b* provide the spectral representations, i.e. PSDs, at two different scales of a GNSS Pilot radio signal component modulated with a BPSK(1) waveform, and having a spreading code length of 1023 chips.
Figure 17B:
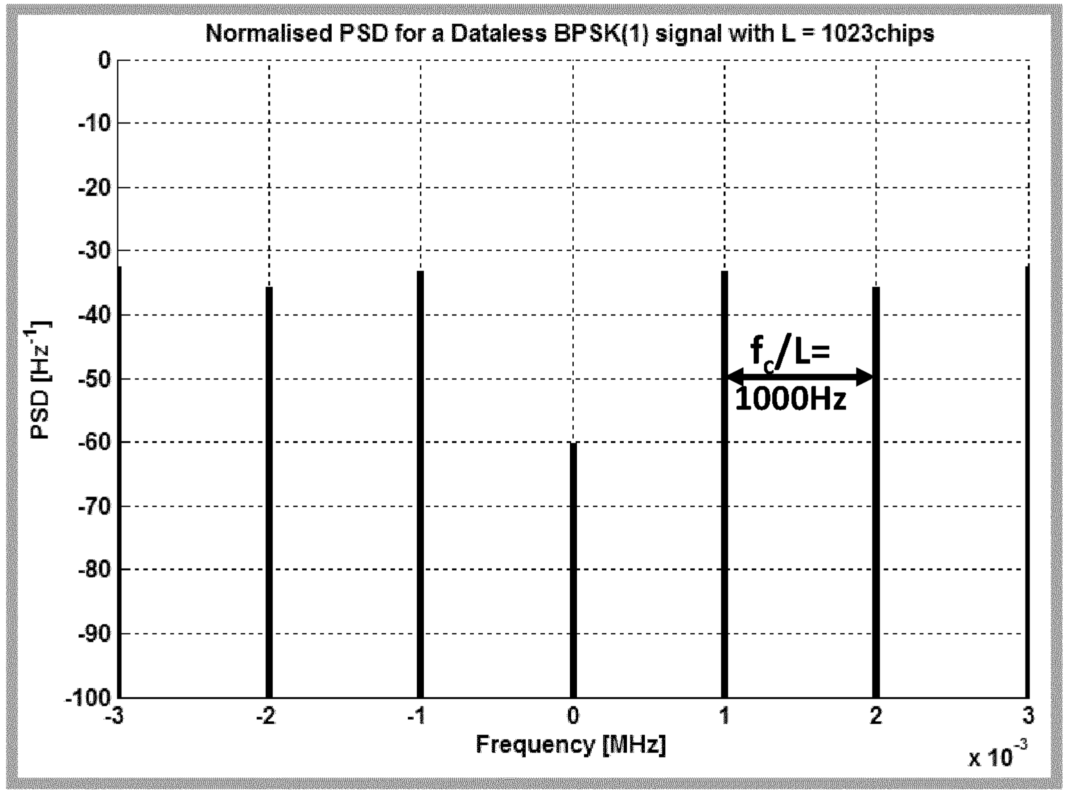

FIG. 17$a$ and FIG. 17$b$ provide spectral representations, i.e. PSDs, of a GNSS radio signal component modulated with a BPSK(1) waveform, and having a finite spreading code length, and shown at two different frequency scales. For this case, it is assumed that the GNSS radio signal component is a Pilot (i.e. dataless) radio signal component, applying a spreading code comprising L=1023 chips of $T_c$=(1/1.023E6) s chip duration. Due to the code periodicity, the PSD is constituted of spectral lines, also called spikes in the following embodiments of the present invention and spaced by the inverse of the code period, equal to $1/(L\times T_c)=f_c/L$=1 KHz for the proposed example, as shown on FIG. 17$b$. The peaks of the corresponding spectral lines, or spikes, however follow the envelop shape given by the $\Gamma_c(f)$ expression (see also [Ref 5]).

Figure 18A:
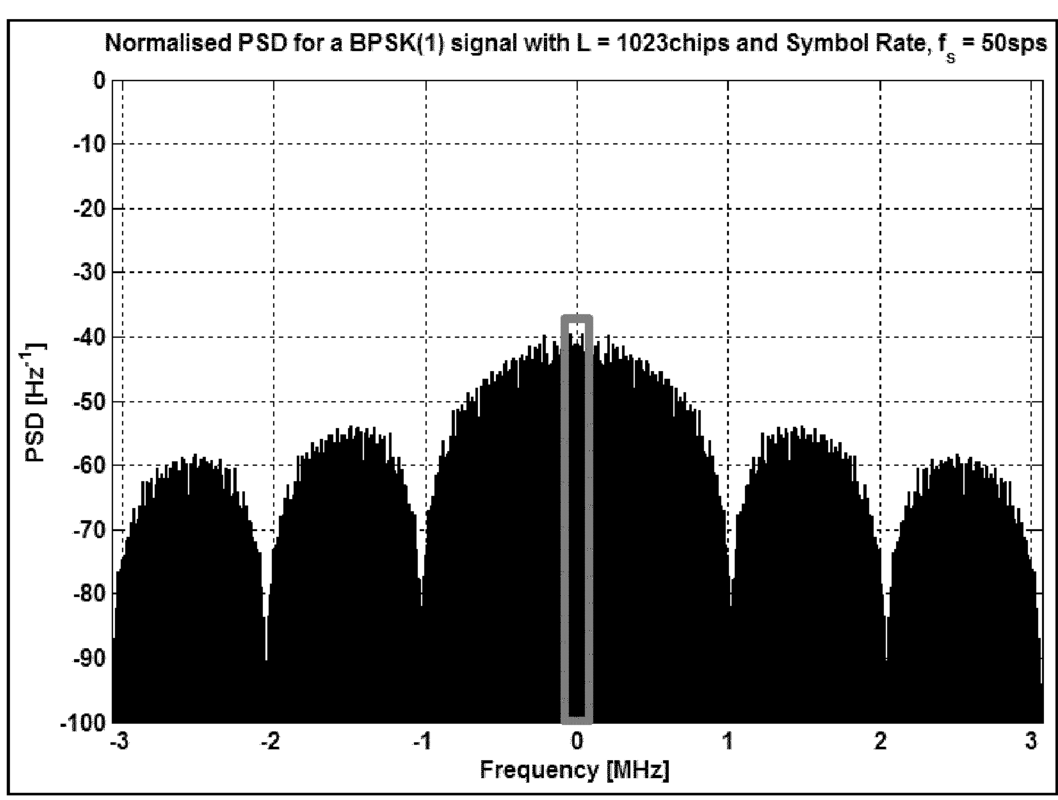
FIG. 18*a* and FIG. 18*b* provide the spectral representations, i.e. PSDs, at two different scales of a GNSS radio signal component for data transmission, modulated with a BPSK(1) waveform, and having a spreading code length of 1023 chips. Here a symbol duration of Ts=20 ms is modulated onto the spreading code, yielding to a symbol rate of $f_s$=50 sps.
Figure 18B:
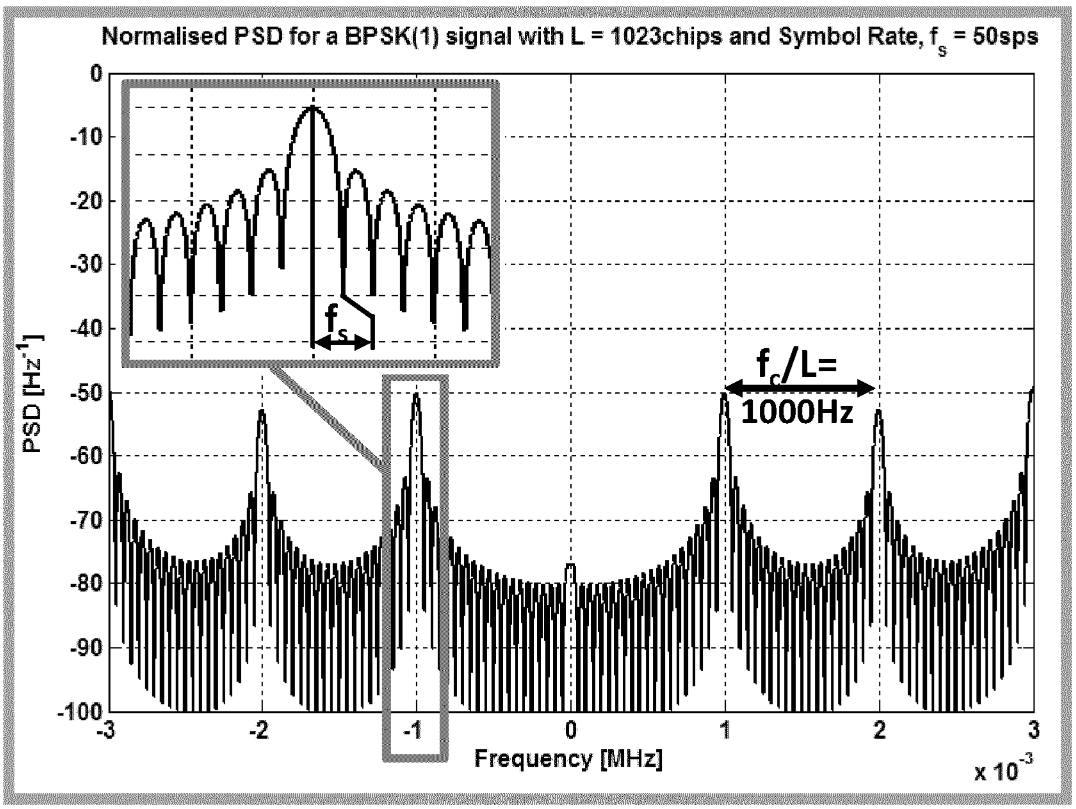

FIG. 18$a$ and FIG. 18$b$ provide spectral representations, i.e. PSDs, of a GNSS radio signal component modulated with a BPSK(1) waveform, again shown at two different frequency scales. Contrarily to FIG. 17$a$, the GNSS signal is modulated with symbols, yielding to a radio signal component for data transmission, and with a symbol rate $f_s$ equal to 50 sps, and still applying a spreading code comprising L=1023 chips of $T_c$=(1/1.023E6) s chip duration. To obtain the PSD of such a radio signal component for data transmission, each of the spectral line or spike of the PSD of the corresponding data-less or Pilot radio signal component, having the same waveform and spreading code, is replaced with the equivalent PSD of the symbol modulation, and with a proper scaling to guarantee actual power, as shown on FIG. 18$b$. Here, the analytical expression of PSD of the symbol modulation is $\Gamma_s(f)=(1/f_s)\times\mathrm{sinc}^2(f/f_s)$.

Figure 19A:
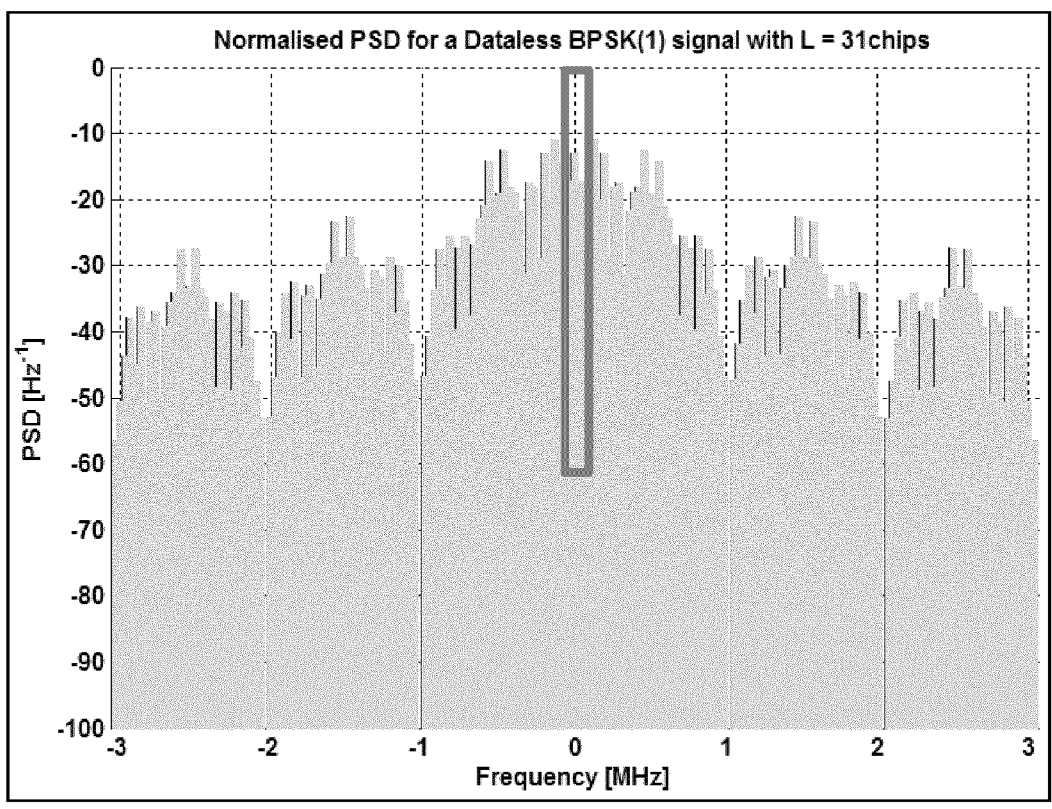
FIG. 19*a* and FIG. 19*b* represent the PSDs of $P_v$ GNSS Pilot radio signal components, transmitted at the same carrier frequency, $f_{central}$, and having a spreading code length L=31 chips, and which are received by a terrestrial GNSS receiver.
Figure 19B:
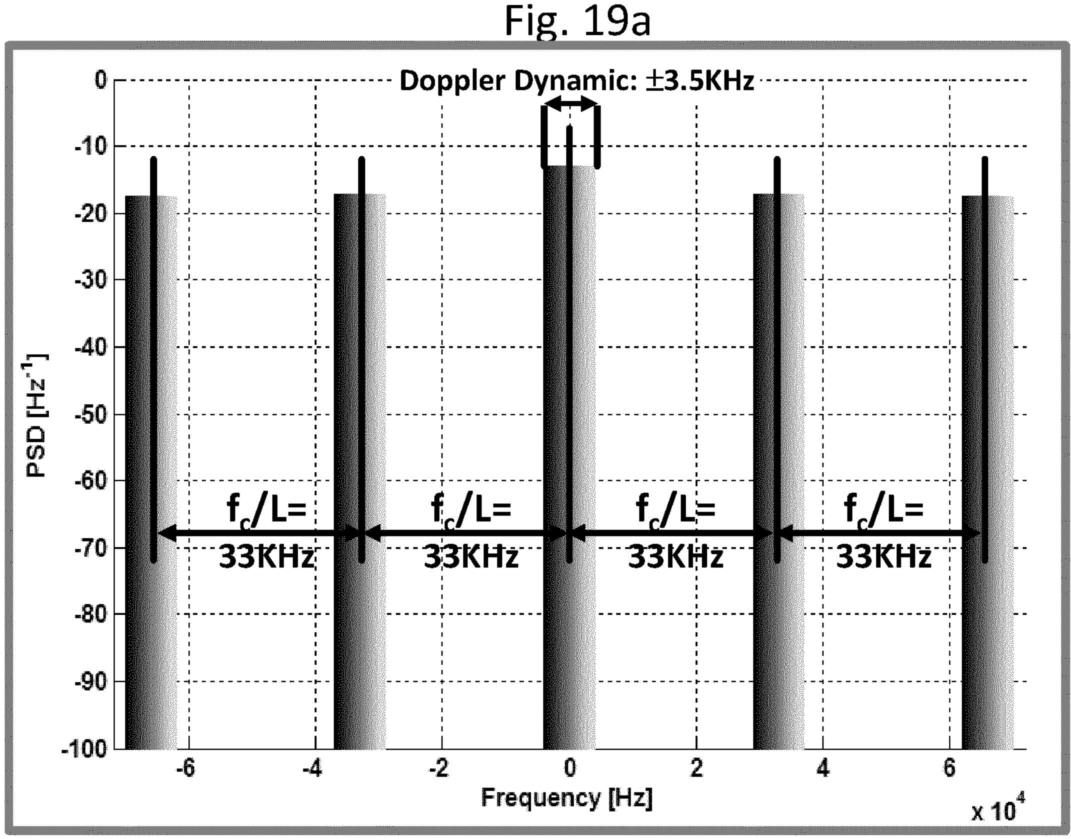
Figure 20A:
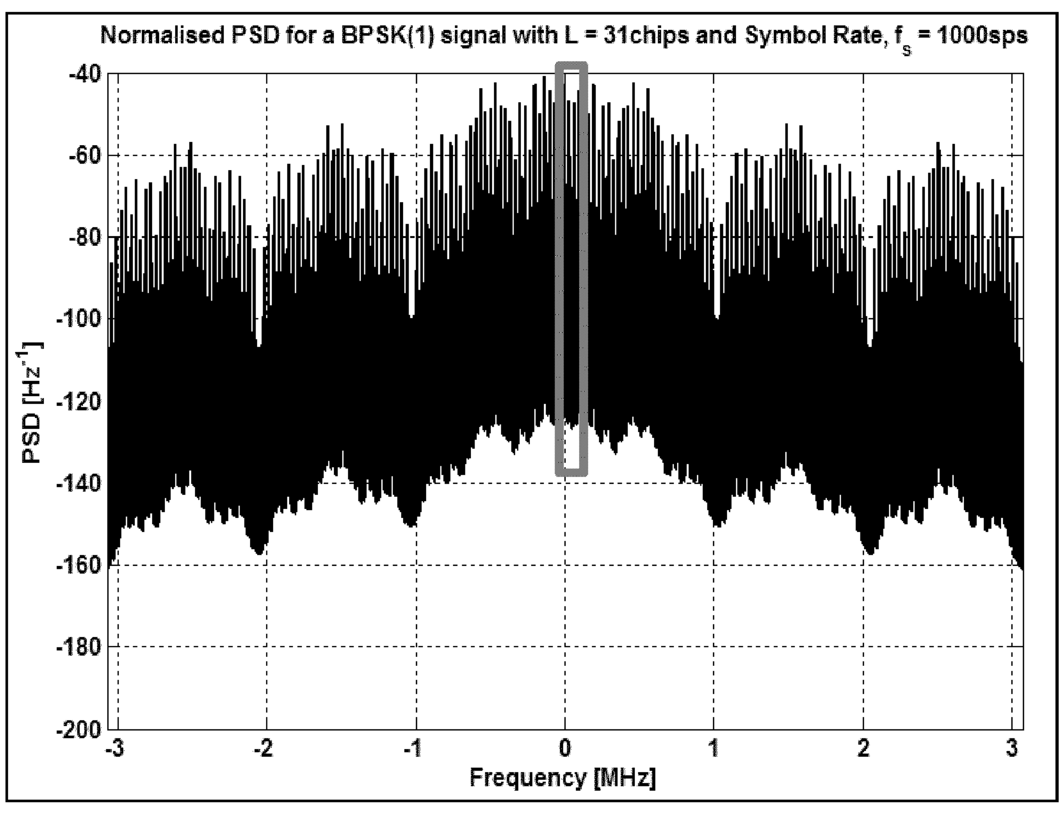
FIG. 20*a* and FIG. 20*b* represent the PSDs of $P_v$ GNSS radio signal components for data transmission with a symbol rate $f_s$=50 sps, transmitted at the same carrier frequency, $f_{central}$, and having a spreading code length L=31 chips, and which are received by a terrestrial GNSS receiver.
Figure 20B:
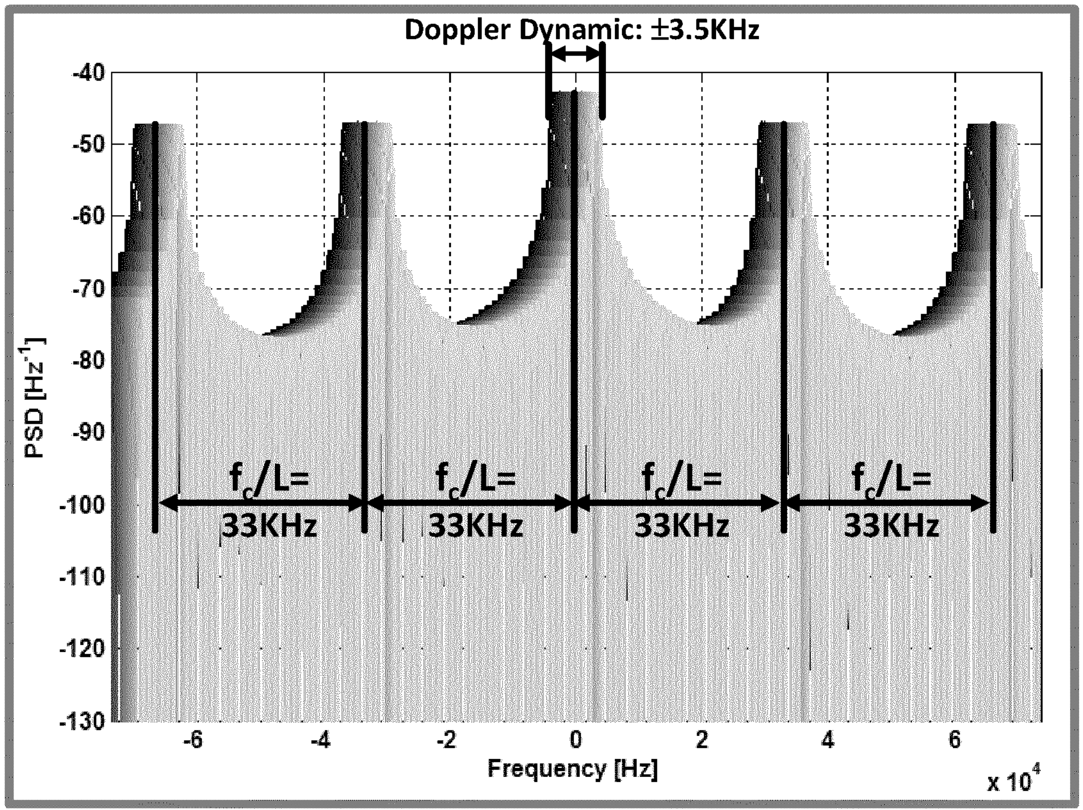

FIG. 19$a$ and FIG. 19$b$ represent at two different scales the PSDs of P GNSS Pilot radio signal components, transmitted at the same carrier frequency, $f_{central}$, and received by a terrestrial GNSS receiver, and with a spreading code length L=31 chips. FIG. 19$b$ (spectral zoom) shows the variations caused by the Doppler offset of the P observed Pilot radio signal components whose spikes belong to a frequency interval located at ±3.5 KHz w.r.t. the central frequency and also w.r.t. the harmonics placed at the inverse of the spreading code period (eq. spreading code duration) ($K_{Harm}\times$33 KHz). Similarly, FIG. 20$a$ and FIG. 20$b$ represent at two different scales the PSDs of P GNSS radio signal components for data transmission having the same central carrier frequency, $f_{central}$, and received by a terrestrial GNSS receiver, with a spreading code length L=31 chips, and now modulated with a symbol rate of $f_s$=1 Ksps. FIG. 20$b$ (spectral zoom), shows the variations caused by the observed Doppler span of ±3.5 KHz, of the central frequency of individual spikes, once replaced with the $\Gamma_s(f)=(1/f_s)\times\mathrm{sinc}^2(f/f_s)$ PSD, corresponding to the symbol modulation. FIG. 19$b$ and FIG. 20$b$ clearly show the spectral overlap at a lower scale of the corresponding individual PSDs due to possible observed Doppler collisions, i.e. when two different satellites are observed with the same Doppler. To avoid such collisions yielding to MAI, one fundament of the present invention therefore consists in implementing a synthetic or "artificial" frequency offset, different per radio transmitter, which will enable to interleave the spikes of the spectral representations between the different radio transmitters.

Having described the main features of the PSDs of different types of GNSS radio signal component, it is now proposed to relate those characteristics to the ones of the CCF depending on the interfering Doppler residual, or more generally any frequency residual between the observed Doppler frequency of the received interfering radio signal component and the tested frequency of the replica corresponding to the radio signal component of interest. In [Ref 5], it is demonstrated that a correspondence exists between the CCF between the replica and interfering signals evaluated over a coherent integration time, $T_{int}$, and the convolution between the spectral representations of the replica and of the interfering signal component. The following derivations provide the main steps to forge this relationship. First, u(t) (resp. v(t)) represents the analytical expression for the time domain representation of the replica (resp. interfering) signal component. The correlation function between the replica and interfering signals, calculated over a coherent integration time, $T_{int}$, and depending on the code delay τ can then be expressed as follows:

$$CCF(\tau) = \int_0^{T_{int}} u(t)\times v^*(t-\tau)dt = \int_0^{T_{int}} u(t)\times w(t)dt, \quad \text{with } w(t) = v^*(t-\tau) \tag{14}$$

Furthermore, the Fourier Transform (FT) for the product of both signal components, and depending on the frequency υ can be expressed as the convolution of the individual Fourier Transforms.

$$FT(u\times w)[v] = \int_0^{T_{int}} u(t)\times w(t)\times e^{j2\pi vt}dt = TF(u)\otimes TF(w)[v] = \int_{-B/2}^{B/2} U(f)\times W(f-v)df = \int_{-B/2}^{B/2} U(f)\times V^*(f-v)\times e^{j2\pi f\tau}df \tag{15}$$

In those expressions B represents the two-sided bandwidth of the receiver front-end filter. For υ is 0, it is possible to recognize the relationship between the time domain correlation and the spectral representation (i.e. PSDs) of the individual signal components, which could also be derived from the Gabor's theory.

$$CCF(\tau) = \int_0^{T} u(t)\times v^*(t-\tau)dt = \int_{-B/2}^{B/2} U(f)\times V^*(f)\times e^{j2\pi f\tau}df \tag{16}$$

If a Doppler affects the interfering signal v(t), this Doppler will be perceived as a shift of the spectral representation V(f) (which depends of the code delay τ through (14)). In the case when both spectral representations of the signal replica (u(t)) and interfering signal (v(t)) comprise spikes spaced by the inverse of the spreading code duration (assumed identical for both signals for simplification), then a frequency offset, for example caused by Doppler or any other "synthetic" frequency offset, applied to the spectral representation of the interfering signal such that those spikes "fall" between the spikes of the spectral representation of the signal replica will yield to a strong reduction, if not eradication, of the cross-correlation effects, or equivalently a strong improvement of the cross-correlation isolation, and based on the former analytical expression. The former high-level mathematical derivations explain the principle that will be exploited by the proposed embodiment of the invention to reduce the MAI between different received signals.

Figures 15A, 15B, 15C:
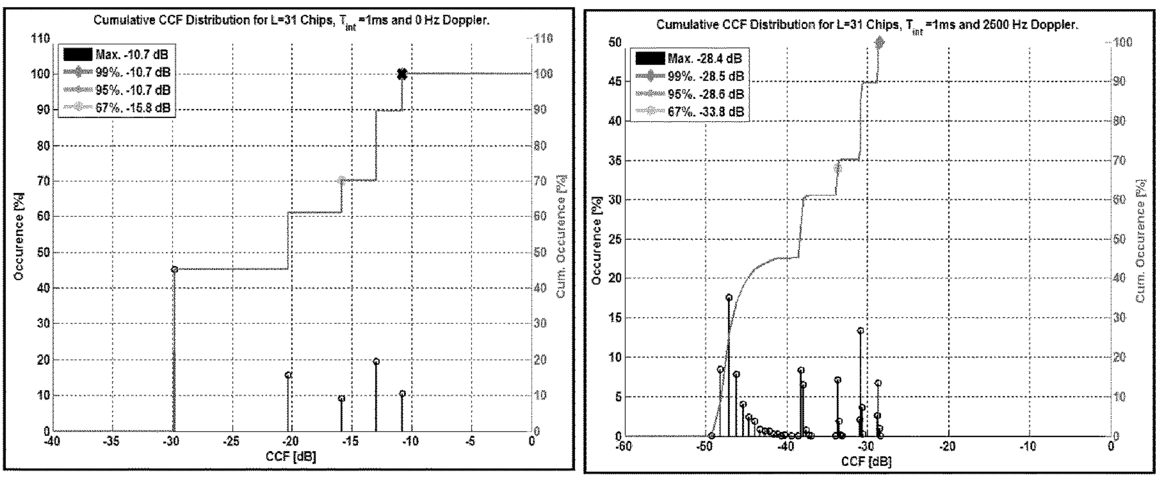
FIG. 15*a*, FIG. 15*b* and FIG. 15*c* represent respectively the CCF distribution, cumulative CCF distribution together with the corresponding percentiles when the CCF is calculated for an interfering Doppler residual $\Delta f_{Dopp,test,p}$ equal to 0 Hz and obtained for a family of Q=24 spreading codes with a shorter spreading code length L=31 chips (FIG. 15*a*), the CCF distribution, cumulative CCF distribution together with the corresponding percentiles when the CCF is calculated for an interfering Doppler residual $\Delta f_{Dopp,test,p}$ equal to 2500 Hz for the same code family (FIG. 15*b*), and finally the variations of the corresponding maxima, the 99%, 95% and 67% percentiles are provided over a Doppler span, ranging from 0 Hz to 10 KHz (FIG. 15*c*).
Figure 21:
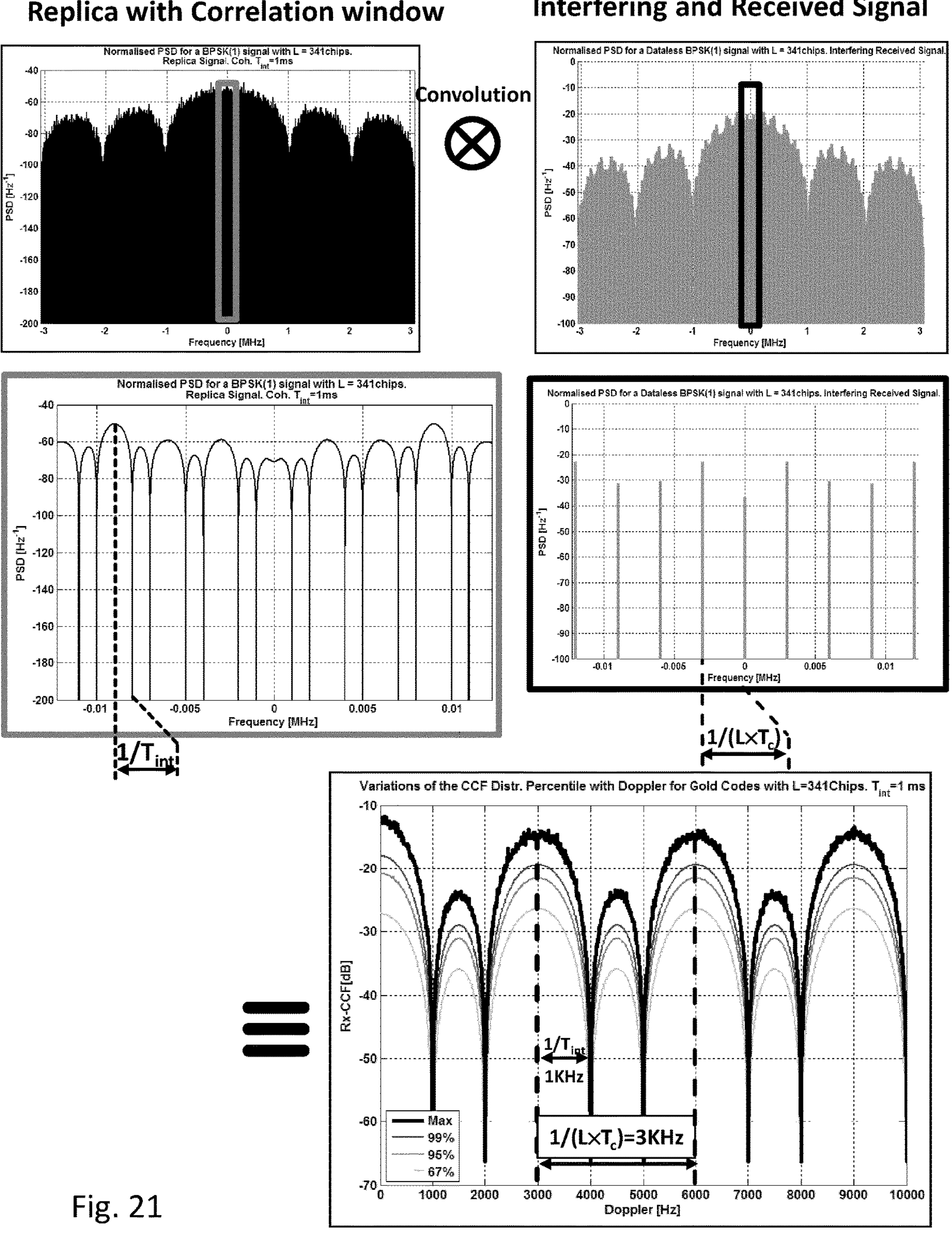
FIG. 21 provides graphical elements to justify the relationship between the different Doppler dependent percentiles of the CCF (shown in the lower part), and the spectral representation (i.e. PSDs) of the radio signal components for the (received and) interfering signal, and of the replica signal, as function of the interfering Doppler residual (shown in the upper part).

FIG. 21 further illustrates the former mathematical justification for the behavior observed on the cross-correlation function depending of a frequency offset, such as a Doppler one, and shown on FIG. 14*c* and FIG. 15*c*. [Ref 5] states that the spectral representation for the signal replica is obtained by replacing each spectral line of the spectral representation for the equivalent Pilot radio signal component, with the spectral representation corresponding to the time windowing, corresponding to the coherent integration time, with expression $\Gamma_w(f)=(T_{int})\times\text{sinc}^2(f\times T_{int})$, as shown on the medium left part of FIG. 21. For the proposed example with $T_{int}$=1 ms and $\Gamma_w(f)$ shows a main lobe of 2 KHz width, and secondary lobes of 1 KHz width. Considering a Pilot interfering radio signal component, then its spectral representation is constituted of spectral lines, as shown on the left part of FIG. 21. For the proposed example with L=341 chips and a BPSK(1) modulation the distance between spectral lines equals 3 KHz. On the lower figure representing the Doppler residual-dependent percentiles of the CCF distribution (same figure as FIG. 14*c*), the former visual elements (main lobes spaced by $1/(L\times T_c)$=3 KHz, and with a 2 KHz width) can be recognized, which can explain the aforementioned correspondence to FIG. 14*c*.

The following paragraph explains the adaptation of the former statements for the acquisition of radio signal components comprising spreading codes modulated with symbols, each symbol having a duration $T_s$, in which case the coherent integration time, $T_{int}$, used to compute the cross-correlation may be limited by the symbol duration $T_s$. For this case, it is assumed that the $P_v$ received radio signal components for data transmission are modulated with symbols, with a symbol rate $f_s$, possibly with different values between the different radio signal components. For the acquisition of a radio signal component for data transmission, the coherent integration time used to compute the correlation function cannot exceed the symbol duration, $T_s=1/f_s$ ($T_{int}\leq T_s$), else symbol transitions occurring within the coherent integration time would strongly reduce the integrated energy. The spectral representation for the replica is obtained by replacing each spectral line, or spike, of the equivalent Pilot signal with a PSD, $\Gamma_w(f)$, derived with $T_{int}\leq T_s$. The spectral representation of the interfering radio signal component for data transmission is obtained as explained in the description of FIG. 18*a* and FIG. 18*b*: each spectral line, or spike, of the interfering radio signal component is then replaced with a PSD with expression $\Gamma_s(f)=(1/f_s)\times\text{sinc}^2(f/f_s)$. Re-using the principle of convolution of both spectral representations to evaluate the percentiles of the CCF distribution in dependency of interfering Doppler residual, enables to deduce that the main lobes of the Doppler-dependent percentiles of the CCF distribution are still spaced by $1/(L\times T_c)$, but now the main lobes are replaced by the product $\Gamma_w(f)\times\Gamma_s(f)$. When $T_{int}$ takes its maximal authorized value $T_{int}=T_s$, the main lobes are therefore replaced with the function $(\Gamma_s(f))^2$.

The following paragraphs will especially serve justifying the method to assign and apply before transmission of each radio signal component, a frequency offset, ($\Delta f_{carr,p}$, 1≤p≤P) relative to a central carrier frequency ($f_{central}$), to said data signal carrier of said radio signal component to obtain a data signal carrier having a data signal carrier frequency ($f_{car,p}=f_{central}+\Delta f_{carr,p}$) with a frequency offset ($\Delta f_{carr,p}$, 1≤p≤P) said frequency offset corresponding to said radio signal component of a plurality of signal components.

The former results highlight that the cross-correlation isolation is significantly sensitive to the interfering Doppler residual, $\Delta f_{Dopp,test,p}$, of the observed Doppler frequency for the interfering signals w.r.t. the Doppler frequency tested in the generated local replica corresponding to the radio signal component of interest. This observation is the basis for the proposed embodiment of the invention. In more particular by applying a method to increase the difference between the actual observed Doppler frequency of the interfering signals w.r.t. Doppler frequency tested for the radio signal component of interest, it is possible to improve even more the corresponding cross-correlation isolation. The solution proposed to take benefit of this property consists then to apply a frequency offset, $\Delta f_{carr,p}$, preferably small (compared to the chip rate) at the transmission to the nominal, or central, carrier frequency of the interfering radio signal components, offset depending on the transmission source. i.e. satellite (but also on the signal component identifier in case each transmission source transmits several signal components). The application of the frequency offset, $\Delta f_{carr,p}$, to the central carrier, $f_{central}$, yields to the offset carrier frequency, $f_{carr,p}$, also referred as data signal carrier frequency. Furthermore, the order of magnitude of the offset also depends on the requested cross-correlation isolation obtained for a given spreading code family.

The following paragraphs explain the formal method used to the design background for the frequency offset $\Delta f_{carr,p}$ to each of the P signal components, and being smaller than said chip rate of said spreading code, and that said frequency offset value depends on a specified cross-correlation isolation applied to each of the cross-correlation function values calculated with a local replica of said data signal component comprising a spreading code corresponding to said signal component of interest and each of the further interfering radio signal components of said plurality of received radio signal components, in that said cross-correlation function values is also calculated for the interfering Doppler residual values computed as the difference between the tested Doppler hypothesis, also accounting for said receiver oscillator stability, ($D_{oscil,Rx}$), and said observed Doppler offset ($D_{TRX1}, \ldots, D_{TRXP}$) for each of the further interfering radio signal components of said plurality of radio signal components, extended with the frequency offset corresponding to said further interfering radio signal component.

The following equation provides the expression of the transmitted radio signal component $u_p(t)$ of index p, based on equation (1) and obtained when applying the frequency offset, $\Delta f_{carr,p}$ within the argument of a complex exponential, yielding to a complex carrier offset.

$$u_p(t) = \sqrt{P_p^{Tx}}\, d_p(t) g_p(t) e^{j(2\pi\Delta f_{carr,p} t + \varphi_{p,init})} \tag{17}$$

In the former expression $u_p(t)$ possibility is given, with the term $d_p(t)$, to also modulate symbols to obtain a radio signal component for data transmission. For a pilot radio signal component the term $d_p(t)$ would not exist.

The following equation provides then the expression of the aggregated received signal s(t), when applying a different frequency offset, $\Delta f_{carr,p}$, to each of the $P_v$ received signals. Per convention, and only for the sake of easing the understanding, it is proposed that the frequency offset, $\Delta f_{carr,0}$, applied to the radio signal component of interest, with index 0, is null, yielding $\Delta f_{carr,0}=0$.

$$s(t) = \sum_{p=0}^{P_v-1} \sqrt{P_p^{Rx}}\, d_p(t-\tau_p) g_p(t-\tau_p) e^{j(2\pi(f_{Dopp,p}+\Delta f_{carr,p})t+\varphi_p)} + n(t) \tag{18}$$

In order to formally justify the expected (normalized) correlation performances achieved with the proposed scheme, the frequency offset, $\Delta f_{carr,p}$ applied to the $p^{th}$ interfering radio signal component is thus also introduced into the expression of the (normalized) CCF (see (10)) representing the effect of the Mutual Access Inference (MAI) onto the acquisition detector output for the radio signal component of interest.

$$r_{c,p}(p_p, \Delta f_{Dopp,test,p}, \Delta f_{carr,p}) = \frac{1}{U\times L}\sum_{n=1}^{U\times L} R_p(n, p_p)\times \overline{c}_p, \left\lfloor\frac{n}{U}\right\rfloor c_0\left\lfloor\frac{n}{U} - p_p\right\rfloor e^{j(2\pi(\Delta f_{Dopp,test,p}+\Delta f_{carr,p})nT_{samp}+\varphi_{test,p})} \tag{19}$$

The term $e^{j(2\pi(\Delta f_{Dopp,test,p}+\Delta f_{carr,p})nT_{samp}+\varphi_{test,p})}$ would not affect significantly the native properties of the Cross-Correlation function as long as the argument of the complex exponential, $(2\pi(\Delta f_{Dopp,test,p}+\Delta f_{carr,p})nT_{samp}+\varphi_{test,p})$, does not vary substantially over the coherent integration time, $T_{int}$ (covering increment interval varying between n=1 and U×L). If this condition is not fulfilled additional losses (called Code-Misalignment losses in the case of an Auto-Correlation-Function) arise. Objective of the embodiment of the present invention is exactly to exploit those (larger) losses to enhance the CCF isolation. The analytical expression for those losses is identical in the case of a Cross-Correlation Function with when extending the interfering Doppler residual $\Delta f_{Dopp,test,p}$ with $\Delta f_{carr,p}$:

$$L_{Dopp}(\Delta f_{Dopp,test,p}) = \left(\frac{\sin(\pi T_{int}(\Delta f_{Dopp,test,p}+\Delta f_{carr,p}))}{\pi T_{int}(\Delta f_{Dopp,test,p}+\Delta f_{carr,p})}\right)^2 \tag{20}$$

This expression highlights that by adding a frequency offset $\Delta f_{carr,p}$ to the Interfering Doppler residual, $\Delta f_{Dopp,test,p}$ (calculated for an un-offset carrier frequency) it is possible to increase significantly the Doppler mis-alignment losses and therefore to improve the CCF isolation. Furthermore, expression (20) also shows the behavior of the maximal but also the percentiles of the CCF distribution, when depending on $(\Delta f_{Dopp,test,p}+\Delta f_{carr,p})$, and especially a main lobe width ("from zero to zero") of $2/T_{int}$, together with second lobes with a width of $1/T_{int}$ can be deduced.

When applying a frequency offset, the name (extended) Interfering Doppler residual, will refer to the sum of the formerly introduced Interfering Doppler residual, $\Delta f_{Dopp,test,p,f_{central}}$, when calculated for a transmitted frequency $f_{central}$ (i.e. $f_{carr,p}$ without frequency offset, see also (eq. 13)), and of the frequency offset $\Delta f_{carr,p}$:

$$\Delta f_{Dopp,test,p} = \Delta f_{Dopp,test,p,f_{central}} + \Delta f_{carr,p} \tag{21}$$

To derive this expression it is assumed that the additional contribution of the frequency offset $\Delta f_{carr,p}$ to the central carrier frequency has a negligible impact onto the observed Doppler offset: $f_{Dopp,p}$ calculated for $f_{central}+\Delta f_{carr,p}$ is approximated to $f_{Dopp,p}$ calculated for $f_{central}$ thus yielding to $\Delta f_{Dopp,test,p,f_{central}+\Delta f_{carr,p}} \approx \Delta f_{Dopp,test,p,f_{central}}$. This approximation could however be released (yielding to an exact determination of the actual observed Doppler offset calculated with the exact transmitted carrier frequency with offset, $f_{central}+\Delta f_{carr,p}$) without modifying the main conclusions of the embodiments. Finally, in the following the term Interfering Doppler residual might be applied in place of (extended) Interfering Doppler residual for sake of readiness, as the following statements correspond to the case when a frequency offset is applied. When deemed necessary distinction will be made, according to the context.

To conclude, the function representing respectively the maximal and the percentile values of the CCF distribution (CCF calculated between the local replica and each of the interfering radio signal component) and depending on the (extended) interfering Doppler residual, $\Delta f_{Dopp,test,p}$, will have similar characteristics as the spectral representations of the corresponding interfering signal components, with main lobes distant of $1/(L\times T_c)$, with a main lobe width equal to $2/T_{int}$ for the pilot signal and equal to the smallest value between $2/T_{int}$ and $2\times f_s$ for a data modulated signal, and finally width a secondary lobe width equal to $1/T_{int}$ for the pilot signal and equal to the smallest value between $1/T_{int}$ and $f_s$ for a data modulated signal.

Figure 22:
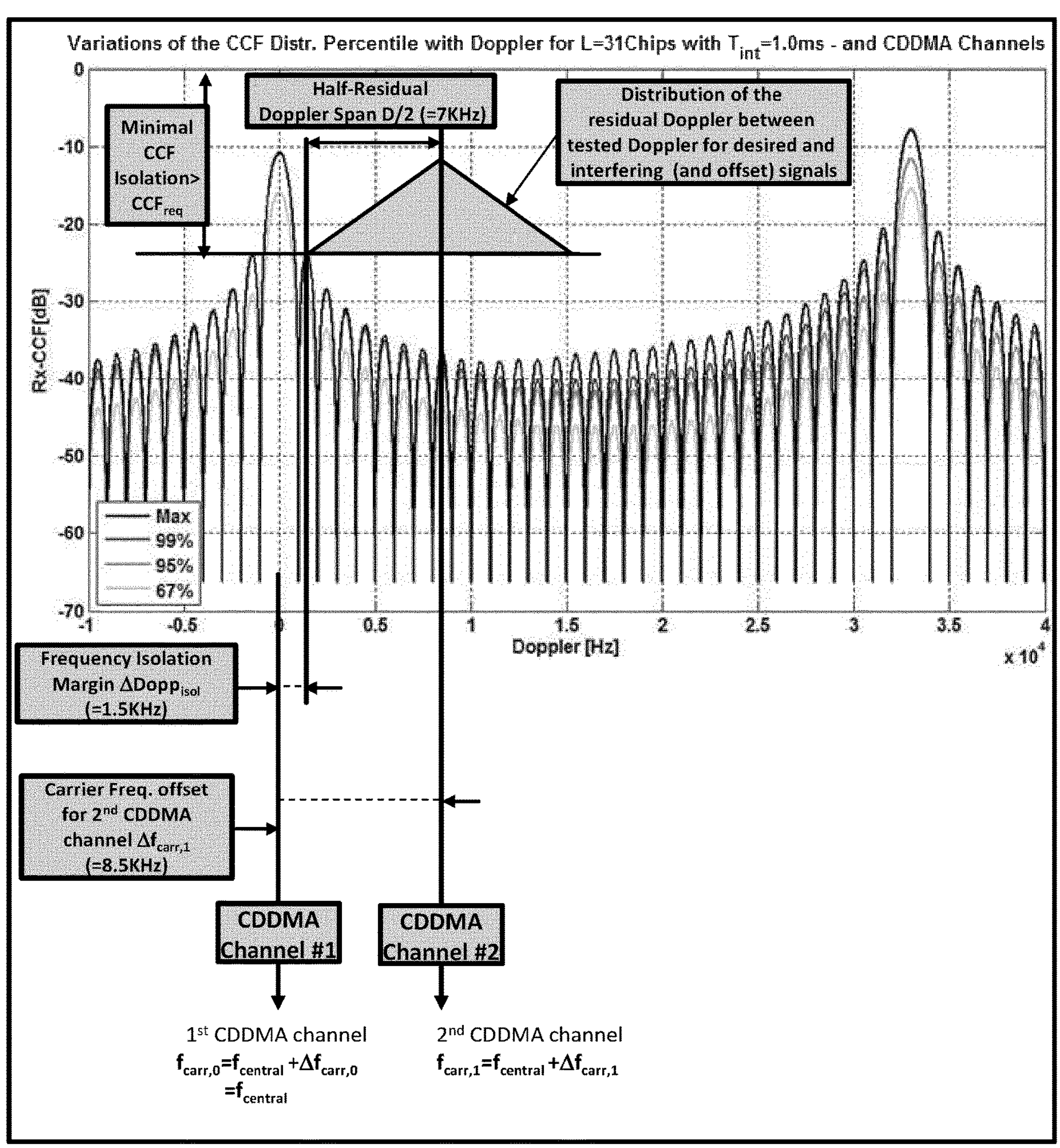
FIG. 22 provides graphical elements to explain the principle of the assignment of 2 CDDMA carriers when considering radio signal components generated with 2 spreading codes having the same length of 31 chips, and based on the variations of the percentiles of the distributions for the CCF computed with a coherent integration time of 1 ms, as function of the (extended) interfering Doppler residual corresponding to satellite-to-radio receiver link dynamic for MEO satellites such as the Galileo ones, and also accounting for the frequency offset.

FIG. 22 describes the construction for the proposed solution, called Code Doppler Division Multiple Access (CDDMA) scheme, based on the maximal CCF value, $CCF_{max}(\Delta f_{Dopp,test,p})$, obtained for each (extended) Interfering Doppler residual value, $\Delta f_{Dopp,test,p}$ and over all $Q\times(Q-1)/2$ pairs of spreading codes, and all possible code delay shifts, $(\tau_p-\tau_{test,0})$. The objective is to offset the carrier frequency of each of the P GNSS signals, in such a way that the CCF taken at the (extended) interfering Doppler residual is not higher than a minimal and required CCF isolation, called $CCF_{req}$. It means that by applying a different offset to the carrier frequency of each of the P GNSS signals one can guarantee that the CCF will never exceed $CCF_{req}$, over the different combination of $Q\times(Q-1)/2$ pairs of spreading codes, over all possible code delay shifts, $(\tau_p-\tau_{test,0})$ and over the complete span of (extended) Interfering Doppler residual. This very strict definition will ensure the best possible isolation, but will have some negative impact onto the Multiple Access capacity (i.e. limit the number $P_v$ of signals that can be simultaneously received with such required CCF isolation, and therefore the overall number of P of radio signal components). It is possible to relax the corresponding condition regarding the CCF isolation by not considering the maximal value of the CCF over the (extended) Interfering Doppler residual, $\Delta f_{Dopp,test,p}$, but rather a percentile of the CCF distribution, such as the 99% $(CCF_{99\%}(\Delta f_{Dopp,test,p}))$, 95% $(CCF_{95\%}(\Delta f_{Dopp,test,p}))$ or 66% $(CCF_{66\%}(\Delta f_{Dopp,test,p}))$ percentile. As an example, by considering the 95% percentile, instead of the maximum, then by applying an offset to the carrier frequency of each of the P GNSS signals one can guarantee that the proportion of CCF values which will exceed the $CCF_{req}$ requirement (equal to $CCF_{99\%}(\Delta f_{Dopp,test,p})$ in the proposed example) will never exceed 5% of the whole CCF values, over the different combinations of $Q\times(Q-1)/2$ pairs of spreading codes, over all possible code delay shifts, $\tau_p-\tau_{test,0}$ and over the complete span of (extended) Interfering Doppler residual. The same principle applies for the 99% or 66% or any other percentiles of the CCF distribution per Doppler, XX %. This relaxation then enables to increase the number of radio signal components, P. In the following, the method used to determine the frequency offsets to be applied to the transmitted carrier frequencies to each of the P radio signal components, will be applied to the maximum CCF for the target or specified CCF isolation, $CCF_{req}$, over the span of (extended) interfering Doppler residual, $CCF_{max}(\Delta f_{Dopp,test,p})$. However, the same methodology can be applied when considering any other percentile of the CCF distribution over the (extended) interfering Doppler residual $CCF_{XX\%}(\Delta f_{Dopp,test,p})$, as target or specified CCF isolation. Furthermore, it is usual to specify the cross-correlation isolation values between −30 dB and −15 dB, when this cross-correlation isolation is defined for the maxima of CCF distribution and for radio signal components transmitted by GNSSs. However, alternatives (either more relaxed or stringent values) for the specified cross-correlation isolation can be proposed for other types of radio navigation systems, and supported services, such as terrestrial radio navigation systems having other order of magnitudes for the number of radio transmitters, Q, but also other specified levels of ranging and positioning performance.

For illustration it is proposed to consider the following design parameters with a spreading code length, L=31 chips, a chip rate of $f_c$=1 MCps, and a coherent integration time $T_{int}$=1 ms. On FIG. 22, it is considered that the transmitted carrier frequency for the radio signal component of interest equals 0 Hz (i.e. the carrier offset $\Delta f_{carr,0}=0$), once down-converted into base-band. The radio signal component of interest can be selected among the $W_v$ received signals as part of the $P_v$ visible ones. For illustration the signal component of interest is selected as the first CDDMA carrier frequency, whose exact definition is given later. The same principle and explanation would however be still valid for the selection of another CDDMA carrier. At baseband the received carrier frequency for the $(P_v-1)$ other interfering signals is referenced w.r.t. 0 Hz. The minimal (extended) interfering Doppler residual, ensuring a minimal CCF isolation, $CCF_{req}$, is defined as $\Delta Dopp_{,isol}$. For the proposed example, if $CCF_{req}$=−25 dB, the minimal (extended) interfering Doppler residual for which the maximal CCF value equals $CCF_{req}$ is equal to $\Delta Dopp_{isol}$=1.5 KHz (corresponds to the peak of the first secondary lobe, see construction on FIG. 22). $\Delta Dopp_{isol}$ is also called Frequency Isolation margin on FIG. 22. It is outlined that $\Delta Dopp_{isol}$ depends on the shape of the main and secondary lobes of the function showing the maximal value of the CCF distribution as function of the (extended) interfering Doppler residual. As formerly explained, the width of those main (resp. secondary) lobes equals $2/T_{int}$ (resp. $1/T_{int}1$), so that the $\Delta Dopp_{isol}$ can be determined analytically or when applying numerical simulations, and also expressed proportionally to $1/T_{int}$. From the example, with $T_{int}$=1 ms, numerical simulations shows that the proportionality factor equals $\alpha$=1.5 ($\Delta Dopp_{isol}=1.5/T_{int}$ corresponding to the 1st secondary lobe peak), if a $CCF_{req}$=−25 dB isolation needs to be fulfilled. $\alpha$ increases if higher $CCF_{req}$ isolation is needed, yielding to a dependency with $CCF_{req}$: $\alpha(CCF_{req})$. So, a preliminary setting for $\Delta Dopp_{,isol}$ is given by $\Delta Dopp_{isol}=\alpha(CCF_{req})\times(1/T_{int})$. For a data modulated CDDMA signal with symbol rate $f_s$, $\Delta_{Dopp,isol}=\alpha\times f_s$ because the coherent integration time cannot exceed the symbol duration $T_s$.

To ensure that CCF [dB]<$CCF_{req}$ it is then necessary that the smallest value of the (extended) interfering Doppler residual of the interfering signal component shall not be smaller than $\Delta Dopp_{,isol}$. To satisfy this condition it is necessary to offset the carrier frequency of the interfering radio signal component, here for the second CDDMA channel of index p=1, with the value $\Delta f_{carr,1}$ given by:

$$\Delta f_{carr,1} = \Delta Dopp_{isol} + D/2 \quad \text{(eq. 22)}$$

For the proposed example, with L=31 chips, $\Delta f_{carr,1}$=1.5 KHz+7 KHz=8.5 KHz (without considering the contribution of the receiver oscillator stability).

Hence by offsetting the carrier frequency of the first CDDMA channel corresponding to the first interfering radio signal component with $\Delta f_{carr,1}$, it is possible to guarantee that the cross-correlation will not exceed $CCF_{req}$ over all possible code delay shifts, $\tau_2-\tau_{test,0}$ and over the complete range of (extended) interfering Doppler residual. To ease the construction of the CDDMA scheme FIG. 22 also provides some graphical elements notably the distribution, with triangular shape, of the (extended) interfering Doppler residual corresponding to the first CDDMA channel for the first interfering radio signal component, and shifted with $\Delta f_{carr,1}$.

Figure 23:
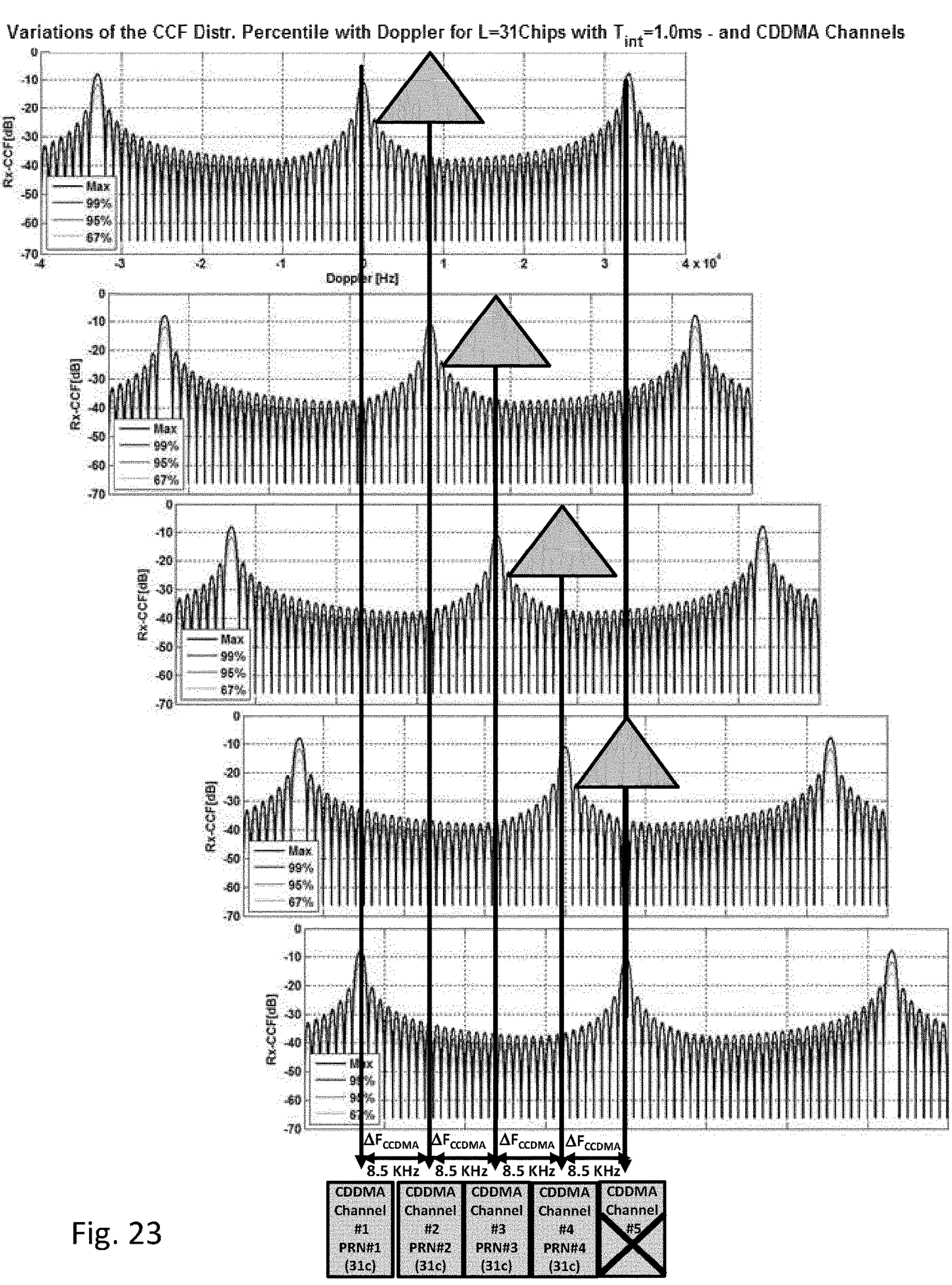
FIG. 23 further provides graphical elements to explain the principle of the assignment of 4 CDDMA channels and related carriers when considering radio signal components generated with 4 different spreading codes having the same length of 31 chips, and based on the variations of the percentiles of the distributions for the CCF computed with a coherent integration time of 1 ms, as function of the (extended) interfering Doppler residual corresponding to satellite-to-radio receiver link dynamic for MEO satellites such as the Galileo ones, and also accounting for the frequency offset.

Having presented the methodology to set the frequency offset, $\Delta f_{carr,1}$, for the first CDDMA channel corresponding to the first interfering radio signal component, it is proposed to generalize it for the other CDDMA channels corresponding to the other interfering radio signal components. FIG. 23 describes the methods to determine the (P−1) carrier offsets, $\Delta f_{carr,p}$, for the (P−1) other CDDMA signals, to ensure the required cross-correlation isolation, $CCF_{req}$ with the first p=0 CDDMA channel, corresponding to the signal component of interest. It is noted that because the design and assignment of the carrier offsets shall be ensured for all possible user locations and therefore for all possible combinations of $P_v$ visible radio signal components out of the P, the assignment methodology is then applied to the complete capacity of the P radio signal components. By repeating the same procedure, the corresponding offsets applied to the carrier frequency of each CDDMA channel of index p is given by:

$$\Delta f_{carr,p} = p \times (\Delta Dopp_{isol} + D/2) = p \times 8.5 \text{ KHz} \quad \text{(eq. 23)}$$

For the fourth radio signal component (p=3, corresponding to the last P=4 CDDMA channel), the former expression yields to $\Delta f_{carr,P}=(P-1)\times(\Delta Dopp_{isol}+D/2)=3\times8.5$ KHz=25.5 KHz. On FIG. 23 it can be observed that for an hypothetical fifth (p=4) interfering radio signal component the carrier frequency "falls" into the second main lobe distant of $1/(L\times T_c)$, i.e. 33 KHz w.r.t. first main lobe. Because the CCF for this second main lobe can reach value up to −8 dB, the condition related to the $CCF_{req}$ isolation of −25 dB is no more satisfied. This justifies why only four frequency carriers (p=0, 1, 2 and 3), for the proposed configuration applying different spreading codes with length L=31 chips for the different radio signal components, can be allocated to up to four (P=4) CCDMA channels to fulfill the requirement for the correlation isolation.

From equation (eq. 23) it can be deduced that the P CDDMA carriers of the P CDDMA channels are separated by $\Delta_{FCCDMA}=(\Delta_{Dopp,isol}+D/2)$, which is also depicted on FIG. 23.

On the same FIG. 23 it is also shown that each of the four CDDMA channels uses a different code, or PRN (PRN #1 for CCDMA channel #1, PRN #2 for CCDMA channel #2, . . . ), all PRNs having the same length, L (equal to 31 chips in this illustrative example). Because the CCDMA allocation is based on the behavior of the Cross-Correlation Function with the (extended) interfering Doppler residual, it justifies the application of four different PRNs. Later, it will be shown that a variant of the CDDMA proposes to use the same PRN for all CDDMA channels, in which case the dependency of the Auto-Correlation Function with Doppler is applied for the assignment.

It is important to underline that the frequency offset $\Delta f_{carr,p}$ depends on the maximal span or excursion for the interfering residual Doppler, D, (here without extension with the carrier offset, as per (eq. 23)). When considering the Doppler contribution, D depends on the a priori regarding the Doppler uncertainty. It is maximal in a cold acquisition, but can be strongly reduced to some hundreds of Hz (rather than some KHz) with a priori. Such an a priori on the Doppler of the interfering radio signal components can for example be provided by Local Base Stations (LBS) for connected user devices. For such aided scenarios, D becomes smaller, and it is possible to reduce the Doppler offset between the CDDMA carriers, and therefore the inter-CDDMA channel distance. As stated earlier, the maximal excursion of the interfering residual Doppler will depend on a one side on the contribution of the radio transmitter-to-radio receiver link dynamic (different for a GEO, MEO, LEO or terrestrial radio emitter) and on the other side on the stability of the radio receiver oscillator, or clock. The CDDMA assignment shown on FIG. 22 was proposed for an excursion or span of the interfering Doppler residual, D, equal to 7 KHz since not accounting for the receiver oscillator stability. If the receiver oscillator stability is accounted, then D increases to 35 KHz for a low grade oscillator with 3 ppm, as shown in the back-ground art part. For receiver oscillators of higher grades, D would be between 7 KHz and 35 KHz. The same methodology could then be applied for this updated value of D, also accounting for the receiver oscillator stability.

As explained formerly, the frequency offset is dimensioned according to the span for interfering Doppler Residual, D, which justifies the term Doppler in the proposed "Code-Doppler Division Multiple Access" naming proposed for the solution. Now, and because the corresponding signal components are spread with Pseudo Random codes, the name of the proposed solution also includes the term Code. Beyond the naming justification, the design constraint regarding both the Doppler span and the spreading code length, L, (inherent to CDMA scheme), used to find an optimal combination for the CDDMA signal design also justifies the inclusion of both Doppler and code terms in the CDDMA designation.

Figure 24A:
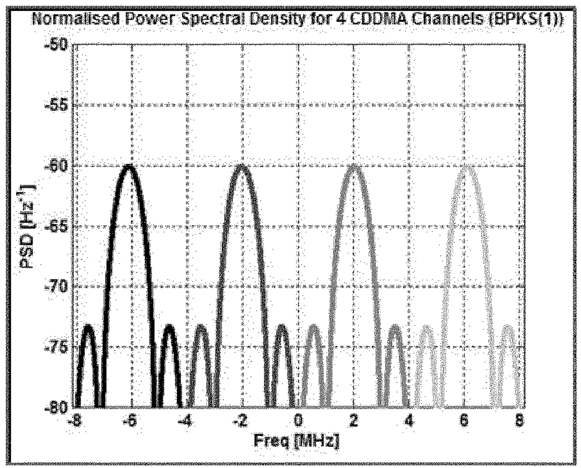
FIG. 24*a*, FIG. 24*b* and FIG. 24*c* represent the PSD for two main Multiple Access schemes, with the FDMA scheme (FIG. 24*a*) proposed for 4 FDMA channels with a 4 MHz occupancy, and with the CDDMA scheme (FIG. 24*b* and FIG. 24*c*) proposed for 4 CDDMA channels but with a smaller overall spectral occupation thanks to the interleaving of the spikes for spectral occupation of the radio signal components, when observed at a smaller scale (FIG. 24*c*).
Figure 24B:
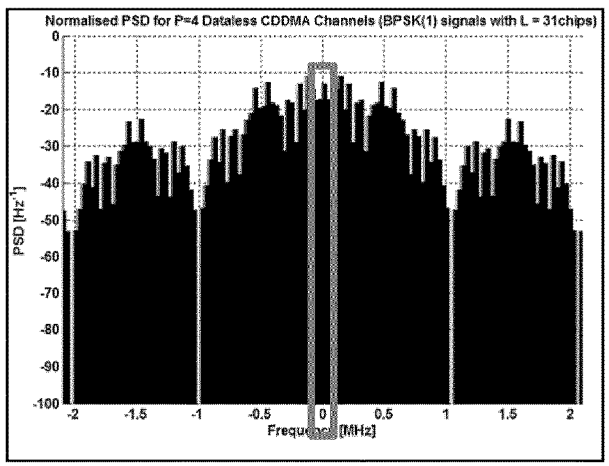
Figure 24C:
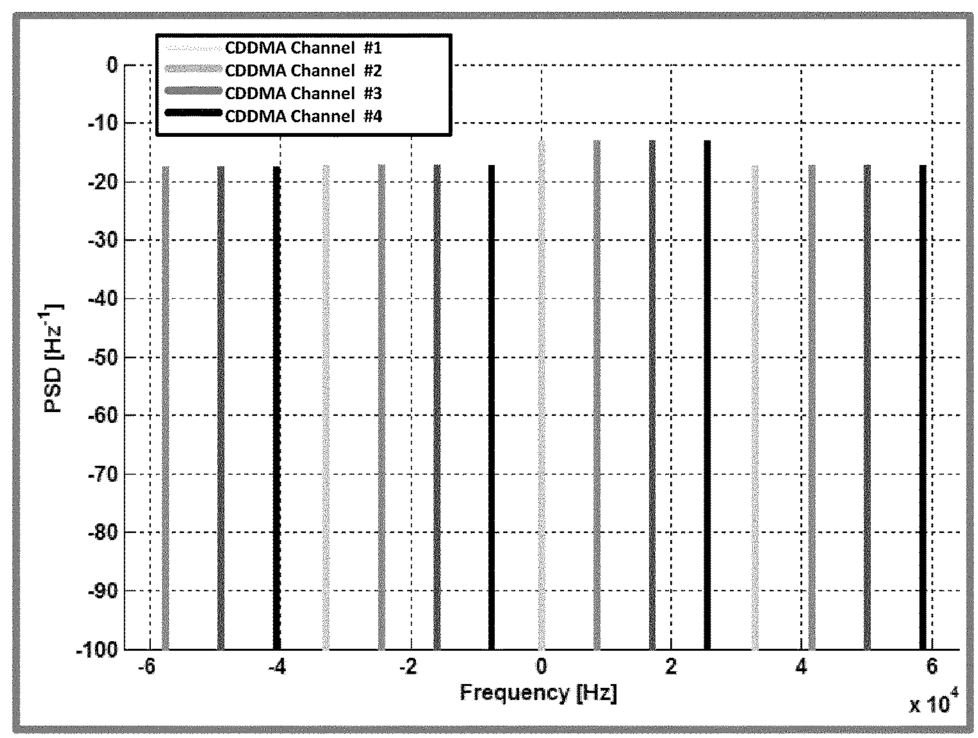

In the following, each of the P carriers will be called a "CDDMA channel". The CDDMA scheme share some similarities with the Frequency Division Multiple Access (FDMA) scheme in the sense that a frequency offset is applied to ensure spectral isolation to reduce MAI. Now, and contrarily to this classical FDMA scheme, it is possible to significantly reduce the spectral occupancy for the P transmitted signals modulated with a BPSK(N) or BOC(M,N) pulse waveform. FIG. 24*a* for example shows that a FDMA scheme comprising P=4 FDMA channels of 4 MHz each (assuming a BPSK(1)) would request an overall spectral occupancy of 16 MHz. Comparatively, FIG. 24*b* shows that a CDDMA scheme would request altogether a slightly higher bandwidth than the 4 MHz. This overall bandwidth occupation indeed equals 4 MHz+$(P\times(\Delta Dopp_{isol}+D/2))$ which represents a bandwidth increase not exceeding 5 to 10% of the initial bandwidth of 4 MHz for the typical values of $\Delta Dopp_{isol}$ and D. FIG. 24*c* represents a zoom for the 4 dataless CDDMA channels. When compared to the PSDs for radio signal components obtained without application of the frequency offset (see zooms on the FIG. 19*b* (pilot radio signal component) and FIG. 20*b* (radio signal component for data transmission)), it can be observed on FIG. 24*c* that the application of the frequency offset ensures an interleaving between the spikes of the different FDMA PSDs, which reduces strongly spectral overlap and therefore improves cross-correlation isolation. Hence, the spectral isolation of the CDDMA scheme is ensured at a small, micro (frequency) scale, while for the FDMA scheme it is ensured at a macro (frequency) scale. Furthermore, for the FDMA scheme, in order to limit the overall spectral occupancy, only the main lobes and possibly the first side lobes (for example, as shown FIG. 24*a*) of the PSDs of each radio signal component applying a FDMA scheme is comprised per FDMA channel. As another example, only the main lobe of the GLONASS L1COd signal is transmitted per FDMA channel (1 MHz width). The direct consequence of a limited transmitted signal bandwidth, is a lower ranging performance, in term of noise and multipath robustness. Such an effect does not exist for the proposed CDDMA scheme (but also for CDMA scheme) which authorizes transmitting over a larger bandwidth, since not subject to severe bandwidth limitation. A strongly reduced spectral occupation, when compared to the one of the FDMA scheme, also represents an important advantage for two main reasons. First, it can ease International Telecommunication Union (ITU) allocation for new GNSS signals especially, when considering the always increasing demand for spectral resources in the allocated frequency bands to the Radio Navigation Satellite System (RNSS) services. A smaller spectral overlap would thus be achieved with other co-existing GNSS signals sharing the same RNSS bands. Another very important benefit of the reduced spectral occupation is the smaller receiver front-end (˜4 MHz for CDDMA in place of ˜12 to 16 MHz for classical FDMA) which certainly reduces receiver complexity and cost.

For the proposed example and configuration represented on FIG. 23, it was shown that "only" four CDDMA channels could be created, as the fifth channel would not satisfy the CCF isolation since "falling" in the 33 KHz region comprising again a main lobe. In order to enhance the number of channels, and therefore the overall capacity for the number of P=F×Q radio signal components that can be transmitted by the satellite radio navigation system, different options, also exploited by the embodiment of the present invention, are now proposed.

Figure 25:
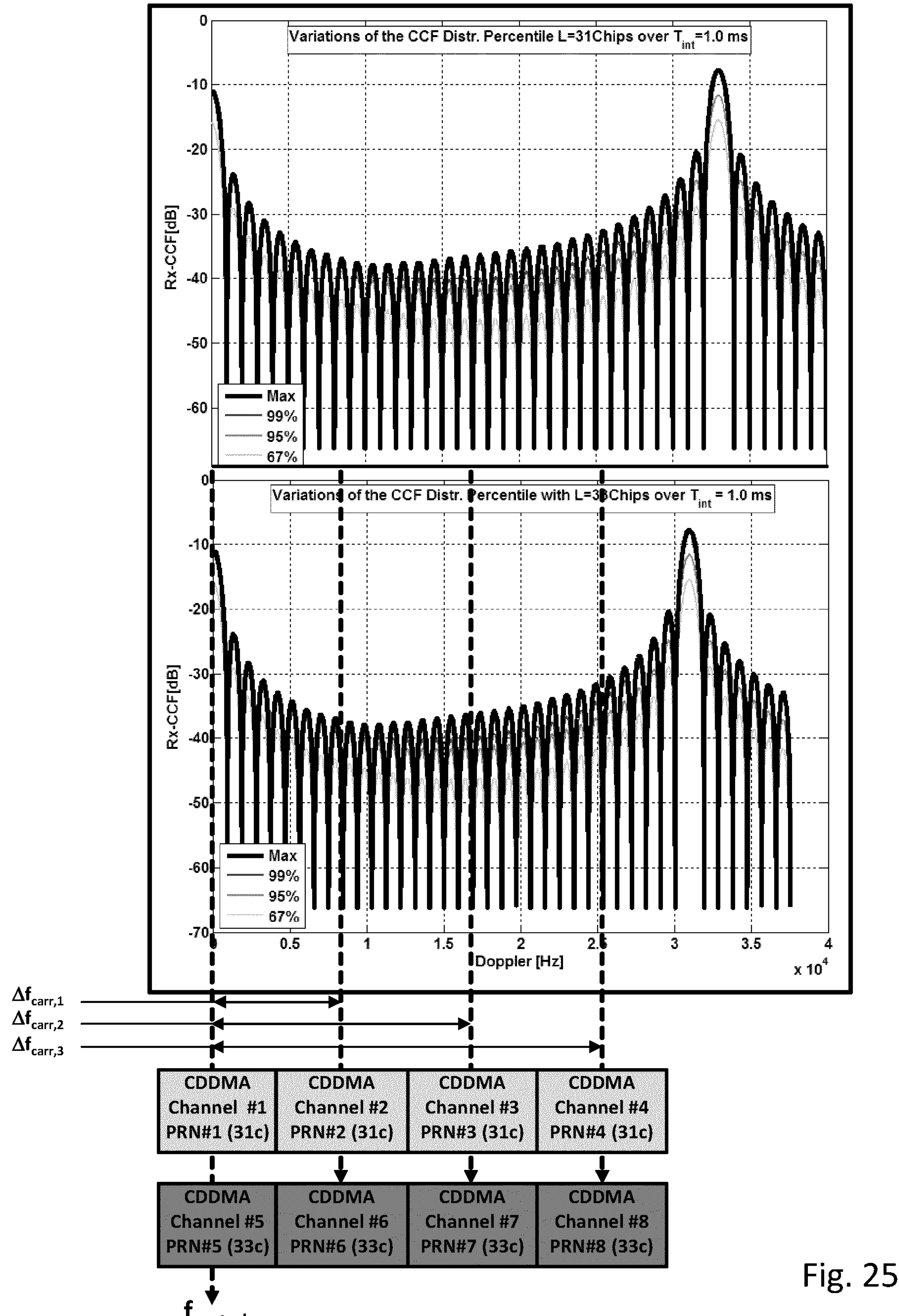
FIG. 25 represents the distribution of the percentiles for the CCF obtained either for spreading code length L1=31 chips (upper part of FIG. 25) or for spreading code length L2=33 chips (lower part of FIG. 25). Those distributions enable to justify the assignment of CDDMA channels for radio signal component having different spreading code lengths.
Figure 26A:
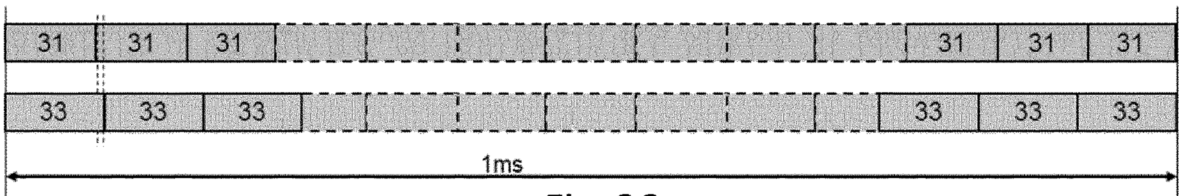
FIG. 26*a*, FIG. 26*b* and FIG. 26*c* provide graphical elements to compute the cross-correlation values between two radio signal components having different spreading code lengths of 31 and 33 chips respectively with $f_c$=1 Mcps, when calculated over a coherent integration time of 1 ms corresponding to 1023 chips.
Figure 26B:
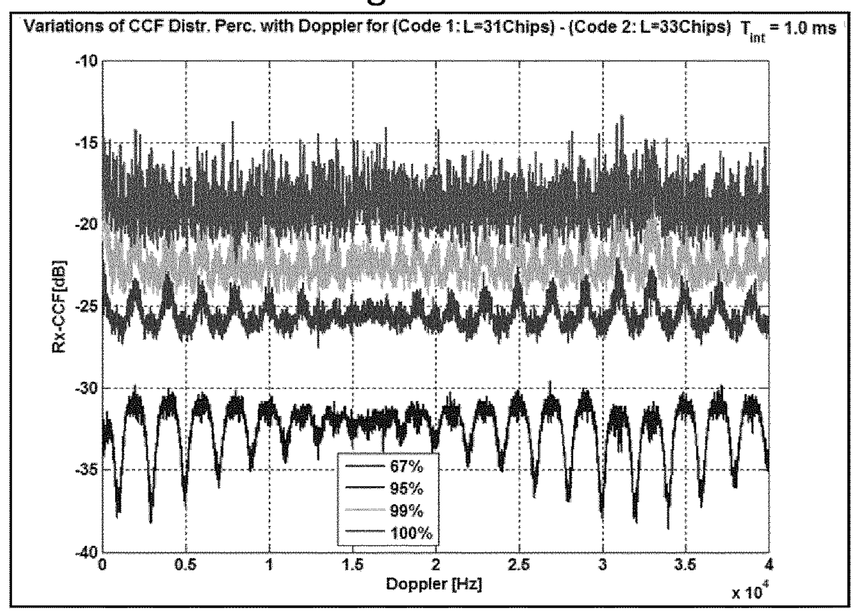
Figure 26C:
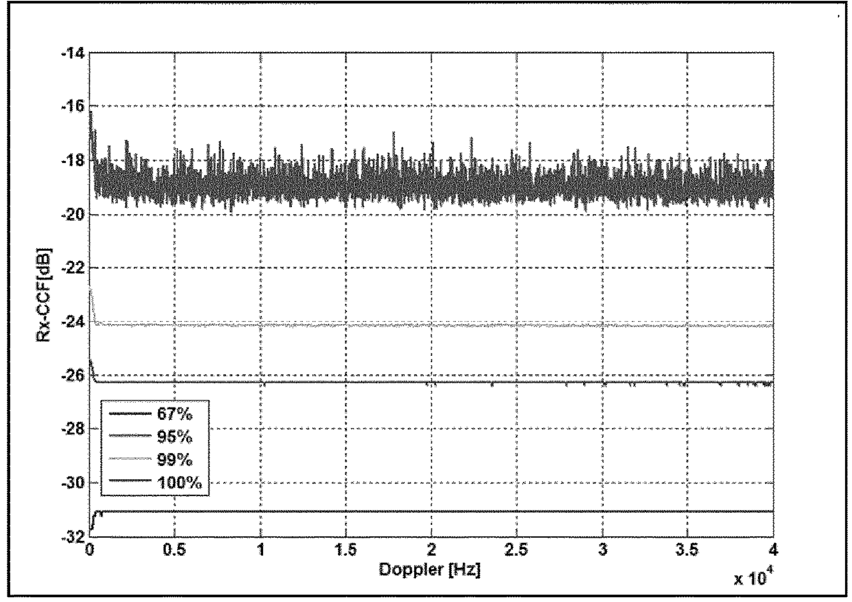

A first option, or alternative embodiment of the present invention, consists in allotting different spreading codes with different spreading code lengths among the different GNSS signals. Such spreading code lengths shall show specific algebraic properties, such as being prime between each other's, or to show the largest Least Common Multiple (LCM) value. For illustration purpose, one can consider two different codes Lengths L1 and L2. It is proposed to modulate one half of the P radio signal components with spreading codes having a first spreading code length L1 (equal to 31 chips in the proposed example), while the other half of the P radio signal components are modulated with spreading codes having a second spreading code length L2 (equal to 33 chips in the proposed example). Because 31 and 33 are prime, their LCM equals 1023 chips, or 1 ms of coherent integration time for a BPSK(1). It is outlined that in this first option, the CDDMA signal components which have the same spreading code length L1 (or L2) still apply different spreading codes (PRN #1 for CCDMA channel #1, PRN #2 for CCDMA channel #2, . . . for spreading Code Length L1, and PRN #5 for CCDMA channel #5, PRN #6 for CCDMA channel #6, . . . for spreading Code Length L2) in order to exploit the CCF properties as for FIG. 23. FIG. 25 represents the distribution of the Doppler dependent percentiles for the CCF obtained either with L1=31 chips (on the top of the FIG. 25) or L2=33 chips (on the bottom of the FIG. 25). It can be observed that the second main lobe is distant from the first one of $1/(L1\times T_c)$=33 KHz for the first category of CDDMA signal components applying the PRN with spreading code length L1=31 chips, while it is distant of $1/(L2\times T_c)$=31 KHz for the second category of signal components applying the PRN with spreading code length L2=33 chips. In the lower part of FIG. 25, the four CDDMA channels for the radio signal components applying a spreading code length L1=31 chips, and the four other CDDMA channels for the radio signal components applying a spreading code length L2=33 chips are also represented. It is noted that the small difference of 33−31=2 KHz authorizes applying the same frequency offsets for the channels #1& #5, channels #2& #6, channels #3& #7 and channels #4& #8. These common offsets shall then be computed based on the largest (Doppler) frequency value of 33 KHz (to still ensure cross-correlation isolation). FIG. 26*a* provides a time representation of both spreading code streams over 1 ms, as a concatenation of 33 (resp. 31) PRN codes of length 31 chips (resp. 33 chips). Those longer spreading codes, having a length of 1023 chips, and based on elementary spreading codes of 31 or 33 chips will be called Concatenated Spreading Codes in the following. FIG. 26*b* represents the different Doppler-dependent percentiles of the CCF distribution, when the CCF is calculated between concatenated spreading codes belonging to both families of spreading codes, i.e. 31 chips and 33 chips, (while FIG. 25 represented the Doppler-dependent percentile of the CCF distribution when the CCF was calculated for concatenated spreading code belonging to the same family, i.e. 31 chips or 33 Chips), and over a range for the (extended) interfering residual Doppler which spans up to 35 KHz. For this calculation 12 elementary spreading codes with a length of 31 chips, and 12 elementary spreading codes with a length of 33 chips have been generated randomly (i.e. not based on constructed spreading codes such as Gold Codes). The coherent integration time is still $T_{int}$=1 ms, as for FIG. 25. If the maximal CCF value (˜−15 dB) over the (extended) interfering Doppler residual is larger than the one obtained with a longer sequence of 1023 chip (such as a Gold Code showing 24 dB), it can be observed that the corresponding 99% and 95% percentiles values have the same order of magnitude to the ones corresponding to a longer spreading code comprising L=1023 chips, as shown on FIG. 26*c*. FIG. 26*c* represents the percentiles of the distribution of the CCF calculated with 276 pairs of spreading codes whose chip values are selected randomly (no Gold Code, as for FIG. 13). Because the probability to reach the maximal CCF value is relatively small, considering the largest percentiles (e.g. 95%, 99%) of the CCF distribution for acquisition performance is sufficient for most of the GNSS applications, avoiding in that way a too conservative, and pessimistic design approach. Thus, it is possible to double the number of CDDMA channels (in the proposed example 8 channels, in place of 4 channels with a single spreading code length) by selecting periodical spreading codes with spreading code lengths close to each other's (31 vs. 33 chips) and having the largest LCM to almost reach an overlap of the main lobes of the CCF distribution, as shown on FIG. 25. Good cross-correlation isolations corresponding to LCM of the spreading codes are still obtained, when both spreading code lengths are prime between each other's, even if the corresponding spreading codes have a small length. The proposed example can be extended to 3 or more spreading codes lengths to even extend the number of CDDMA channels.

A second option, or alternative embodiment of the present invention, consists to allot the same spreading code to two satellites being antipodal. This solution enables therefore to double the number of CDDMA channels. This principle can be extended to allot the same spreading code to satellites which cannot be visible simultaneously everywhere within the service area of the radio-navigation service. Indeed, for Space Based Augmentation Systems (SBAS) operating Geo-synchronous satellites (GEO), the service area reduces to the satellite footprint dimensioned by the directivity of the transmitting antenna on-board the GEO satellite. Therefore, for such SBAS or regional navigation systems it is possible to allot the same spreading code to different GEO-satellites as long as their footprints do not overlap. This second option can also be applied for terrestrial systems with service area confined to a geographical zone.

A third option, or alternative embodiment of the present invention, consists to use the same spreading code for all P=F×Q radio signal components occupying the P CDDMA channels. For the proposed alternative embodiment, the P=Q (F=1) CDDMA channels are occupied and each corresponds to one radio signal component obtained with the same spreading code as the other CDDMA channels. Because the interfering radio signal components are modulated with the same spreading code as the one applied to the replica signal corresponding to the radio signal component of interest, the Auto-Correlation Function (ACF) has to be applied. In that case, the expression (8) showing the dependency of the ACF w.r.t. desired Doppler residual, shall be used in place of the expression (10) showing the dependency of the CCF w.r.t. the (extended) interfering Doppler residual, but now using the interfering instead of the desired Doppler residual. Introducing a frequency offset for each of the radio signal components modulated with the same spreading code would then yield the following equation, which is very similar to the equation (19) and justifies that a very similar methodology to the one based on the CCF can be followed.

$$r_{c,p}(p_p, \Delta f_{Dopp,test,p}, \Delta f_{carr,p}) = \frac{\sqrt{P_0}}{U \times L} \sum_{n=1}^{U \times L} R_p(n, p_p) \times \overline{c}_{0,\lfloor \frac{n}{U} \rfloor} c_{0,\lfloor \frac{n}{U} - p_p \rfloor} e^{j(2\pi(\Delta f_{Dopp,test,p} + \Delta f_{carr,p}) n T_s + \varphi_{test,p})} \tag{24}$$

Figure 27:
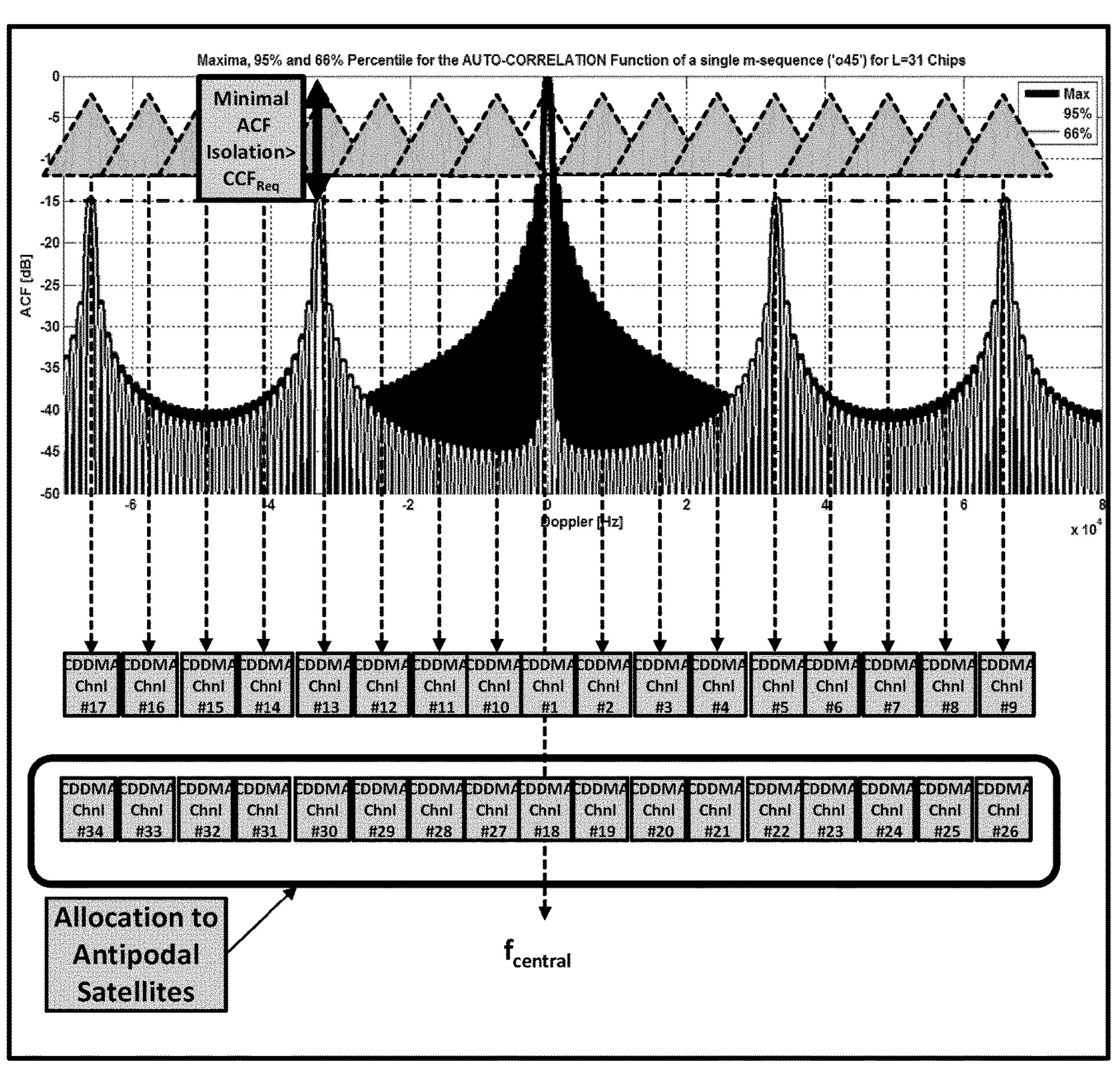
FIG. 27 provides graphical elements to explain the principle of the assignment of P=34 CDDMA carriers when considering radio signal components generated with same the spreading codes having a length of 31 chips, and based on the variations of the percentiles of the distributions for the Auto-Correlation Function computed with a coherent integration time of 1 ms, as function of the (extended) interfering Doppler residual corresponding to satellite-to-radio receiver link dynamic for MEO satellites such as the Galileo ones, and also accounting for the frequency offset. The spreading code is an m-sequence generated with polynomial 'o45'.

The ACF expression, (24) is identical to the one of the Cross-Correlation Function (CCF) (see (19)) with the exception that the spreading code for the interfering signal ($c_{0,\cdot}$) (i.e. from another CDDMA channel) is the same as for the spreading code ($c_{0,\cdot}$) for replica of the "desired" CDDMA channel, corresponding to the radio signal component of interest, for which acquisition is target. FIG. 27 represents the variation of the percentiles for the ACF, depending on the (extended) interfering residual Doppler. It can be observed that for the illustrative example with L=31 the maximal CCF value does not exceed −15 dB, even for the main lobes at ±66 KHz and ±33 KHz from the central main lobe. Furthermore, when considering the Doppler-dependent distribution of the ACF, the frequency isolation margin, $\Delta Dopp_{isol}$, ensuring-15 dB of isolation can be reduced to 1.25 KHz in order to ensure that certain CDDMA channels exactly fits to the inverse of the spreading code duration of 33 KHz, yielding to CDDMA channel frequencies of ±8.25 KHz, ±16.5 KHz, ±24.75 KHz, ±33 KHz, etc. . . . For comparison, it is reminded that the main lobe of the CCF between two different spreading codes of length L=31 chips, reaches only-8 dB, so offering 7 dB lower isolation, as seen on FIG. 22 for the same main lobes. The main consequence is that it is possible to allot "as many CDDMA channels as needed" when considering this single spreading code option. For the proposed example up to 17 CDDMA channels spreading over ~140.25 KHz can thus be exploited.

An advantage of applying the same spreading code for all radio signal components is that it offers the possibility to apply for each code hypothesis, a full parallel search over the P different CDDMA channels for the Doppler offsets of the different satellites in view and having a same PRN sequence. Hence, contrarily to conventional FFT based acquisition used to test all code delay hypotheses simultaneously for each Doppler offset hypothesis (see further details for the FFT-based acquisition later in this description of embodiment), applying the same spreading code, enables to use the FFT to test all Doppler offset hypotheses for each code delay hypothesis. Permuting the code delay vs. Doppler offset is possible as the number of code delay hypothesis is small thanks to the strong reduction of the spreading code length (31 chips, compared to 1023 chips for the GPS C/A signal in the proposed example). Because all satellites apply the same spreading code, the corresponding Doppler search also enables to parallelize the satellite (PRN) acquisition, while for conventional CDMA schemes the acquisition search needs to be re-iterated for each satellite. This simultaneous acquisition search of all visible satellites, in a "single shot", also represents an additional reduction factor for the receiver, when applying the same spreading code. Hence the reduction in complexity for the code search per satellite can be re-allocated and used for acquisition of several satellites in parallel. Considering for example a scenario with 17 CDDMA channels, spaced with 8.25 KHz each. By testing, ~300 Doppler hypotheses with 500 Hz bin width, (8.25 KHz×17/0.5 KHz=280.5<300), it shall be possible to detect $W_{acq}$ detector outputs corresponding to the $W_{acq}$ to be acquired out of the P visible Lines of sight. Here FFT with 9 points ($2^9$=512>300) would then be sufficient for a concrete implementation. Furthermore, because only one spreading sequence is implemented, it is possible to select an m-sequence (see [Ref 1]) which just needs a single Linear Feedback Shift Register (LFSR) to be generated, compared to two LFSRs for the Gold Code generation. This represents therefore another advantage when using a single spreading code for all radio transmitters as it represents a reduction of the hardware complexity when compared to Gold Code requiring two LFSRs.

It is noted that the three former options can be combined to even increase the number of available CDDMA channels, and to reach the target capacity of Q radio signal components. For example it is possible to apply the same PRN sequence to antipodal satellites. For the proposed example, this double the number of CDDMA channels yielding to 34 CDDMA channels. The lower part of FIG. 27 represents the 17 additional CCDMA channels for those antipodal satellites.

Figure 28:
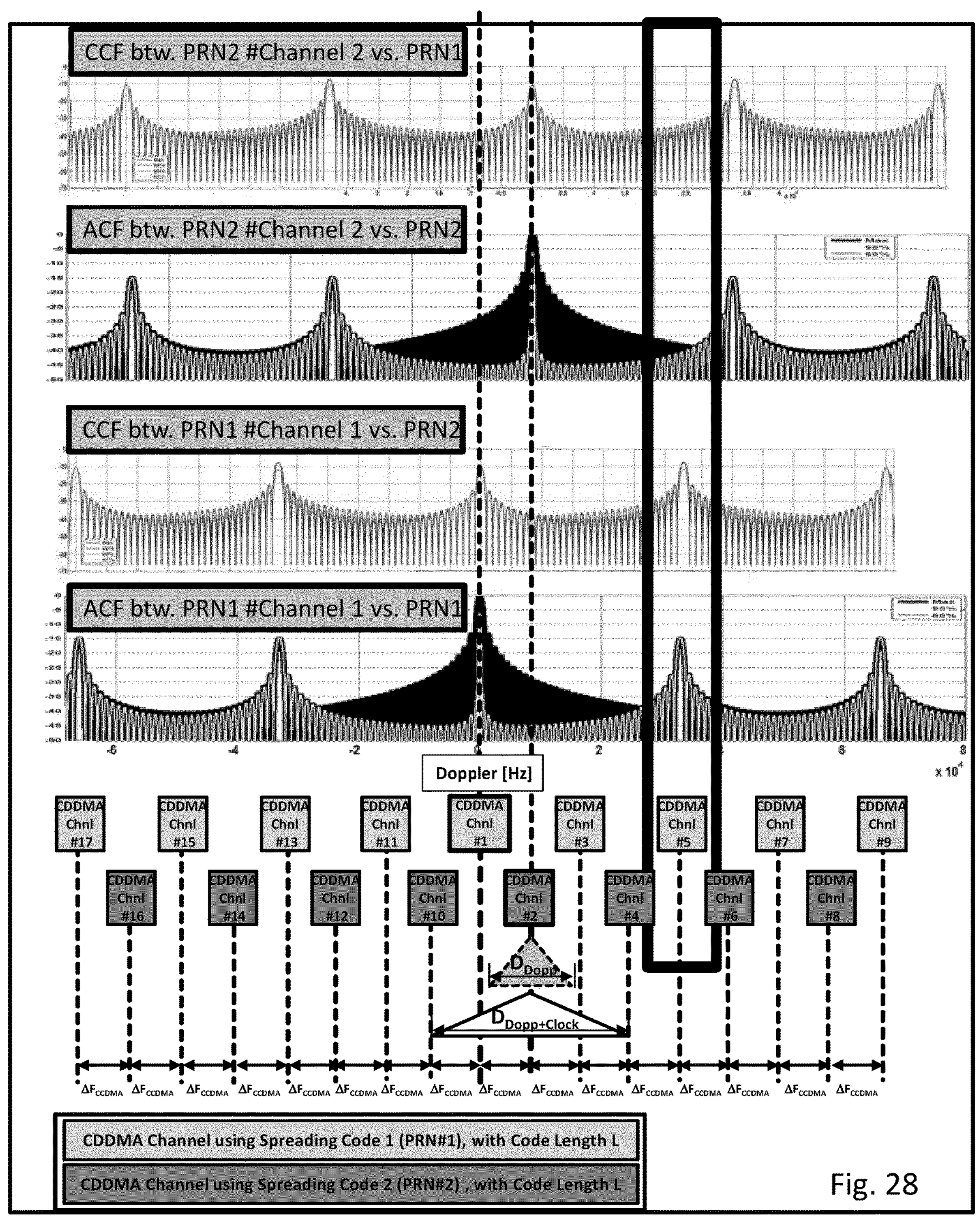
FIG. 28 provides graphical elements to explain the principle of the assignment of P=17 CDDMA carriers when considering radio signal components generated with 2 different spreading codes having both a length of 31 chips, and based on the Doppler variations of the percentiles of the distributions for the Cross-Correlation Function computed with a coherent integration time of 1 ms, as function of the (extended) interfering Doppler residual corresponding to satellite-to-radio receiver link dynamic for MEO satellites such as the Galileo ones, and also accounting for the frequency offset.

Another possible option of combination, which combines the first and third options is represented on FIG. 28. First two spreading codes, PRN #1 and PRN #2, are used, in a similar way to the first option, both having the same spreading code length L. Then, the first spreading code, PRN #1, is used for half of the P CDDMA channel, and the second spreading code, PRN #2, for the other half. In order to avoid unacceptable cross-correlation isolation, the first sequence, PRN #1, is allotted to the odd CDDMA channels (#1, #3, #5, . . . ), while the second sequence, PRN #2, is allotted the even CDDMA channels (#2, #4, #6, . . . ). By following this allotment strategy with interleaving CDDMA channels, it can be verified that none of the CDDMA channel corresponding to PRN #2 falls into a main lobe of the CCF between PRN #1 and PRN #2. Vice-versa, it can be verified that the none the CDDMA channel corresponding to PRN #1 falls into a main lobe of the CCF between PRN #2 and PRN #1. This is for example highlighted by the black and bold frame for the CDDMA channel #5. This proposed CDDMA scheme aiming at ensuring that CDDMA channels of the PRN #1 (resp. PRN #2) does not correspond to main lobes of the CCF between PRN #1 and PRN #2 (resp. PRN #2 and PRN #1) can be extended to a larger number of sequences PRN #1, PRN #2, . . . , PRN #I having the same length L, as long as the condition regarding "the main lobe avoidance" is satisfied. It is outlined that the proposed solution could even be extended by interleaving PRN sequences of different lengths L, again as long as the "main lobe avoidance" constraint is respected. By increasing the distance between channels, using the same PRN (e.g. channels #1, #3, #5 for PRN #1), as the consequence of the CDDMA channel interleaving, it is possible to tolerate a wider maximal span $D_{Dopp+Clock}$, also accounting for the clock stability. This is also illustrated on FIG. 28, showing the two "triangle" of basis, $D_{Dopp}$ for the first (considering only the Doppler) and the wider $D_{Dopp+Clock}$ for the second (considering both Doppler and user clock stability). Here it can be verified that the CCF isolation between the PRN2 of CDDMA channel #2 and the PRN #1 of CDDMA channel is still satisfied despite the wide span $D_{Dopp+Clock}$.

A further embodiment consists in proposing alternative implementations for the application of the frequency offset, either at transmission for the signal generation, or at reception for the signal down-conversion to base-band, or for the replica generation in case the replica comprises the frequency offset. It is proposed to firstly concentrate on those implementations applied at transmission side, in order to later support similar demonstrations applied at the reception side, with the necessary adaptation. Hence, the following explains how the said frequency offset applying means (11), further is configured to apply to said data signal carrier of said radio signal component, a frequency offset ($\Delta f_{carr,p}$, $1 \leq p \leq P$), relative to a central carrier frequency, ($f_{central}$), by multiplying with a complex or real offset carrier depending on said frequency offset.

Indeed equation (17) expresses how the application of the said frequency offset, is achieved by multiplying the stream of spreading codes possibly modulated with symbols. The following equation is a further form of equation (17) corresponding to the complex carrier offset and once having developed the exponential function:

$$u_p(t) = \sqrt{P_p^{Tx}}\, d_p(t) g_p(t)[\cos(2\pi\Delta f_{carr,p} + \varphi_{p,init}) + j\sin(2\pi\Delta f_{carr,p} + \varphi_{p,init})] \tag{25}$$

Based on this formulation, it is possible to present alternative implementations belonging to two main categories. The first one supports the transmission of a complex signal as presented in equation (25), while the second supports the transmission of a real signal. In that later case, the implementation of the carrier offset consists to replace the multiplication with an exponential with a multiplication either with a cosinus or a sinusoid function, generated with the same frequency offset, yielding to a real carrier offset. In the following and for sake of illustration the multiplication with a cosinus function is proposed as shown on the following equation:

$$u_p(t) = \sqrt{P_p^{Tx}}\, d_p(t) g_p(t)[\cos(2\pi\Delta f_{carr,p} + \varphi_{p,init})] \tag{26}$$

The following paragraphs describe now an alternative embodiment for frequency offset applying means (11), configured to apply to said data signal carrier of said radio signal component, a frequency offset ($\Delta f_{carr,p}$, $1 \leq p \leq P$), relative to a central carrier frequency, ($f_{central}$) by multiplying with a quantized complex or real offset carrier. Hence, as an alternative implementation of the transmission of a complex signal, it is proposed to replace in (25) the cosinus and sinus functions with quantized versions of those functions. In the simplest case for this alternative implementation, both cosinus and sinus functions are quantized on two levels, which is equivalent to apply the sign (•) operator to each of them, as shown in the following equation, and yielding to a 1-bit quantized complex carrier offset.

$$u_p(t) = \sqrt{P_p^{Tx}}\, d_p(t) g_p(t)[\text{sign}(\cos(2\pi\Delta f_{carr,p} + \varphi_{p,init})) + j\,\text{sign}(\sin(2\pi\Delta f_{carr,p} + \varphi_{p,init}))] \tag{27}$$

It is recalled that $\varphi_{p,init}$ is an arbitrary, but known, initial phase applied at transmission for the $p^{th}$ transmitted radio signal component. Typically $\varphi_{p,init}$ is set to 0.

[Ref 6]: "*Quantization*", Allen Gersho, IEEE Communications Society Magazine, pp. 16-28, September 1977. doi:10.1109/MCOM.1977.1089500.

[Ref 7]: "*Section* 1.2.3: *Quantization, in Chapter* 1: *JPEG* 2000 *Core Coding System* (*Part* 1)". In Schelkens, Peter; Skodras, Athanassios; Ebrahimi, Touradj (eds.). The JPEG 2000 Suite. John Wiley & Sons. pp. 22-24. ISBN 978-0-470-72147-6.

[Ref 8]: "*Efficient Scalar Quantization of Exponential and Laplacian Random Variables*", Gary J. Sullivan, IEEE Transactions on Information Theory, Vol. IT-42, No. 5, pp. 1365-1374 September 1996. doi: 10.1109/18.532878

It is outlined that a more general formulation consists to apply the $\text{Quant}_{Nq}(\bullet)$ function in place of the sign(•) one, to quantize the cosinus and sinus functions. Two variants of the $\text{Quant}_{Nq}(\bullet)$ function can then be identified, with the Mid-Tread and Mid-Riser, re-using specialized nomenclature as in [Ref 6]. Their main differentiation resides in providing the 0 value as possible output of the quantized (cosinus or sinus) function: The Mid-Tread quantizers provide a zero-valued quantization level, while Mid-Riser quantizers do not provide a zero-valued quantization level.

$$Quant_{N_q}^{Mit-Tread}(x) = \frac{1}{2^{N_q}}\left\lfloor x \times 2^{N_q} + \frac{1}{2}\right\rfloor \tag{28}$$

-continued $$Quant_{N_q}^{Mit-Riser}(x) = \frac{1}{2^{N_q}}\left(\left\lfloor x \times 2^{N_q} \right\rfloor + \frac{1}{2}\right)$$

In the former expression, the operator $\lfloor v \rfloor$ provides the closest integer lower than the input variable v. In the former definitions, it is considered that the variable x is equal to the output of the cosinus or sinus function, and varies between −1 and 1.

The Mid-Tread and Mid-Riser are the most encountered forms of implemented quantizers with uniform quantization law. However, other more sophisticated quantizers using alternative laws can be also proposed, such as the Dead-zone quantizers, or even quantizers with non-uniform law, see [Ref 7] and [Ref 8].

In the following, developments for the said alternative implementations consider application of the sign(•) function which corresponds to a Mid-Riser quantizer using one bit ($N_q$=1). Nevertheless, the proposed solution is not limited to the application of a one bit quantizer yielding to a "two-level" quantized sinusoid, and can also be extended for multi-level quantized sinusoid.

It can be observed that each of the 1-bit quantized cosinus and sinus functions, of the 1-bit complex quantized offset carrier shown on equation (27), can be considered each as a binary NRZ waveform with periodicity equal to the inverse of frequency offset $P_{carr,p}=1/\Delta f_{carr,p}$. Hence, the NRZ waveform which is modulated onto the spreading code can be identified as a secondary code with two symbols [+1, −1] and which repeats indefinitely. The spreading code then takes the role of a primary code. The duration of the secondary code symbol is function of the frequency offset and especially on the parameter $$\eta = \left(\frac{1}{2\Delta f_{carr,p}}\right)/\left(\frac{L}{f_c}\right) = \left(f_c/(2L\Delta f_{carr,})\right)$$

which represents the ratio between one half of the equivalent period for the (NRZ) sinusoid waveform obtained for the frequency offset (also equal to the secondary code symbol duration), and the spreading code period. This ratio η indicates if half a period of the equivalent (NRZ) sinusoid waveform encompasses an integer number of chips.

If η is an integer or not, different implementation strategies can be proposed. In order to present those strategies different carrier offsets, $\Delta f_{carr,p}$, corresponding to different CDDMA channels are proposed for an illustrative case when the spreading code length is 31 chips, and the chip rate $f_c$ is 1 MCps. Furthermore, to explain and illustrate those strategies, it is proposed to consider the option of a transmission of a real signal comprising the frequency offset as shown in (26), and wherein a 1-bit quantization ($N_q$=1) is applied to the cosinus function, yielding to a real one-bit quantized carrier offset, shown on the following equation (29). However, the following statements also apply when considering the option of a modulation of the spreading code with a secondary code constituted of a Non-Return to Zero (NRZ) code of real symbols.

$$u_p(t) = \sqrt{P_p^{Tx}}\, d_p(t) g_p(t)[\text{sign}(\cos(2\pi\Delta f_{carr,p} + \varphi_{p,init}))] \qquad (29)$$

Figure 29:
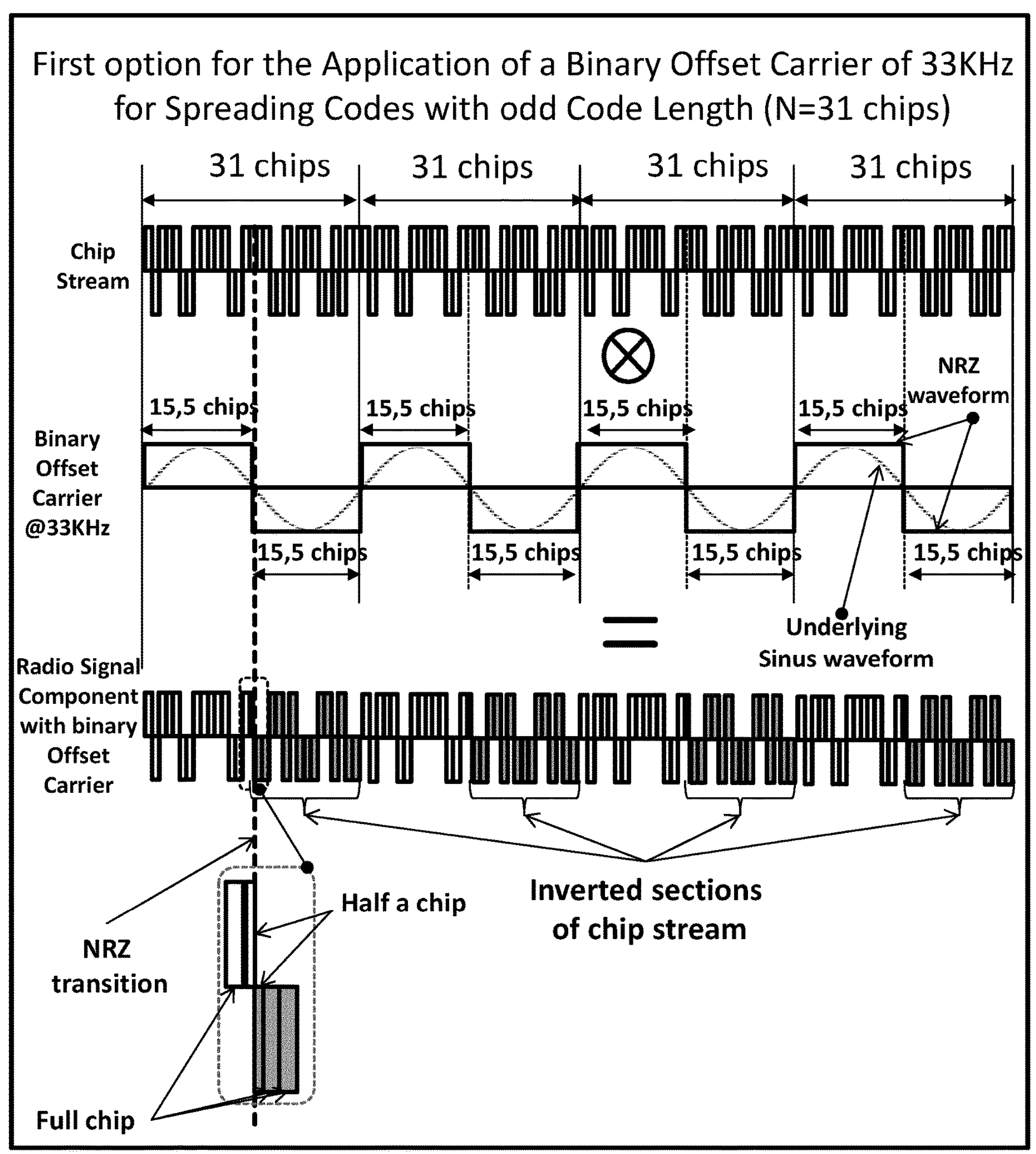
FIG. 29 represents the implementation for the application of the frequency offset of 33 KHz, by modulating a symmetric NRZ onto the spreading code having a L=31 chips, and when the falling edges of the NRZ falls in the middle of the 15th chip of the spreading code.

FIG. 29 represents the situation when $\Delta f_{carr,p}$ is set equal to the inverse of spreading code period, $\Delta f_{carr,p}=f_c/L$=33 KHz. In that case η=0.5. The upper part of FIG. 29 shows the chip stream corresponding to the concatenation of the spreading codes comprising L=31 chips. The middle part of FIG. 29 represents with a dashed line the waveform for an un-quantized sinusoid corresponding to a frequency offset $\Delta f_{carr,p}$ and aligned without dephasing to the spreading code (its value is zero for the first chip and increase on-wards). The NRZ waveform, which is derived from a one-bit quantization applied to the former sinusoid waveform can also be recognized on the same middle part of FIG. 29. It can be verified that the sinusoid waveform effectively inscribes within the NRZ waveform. Finally, the lower part of FIG. 29 represents the product of the chip stream and of the NRZ waveform. FIG. 29 effectively confirms that half a period of the offset frequency waveform comprises 15.5 chips.

A first implementation consists then to split the chip located at the median transition of the NRZ waveform into two pieces: the first one with its polarity not being inverted after multiplication of the positive part of the NRZ waveform (corresponding to the first "+1" binary symbol of the secondary code), and the second one with its polarity being inverted after multiplication of the negative part of the NRZ waveform (corresponding to the first "−1" binary symbol of the secondary code). The principle is shown in the lower left part of FIG. 29. Furthermore, the first part of the spreading code period, not placed at the transition will not be inverted after multiplication of the positive part of the NRZ waveform, while the last part of the spreading code period, not placed at the transition will be inverted after multiplication of the negative part of the NRZ waveform. This construction is repeated for the multiplication of all spreading code periods with the binary NRZ waveform.

Figure 2:
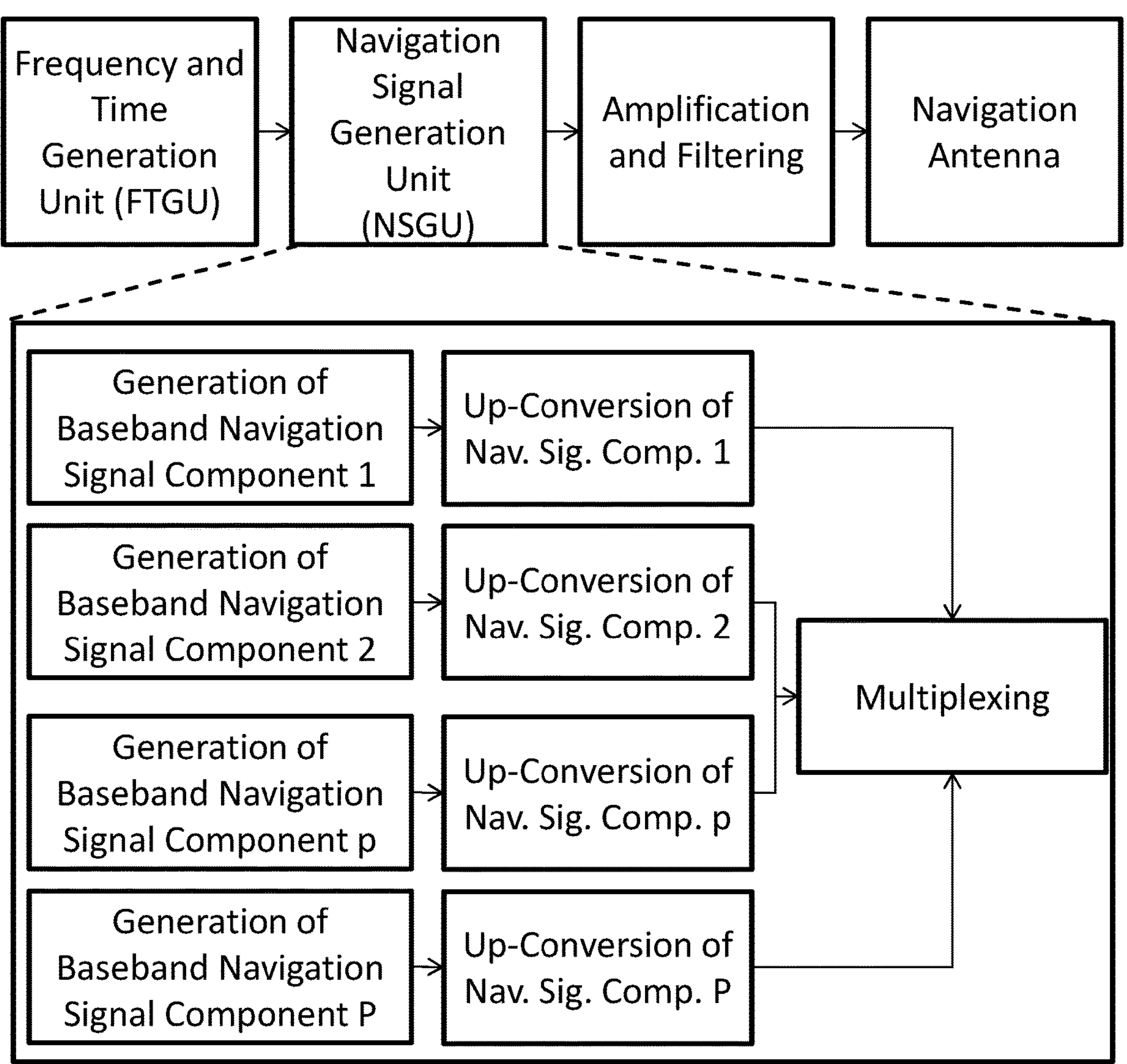
FIG. 2 represents the generic signal generation chain applicable for typical GNSS radio signal components, and implemented on-board the radio navigation satellites.
Figure 3:
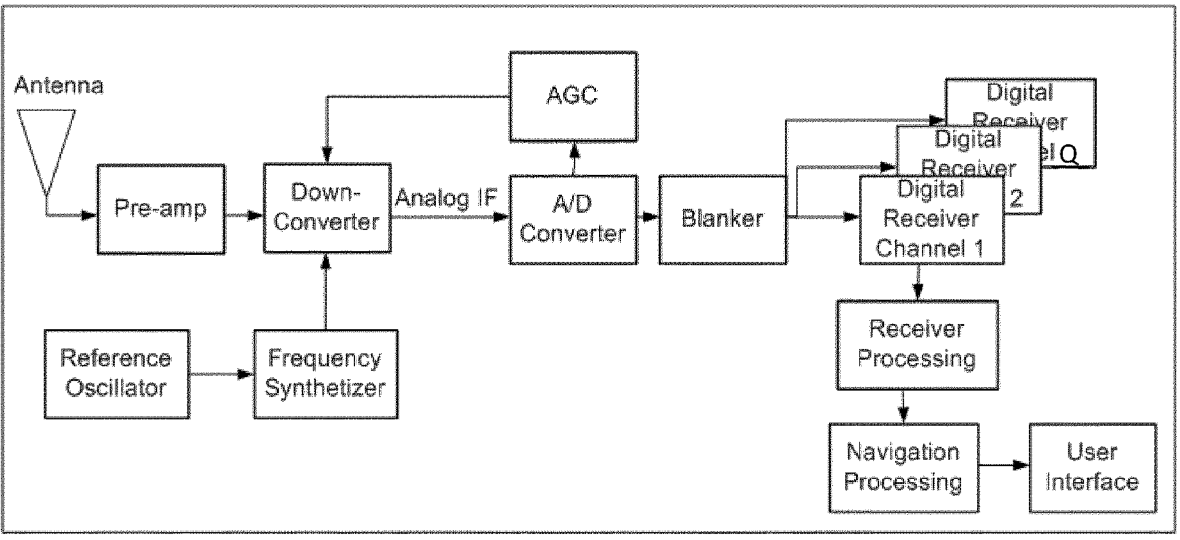
FIG. 3 represents the main functional blocks of a radio receiver used as part of a GNSS, together with the main processing steps.
Figure 4:
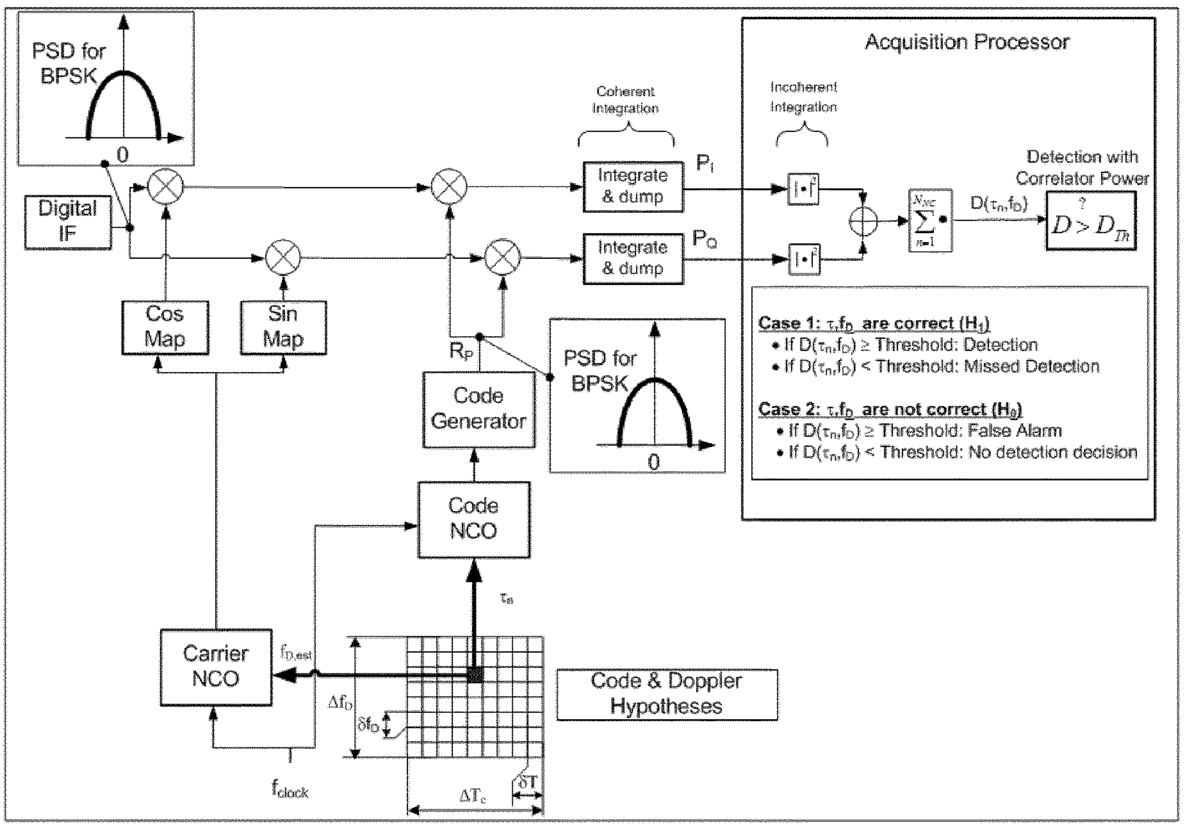
FIG. 4 represents the acquisition architecture with the functional blocks necessary to produce an acquisition detector, from a received signal comprising radio signal components.
Figure 5:
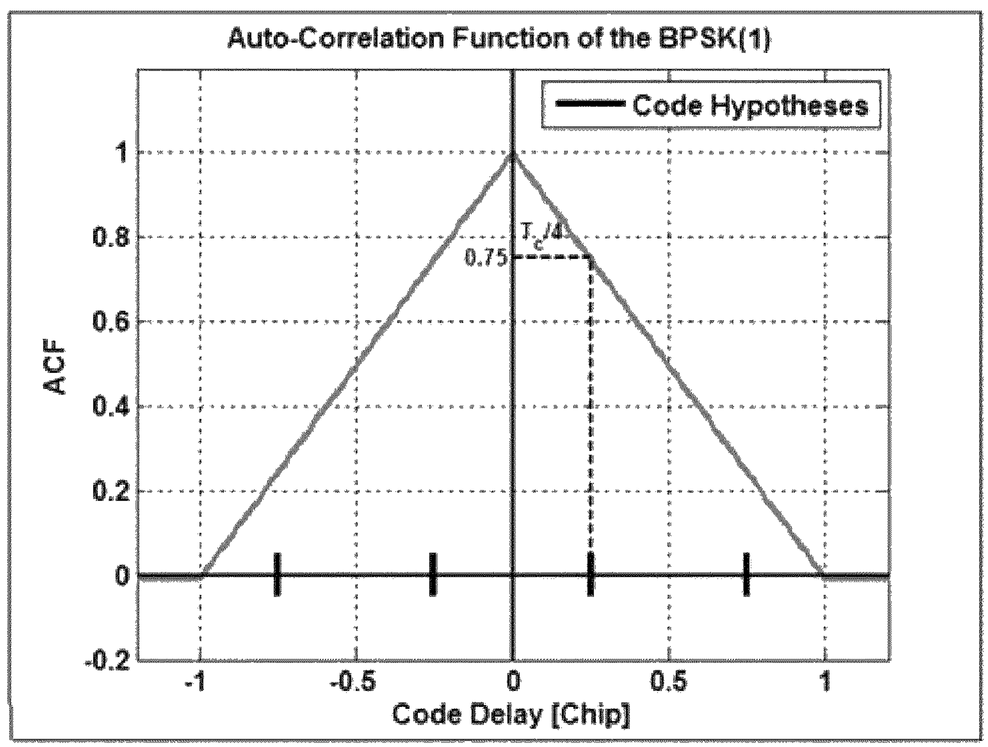
FIG. 5 represents the Auto-Correlation Function for an unfiltered BPSK(1) waveform, and which is used to detect the presence of a radio signal component of interest.
Figure 6:
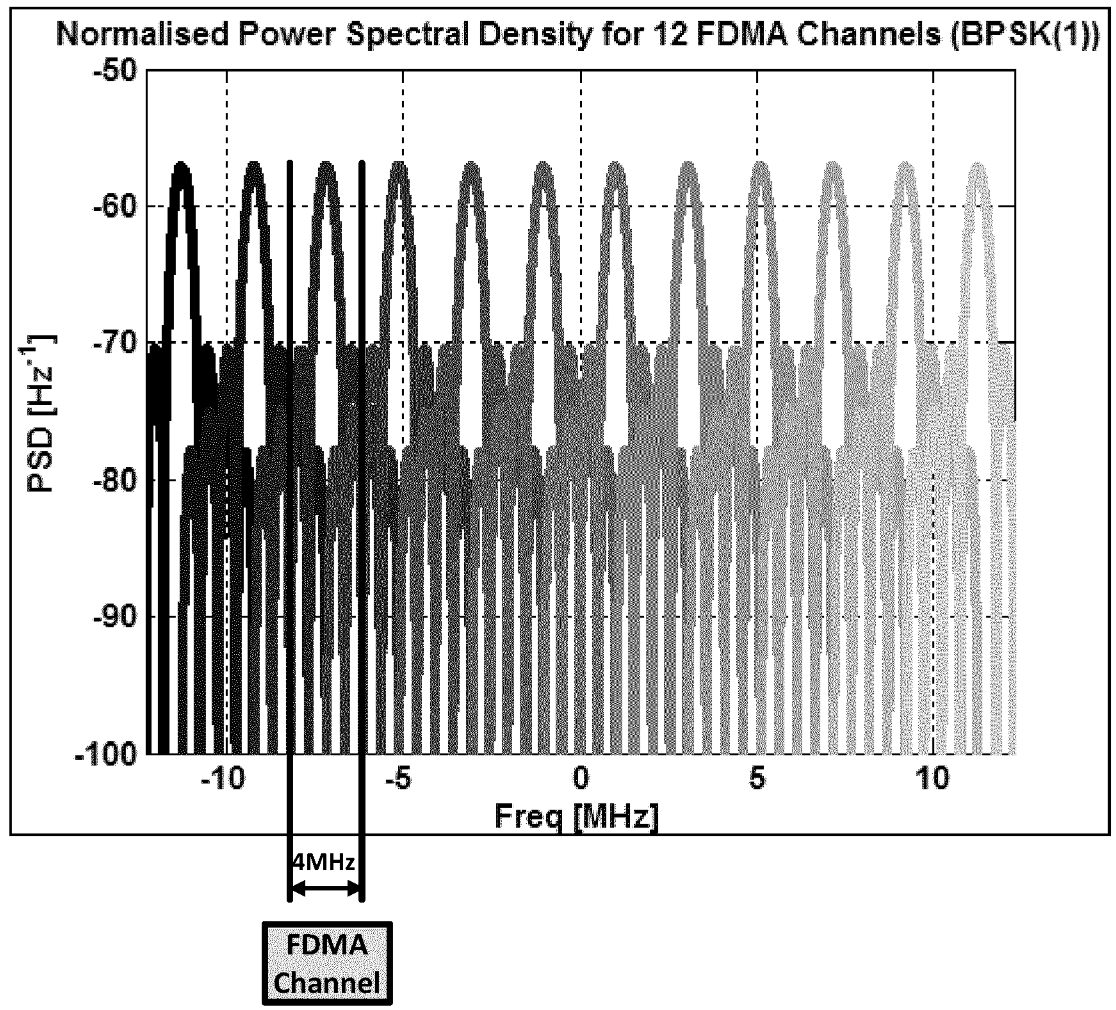
FIG. 6 represents one example of FDMA spectral allocation comprising Q=12 radio signal components, having each a FDMA channel of 4 MHz bandwidth.
Figure 30:
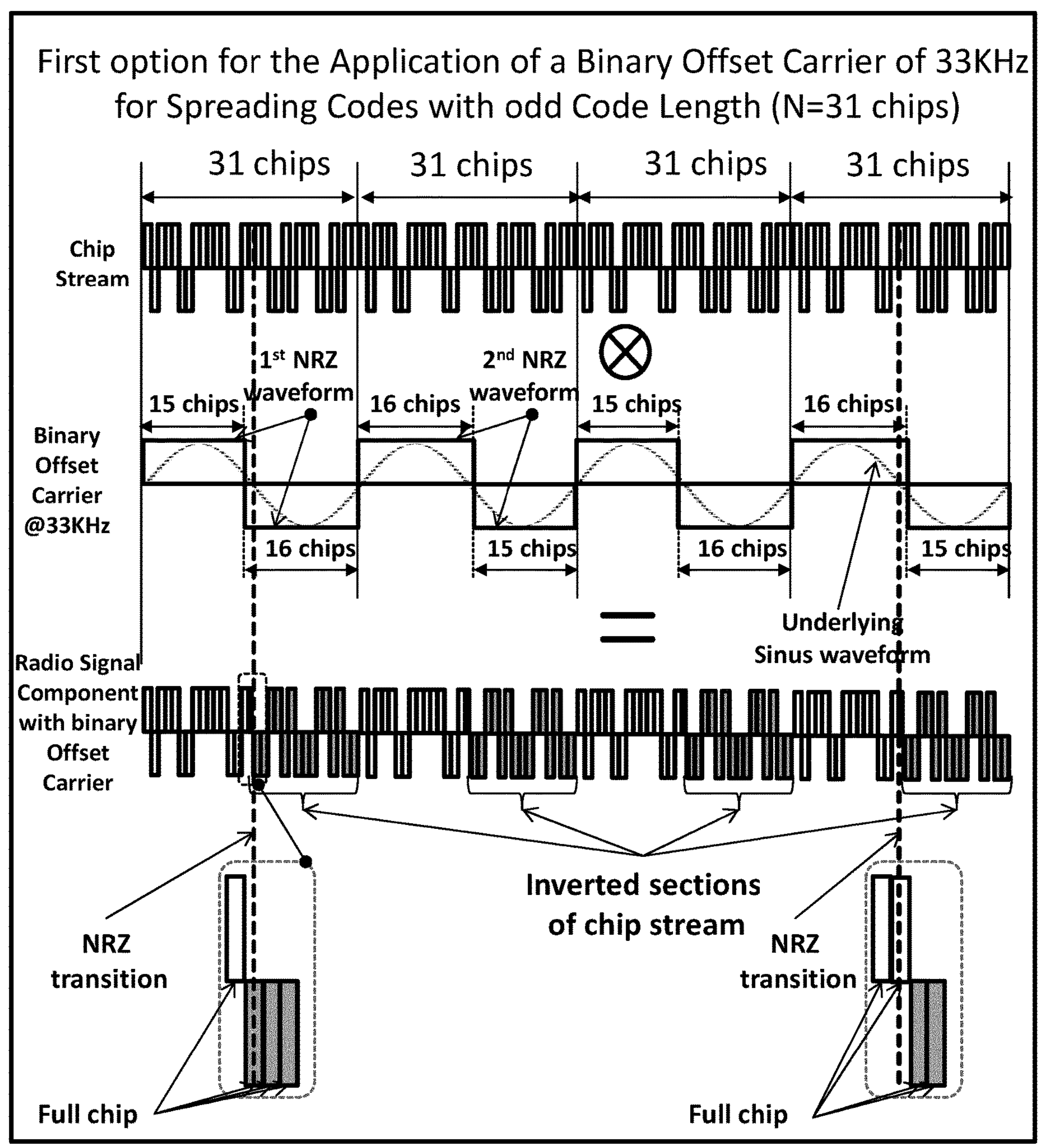
FIG. 30 represents an alternative implementation for the application of the frequency offset of 33 KHz, by modulating an asymmetric NRZ onto the spreading code having a length L=31 chips, and when the falling/rising edges of the asymmetric NRZ correspond to the edges of the spreading code.

A second implementation option, shown on FIG. 30, consists to apply a modified NRZ waveform, made of two NRZ sub-waveforms. For the first NRZ sub-waveform, the plateau with positive polarity is shorter with one chip than the plateau with negative polarity. For the second NRZ sub-waveform, the plateau with positive polarity is larger with one chip than the plateau with negative polarity. Both NRZ sub-waveforms are then concatenated to form the modified NRZ waveform which is repeated over the whole radio signal component generation. This construction yields to an NRZ waveform with uneven or asymmetric plateaus. The advantage of delaying (resp. lagging) the falling edge of the transition of the first (resp. second) NRZ sub-waveform is to exactly fit to the falling (resp. rising) edge of the transition for the chip that was split into two pieces as shown on FIG. 30. Due to alternation of the two NRZ sub-waveforms, the exact frequency offset will be achieved, on average, based on this modified Binary Offset Carrier scheme. It is noted that uneven NRZ plateaus might however include some additional harmonics or spurious at the output of the (digital) generations, but those harmonics are expected to be filtered out in the generic block "Amplification and Filtering" shown on FIG. 2.

Figure 31:
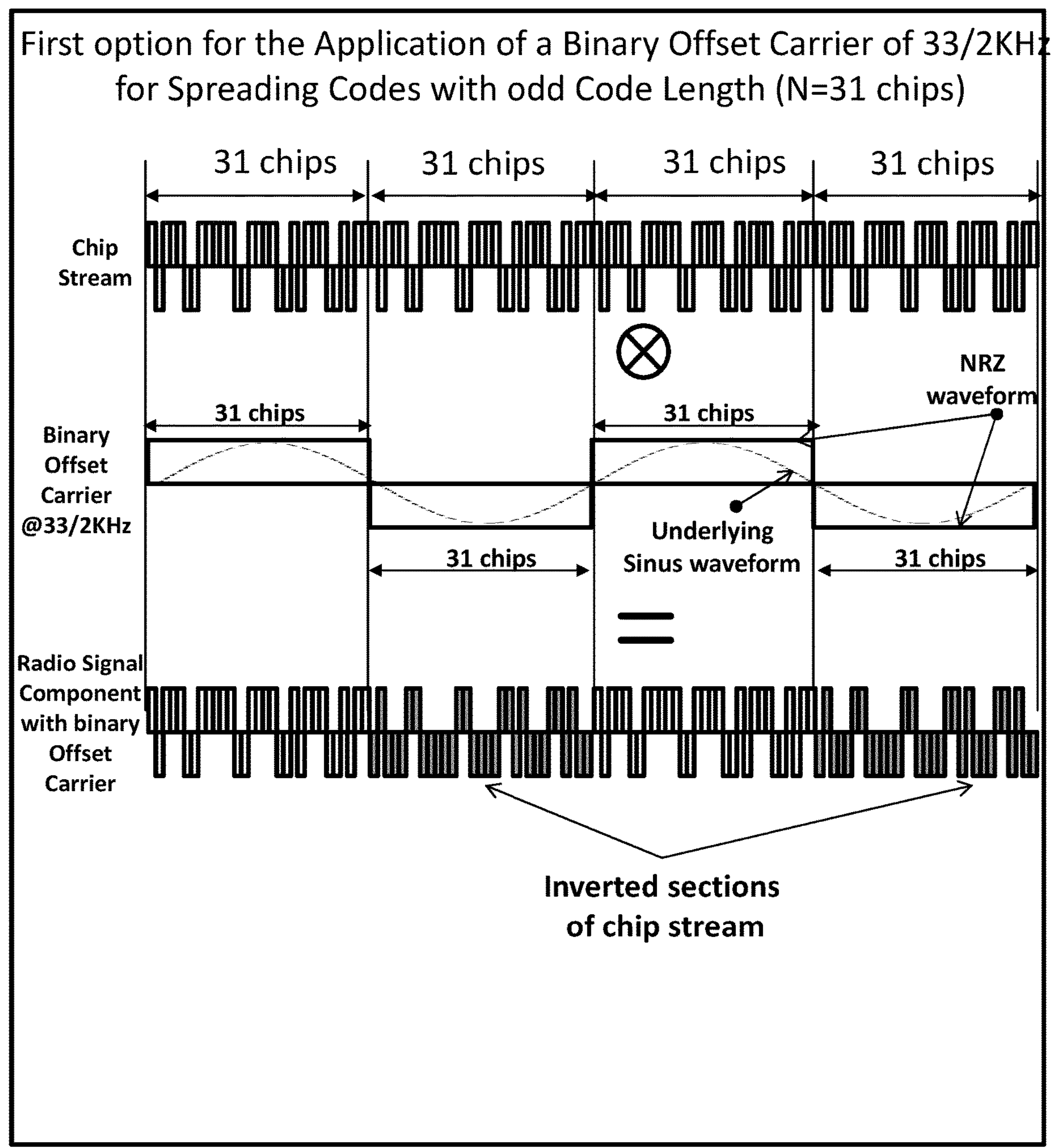
FIG. 31 represents the implementation for the application of the frequency offset of 33/2 KHz, by modulating a symmetric NRZ onto the spreading code having a length L=31 chips, and when the falling edges of the NRZ falls coincides with edge of one chip of the spreading code.

FIG. 31 represents the situation when $\Delta f_{carr,p}$ is set equal to the inverse of spreading code period, $\Delta f_{carr,p}=f_c/(2L)$=16.5 KHz. In that case η=1. Following the same representation as FIG. 31, it can now be observed that one (quantized) sinusoid waveform exactly fits to one spreading code period. In that case a simple multiplication is sufficient and the transitions of the NRZ waveform inscribed into the sinusoid waveform exactly correspond to the chip edges of the spreading code.

Figure 32:
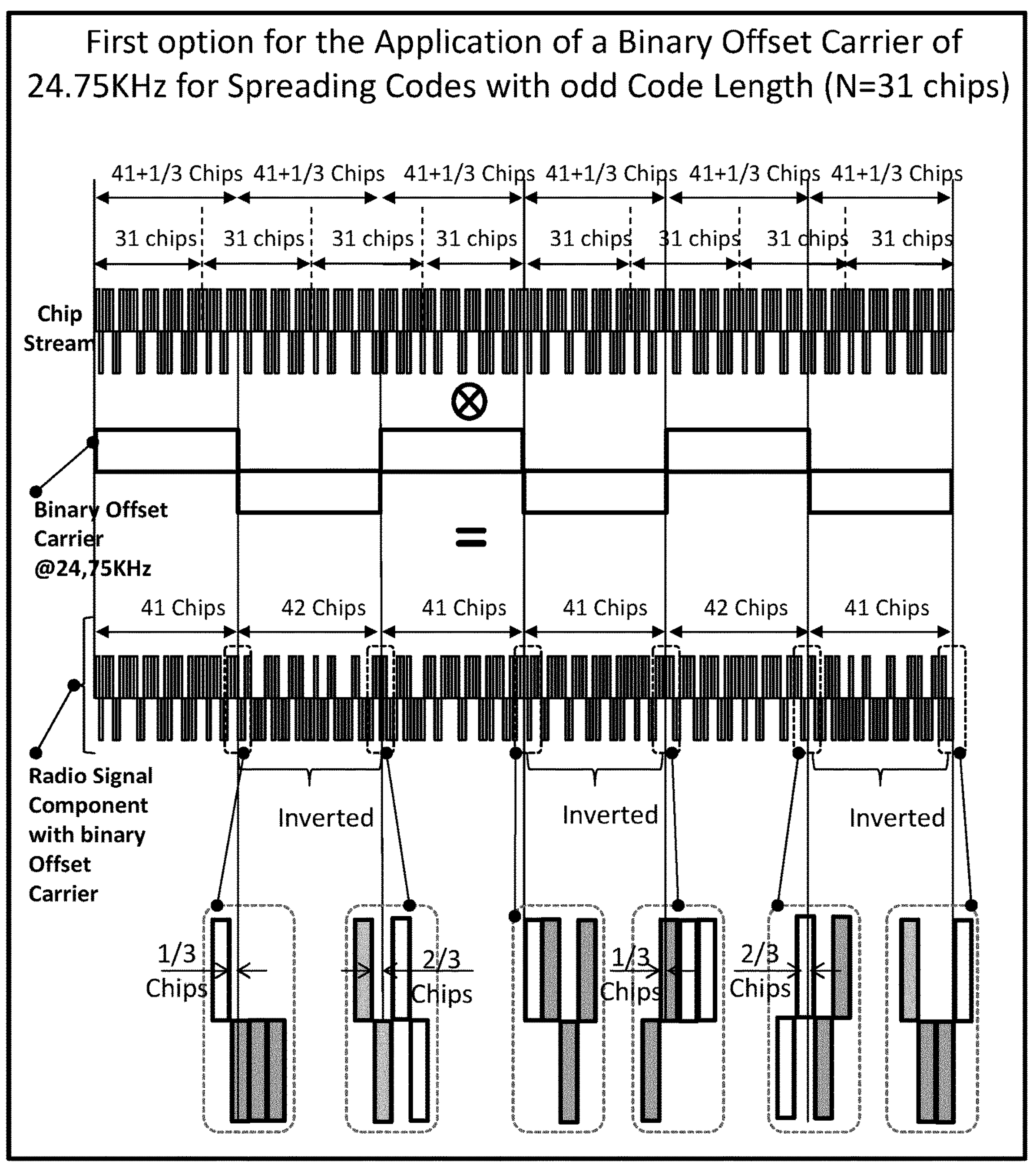
FIG. 32 represents the implementation for the application of the frequency offset of 24.75 KHz, by modulating a asymmetric NRZ onto the spreading code having a length L=31 chips, and when the falling/rising edges of the asymmetric NRZ correspond to the edges of the spreading code.
Figures 33A, 33B:
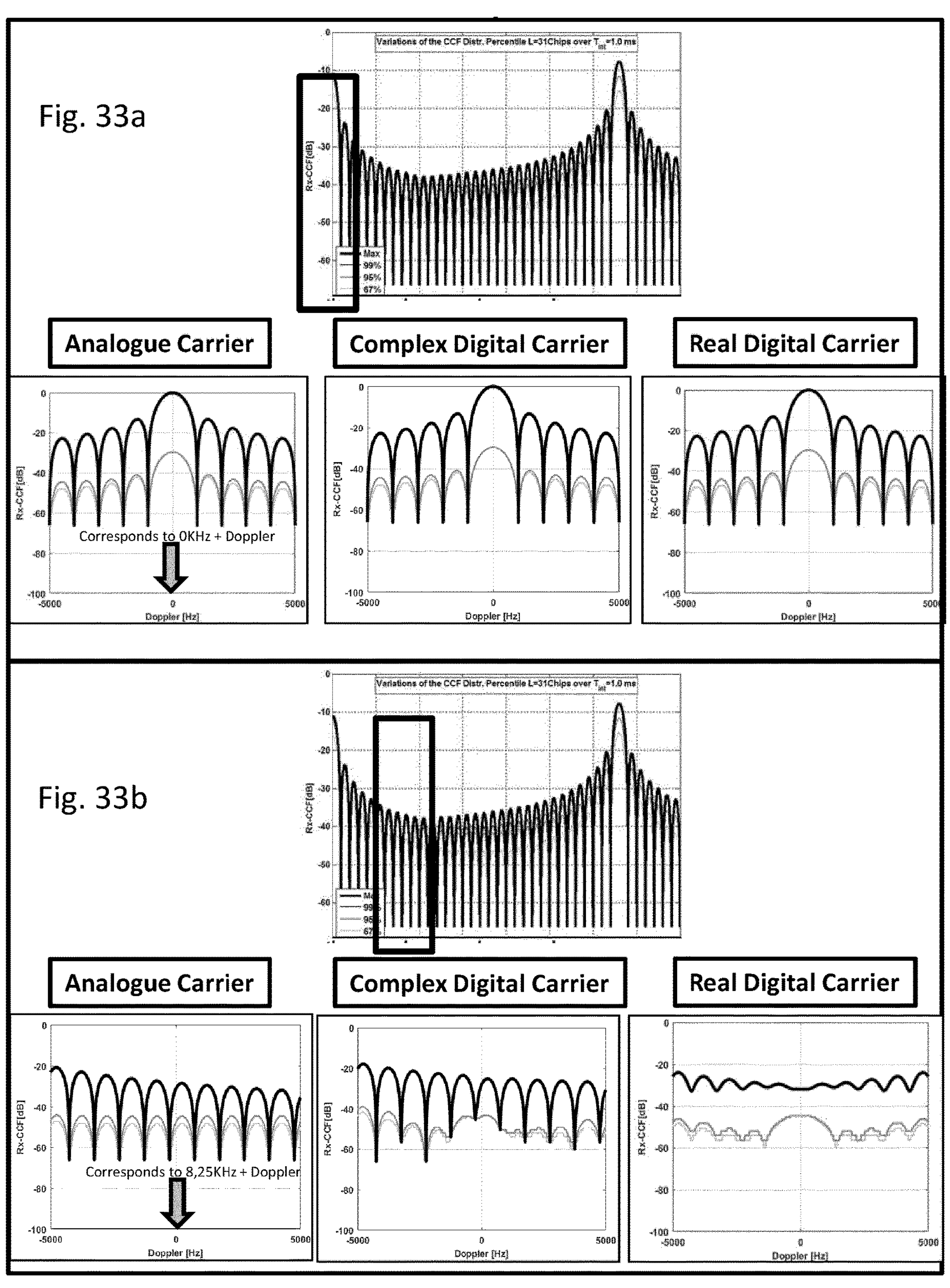
FIG. 33*a* and FIG. 33*b* represent the Doppler variations of the percentiles for the distribution of the ACF and CCF when applying three different implementation options of a frequency offset of 0 KHz (ACF FIG. 33*a*), or of 8.25 KHz (CCF FIG. 33*b*).
Figure 35A:
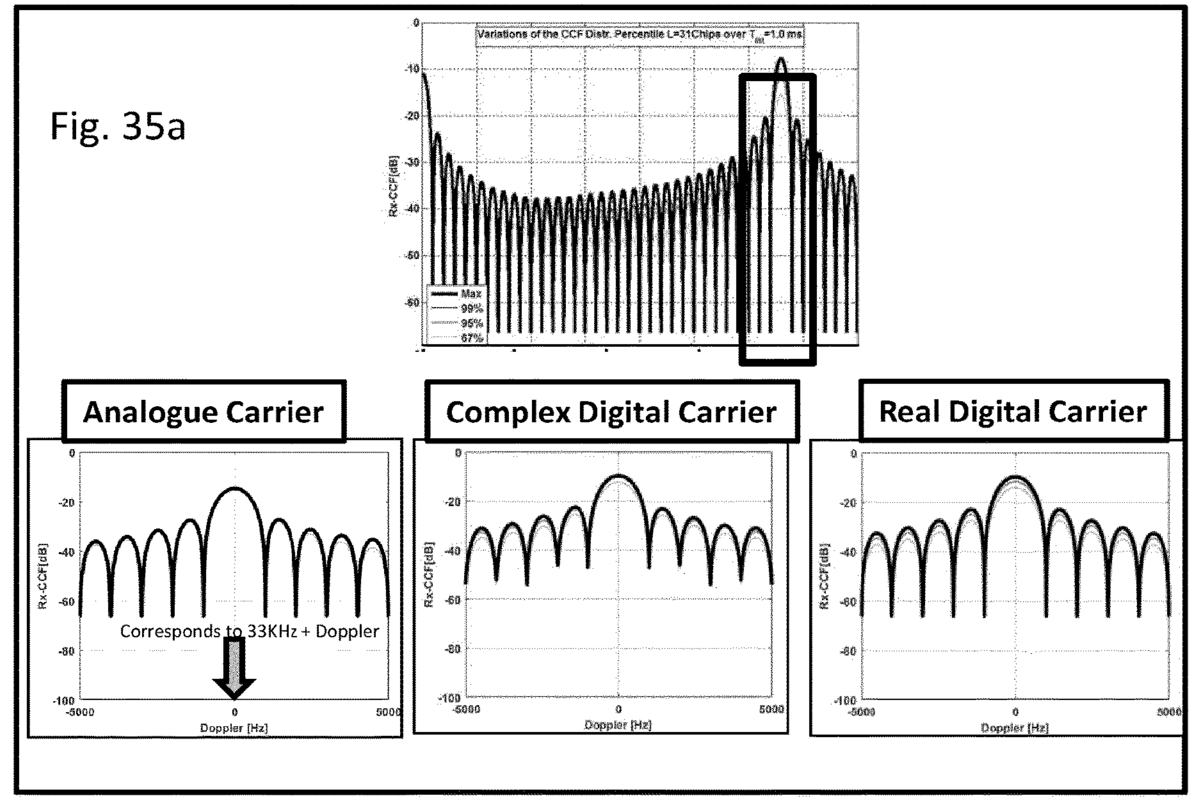
FIG. 35*a* represents the Doppler variations of the percentiles for the distribution of the CCF when applying three different implementation options of a frequency offset of 33 KHz (CCF FIG. 35*a*).

FIG. 32 represents a further example in the case when $\Delta f_{carr,p}=(3f_c/(4L))$=24.75 KHz, in which case η=⅔. In that case, it is shown that the minimal number of complete (quantized) sinusoid waveforms comprising an integer number of spreading code periods and ensuring a match of the (quantized) sinusoid waveform transition with the chip edge equals 3, corresponding to 8 complete spreading code periods. A similar construction to the one of FIG. 29 is proposed but now the chips falling into transitions of (quantized) sinusoid/NRZ waveform are cut at ⅓ or ⅔ of their duration, depending on the spreading code period they belong to, over the 8 complete spreading code periods. Then the multiplication of the initial spreading code stream composed of 8 complete spreading code periods with the (quantized) sinusoid/NRZ waveform corresponding to a frequency offset $\Delta f_{carr,p}$ is obtained by combining the corresponding spreading codes with "incomplete chip" on their edges, and with a change of polarity according to the NRZ symbol polarity.

Still for $$\eta = \frac{2}{3},$$

an alternative strategy, not shown on a figure, but similar to the one of FIG. 30 consists to avoid cutting the chips at their ⅓ or ⅔ of chip duration, when they are located at the quantized sinusoid/NRZ waveform transition, by generating and concatenating two other spreading codes obtained from the initial spreading code constituted of 31 chips, and having either 41, or 42 chips. These sequences would change polarity according to the (quantized) sinusoid/NRZ waveform, and with a sequencing ensuring on average the exact frequency offset, $\Delta f_{carr,p}$.

The former figures and attached explanations can be used to extend the concept for other values of the ratio η.

FIG. 29, FIG. 30, FIG. 31 and FIG. 32 also show that the proposed CCDMA scheme having a frequency offset smaller or much smaller than the chip rate (few KHz in the proposed examples for the embodiment of the present invention, compared to typical chip rates expressed in MCps) enables to encompass several chips of the spreading code per plateau of the secondary NRZ code symbol, which in turn enables to implement in a simple way the frequency offset directly in the digital domain, for example by using a secondary NRZ code or a longer spreading code. This represents one differentiating enabler w.r.t. the FDMA schemes where the carrier offset between FDMA channels, is typically larger than the chip rate, and therefore obliges having several periods of the corresponding sinusoid, or cosinusoid oscillating at the FDMA carrier offset, per spreading code chip. This in turns does not enable to apply the proposed offset implementation through an NRZ secondary code or a longer spreading sequence.

Figures FIG. 29, FIG. 30, FIG. 31 and FIG. 32, and related descriptions, showed the implementation of a real one-bit quantized carrier offset (one-bit quantized sinus and/or cosinus), which could also be interpreted as the modulation of the spreading code with a secondary code constituted of an Non-Return to Zero (NRZ) code of (real) symbols, and especially when η is integer. The following paragraph describes now an alternative frequency offset applying means (11), further configured to apply to said data signal carrier of said radio signal a frequency offset ($\Delta f_{carr,p}$, $1 \le p \le P$), relative to a central carrier frequency, ($f_{central}$) by modulating a secondary NRZ code of complex symbols onto the spreading code taking the role of a primary code. By including equation (2) into expression (27) yields the following equation:

$$u_p(t) = \sqrt{P_p^{Tx}}\, d_p(t) \sum_{m=-\infty}^{+\infty} c_{p,m} p(t - mT_c)[\text{sign}(\cos(2\pi\Delta f_{carr,p} + \varphi_{p,init})) + j\text{sign}(\sin(2\pi\Delta f_{carr,p} + \varphi_{p,init}))] \tag{30}$$

This former expression represents then an alternative interpretation of the multiplication with a 1-bit quantized sinus and cosinus. Here the generated signal can be obtained by applying a complex spreading code whose real and imaginary components are real spreading codes obtained by modulating the original spreading code with a first NRZ secondary code to obtain the real component and another NRZ secondary code in quadrature to the first one (as consequence of the 1-bit quantization of the sinus function) to obtain the imaginary component. Therefore, the descriptions provided for the Figures FIG. 29, FIG. 30, FIG. 31 and FIG. 32 applicable for a single stream of real spreading code modulated with an NRZ waveform, can be further used for each of the real and imaginary parts of the equation (30).

This paragraph describes now an alternative frequency offset applying means (11), further configured to apply to said data signal carrier of said radio signal, a frequency offset ($\Delta f_{carr,p}$, $1 \le p \le P$), relative to a central carrier frequency, ($f_{central}$) by modulating a longer spreading code obtained as combination of the secondary NRZ code of complex symbols a the spreading code. An alternative way to expression equation (30) is given by the following equation.

$$u_p(t) = \sqrt{P_p^{Tx}}\, d_p(t) \sum_{m=-\infty}^{+\infty} \left(c_{p,m}^I + jc_{p,m}^Q\right) p(t - mT_c) \tag{31}$$

Thus, another interpretation of the application of the complex one-bit quantized carrier offset yielding to another implementation, considers the chip stream obtained with the multiplication of the spreading code equivalent to a primary code, and the secondary code constituted of an NRZ symbols, as a longer spreading code comprising complex chips and whose period equals the least common multiple of the original spreading code period and the secondary code constituted of an NRZ complex symbols.

In a similar, way it is possible to interpreted equation (29) as a modulation with an extended or longer spreading code constituted of the original spreading code modulated with a secondary code constituted of NRZ real symbols (re-using construction described in (30)):

$$u_p(t) = \sqrt{P_p^{Tx}}\, d_p(t) \sum_{m=-\infty}^{+\infty} c_{p,m}^I p(t - mT_c)$$

It is thus possible to consider the product of the spreading code (eq. primary code) and the secondary code constituted of NRZ real symbols as a longer spreading code comprising real chip and whose period equals the least common multiple of the original spreading code period and the secondary code constituted of an NRZ real symbols.

It is reminded that the former alternative embodiments proposing the implementation of the carrier offset either with a secondary NRZ code comprising complex or real symbols or a longer spreading code, are the consequence of the application of a 1-bit quantizer, or equivalently the use of the sign(•) operator. If a multi-level quantizer is applied, the consequence is that a multi-level, quantized, sinusoid and or complex exponential waveform has to be modulated onto the symbols of the secondary code that is modulated onto the spreading code. Based on this modification, similar developments as the ones proposed for the 1-bit quantizer could then be proposed.

The former alternative implementations of the carrier offset applied for the generation of the transmitted signal component, can also be proposed directly in the implementation of the offset carrier wipe-off at reception. At reception side two main approaches are proposed to take into account the frequency offset applied to the radio signal component of interest. Their common objective is to suppress this offset to correlate with the spreading code delayed with the code delay hypothesis to be tested, and only modulated with Doppler hypothesis to be tested.

The first approach consists to include the frequency offset within the replica, and more precisely to add the frequency offset to the Doppler hypothesis to be tested. Herein, the equation (4) describing the operation of the correlation is then adapted by including the frequency offset corresponding to the signal component of interest within the argument of the exponential already containing the Doppler hypothesis to be tested:

$$r(\tau_{test,0}, \Delta f_{Dopp,test,0} + \varphi_{test,0}) = \frac{1}{T_{int}} \int_0^{T_{int}} s(t) \times g_0(t - \tau_{test,0}) e^{-j(2\pi(f_{Dopp,test,0} + \Delta f_{carr,0})t + \varphi_{test,0})} dt \tag{32}$$

With $g_0(t)$ representing the spreading code of length L, and corresponding to the signal component of interest:

$$g_0(t) = \sum_{m=-\infty}^{+\infty} c_{0,m} p(t - mT_c).$$

Hence, the said local replica, also called enhanced replica, is generated by multiplying said spreading code with a complex offset carrier ($e^{j(-2\pi\Delta f_{carr,0}t + \varphi_{test,0})}$) depending on said frequency offset. From this equation the enhanced replica accounting for the frequency offset can also be expressed as:

$$\begin{aligned} rep(\tau_{test,0}, \Delta f_{Dopp,test,0} + \varphi_{test,0}, \Delta f_{carr,0}) &= g_0(t - \tau_{test,0}) e^{j(-2\pi(f_{Dopp,test,0} + \Delta f_{carr,0})t + \varphi_{test,0})} = \\ & g_0(t - \tau_{test,0}) \times (\cos(2\pi(f_{Dopp,test,0} + \Delta f_{carr,0})t + \varphi_{test,0}) - \\ & j\sin(2\pi(f_{Dopp,test,0} + \Delta f_{carr,0})t + \varphi_{test,0})) \end{aligned} \tag{33}$$

Alternative options can be proposed to generate the enhanced replica, in a similar way to the options proposed for the generation of the transmitted signal component. The first one consists in applying the real part of the enhanced replica, which consists in generating the local replica with a real offset carrier ($\cos(2\pi(f_{Dopp,test,0} + \Delta f_{carr,0})t + \varphi_{test,0})$ depending on the frequency offset:

$$rep(\tau_{test,0}, \Delta f_{Dopp,test,0} + \varphi_{test,0}, \Delta f_{carr,0}) = g_0(t - \tau_{test,0}) \times (\cos(2\pi(f_{Dopp,test,0} + \Delta f_{carr,0})t + \varphi_{test,0}) \tag{34}$$

The second option consists in quantizing both cosinus and sinus terms appearing in the expression of the complex enhanced replica, or in quantizing only the real part of enhanced replica expression. In the general case, the $Quant_{Nq}(\bullet)$ operator can be used. In its simplest form the sign(•) operator corresponding to a one-bit quantization is applied. The following equation (35) represents such an implementation for generating said local replica by multiplying said spreading code with a quantized complex carrier depending on said frequency offset, and the following equation (36) represents such an implementation for generating said local replica by multiplying said spreading code with a quantized real carrier depending on said frequency offset.

$$\begin{aligned} rep(\tau_{test,0}, \Delta f_{Dopp,test,0} + \varphi_{test,0}, \Delta f_{carr,0}) &= g_0(t - \tau_{test,0}) \times (\text{sign}(\cos(2\pi(f_{Dopp,test,0} + \Delta f_{carr,0})t + \varphi_{test,0})) - \\ & j\,\text{sign}(\sin(2\pi(f_{Dopp,test,0} + \Delta f_{carr,0})t + \varphi_{test,0}))) \end{aligned} \tag{35}$$

$$rep(\tau_{test,0}, \Delta f_{Dopp,test,0} + \varphi_{test,0}, \Delta f_{carr,0}) = g_0(t - \tau_{test,0}) \times \text{sign}(\cos(2\pi(f_{Dopp,test,0} + \Delta f_{carr,0})t + \varphi_{test,0})) \tag{36}$$

A further alternative option to generate the enhanced replica consists to consider that the sign(•) operator applied to either the sinus or cosinus function yield to a NRZ secondary code of symbols which can be complex or real, which is then modulated onto the spreading code, in a similar way to the generation of the transmitted radio signal component. A further and alternative option to generate the enhanced replica consists to consider that the combination of the spreading sequence modulated with the aforementioned NRZ code yields to a longer spreading sequence. The following equation therefore represents the expression of the enhanced replica generated by modulating a secondary NRZ code of complex symbols depending on said frequency offset onto the spreading code, or generating a longer spreading code obtained by combining a secondary NRZ code of complex symbols depending on said frequency offset with said initial or original spreading code. Note that to obtain this expression, the expression for the spreading code $$g_0(t) = \sum_{m=-\infty}^{+\infty} c_{0,m} p(t - mT_c)$$

has been developed.

$$rep(\tau_{test,0}, \Delta f_{Dopp,test,0} + \varphi_{test,0}, \Delta f_{carr,0}) = \sum_{m=-\infty}^{+\infty} (c_{0,m}^I + jc_{0,m}^Q) p(t - mT_c) \tag{37}$$

The following equation represents similarly the expression of the enhanced replica generated by modulating a secondary NRZ code of real symbols depending on said frequency offset onto the spreading code, or generating a longer spreading code obtained by combining a secondary NRZ code of real symbols depending on said frequency offset with said initial or original spreading code.

$$rep(\tau_{test,0}, \Delta f_{Dopp,test,0} + \varphi_{test,0}, \Delta f_{carr,0}) = \sum_{m=-\infty}^{+\infty} (c_{0,m}^{I}) p(t - mT_c) \tag{38}$$

The second approach consists to wipe-off firstly the frequency offset corresponding to the radio signal component of interest from the received signal, as though an additional down-conversion to the base-band would apply. Here two options are identified.

The first option to implement this second approach consists in multiplying the received signal with a complex offset carrier depending on said frequency offset, which is equivalent to multiply with an exponential whose argument equals the frequency offset ($-2\pi\Delta_{carr,p}$):

$$s'(t) = s(t) \times e^{-j(2\pi\Delta f_{carr,0} t)} \tag{39}$$

Alternatively, it is proposed to apply this step of further wiping-off the frequency offset by multiplying said received signal with a real offset carrier depending on said frequency offset:

$$s'(t) = s(t) \times \cos(2\pi\Delta f_{carr,0} t) \text{ or } s(t) \times \sin(2\pi\Delta f_{carr,0} t) \tag{40}$$

A second option to implement the second approach, consists in multiplying the received signal with a quantized complex carrier or exponential obtained with the $\text{Quant}_{Nq}(\bullet)$ operator and depending on said frequency offset. In its simplest form this consists in multiplying the received signal with a one-bit quantized complex exponential:

$$s'(t) = s(t) \times (\text{sign}(\cos(2\pi\Delta f_{carr,0} t)) - j\text{sign}(\sin(2\pi\Delta f_{carr,0} t)) \tag{41}$$

As an alternative option, it is also proposed to multiply the received signal with a quantized real carrier, also obtained with the $\text{Quant}_{Nq}(\bullet)$ operator and depending on said frequency offset. In its simplest form this consists in multiplying with a real term corresponding to the one-bit quantization of the cosinus, or sinus term:

$$s'(t) = s(t) \times (\text{sign}(\cos(2\pi\Delta f_{carr,0} t))) \tag{42}$$

Following one of the former options for a further down-conversion step to base-band, the further down-converted received signal s'(t) is correlated with the local replica generated only with the code delay hypothesis to be tested and the Doppler hypothesis to be tested is calculate by the radio receiver, re-using equation (4).

$$r(\tau_{test,0}, \Delta f_{Dopp,test,0} + \varphi_{test,0}) = \frac{1}{T_{int}} \int_0^{T_{int}} s'(t) \times g_0(t - \tau_{test,0}) e^{-j(2\pi(f_{Dopp,test,0})t + \varphi_{test,0})} dt \tag{43}$$

In order to validate the proposed alternative methods used to implement at receiver side the corresponding frequency offset, it is proposed to represent on the FIG. 33*a*, FIG. 33*b*, FIG. 34*a*, FIG. 34*a* and FIG. 35*a*, the curves showing the maximum and highest percentiles of the distribution for the CCF as function of the (extended) interfering Doppler residual, for different frequency offsets of 0 KHz, 8.25 KHz, 16.5 KHz, 24.75 KHz and 33 KHz and for the following cases.

- Conventional application of the frequency offset with an exponential (as per equation (17)) at transmission and conventional wipe-off of the frequency offset by multiplying with an exponential, shown on the most left figure (also labeled "Analogue carrier").
- Conventional application of the frequency offset with exponential (as per equation (17)) at transmission and wipe-off of the frequency offset by multiplying with a 1-bit quantized complex exponential, shown on the central figure (also labeled "Complex Digital carrier").
- Application of the frequency offset with a 1-bit quantized complex exponential at transmission and wipe-off of the frequency offset by multiplying with a 1-bit quantized real sinusoid, shown on the right figure (also labeled "Real Digital carrier").

Note that for the frequency offsets for which η is not integer, the method consisting in applying NRZ with plateaus of different lengths has been applied.

It can be verified that no major degradations of the corresponding CCF isolation can be stated, and especially the curve showing the maximum (and which usually serve as envelope), has not increased. It is further outlined that this alternative way to implement the NRZ with plateaus of possible different widths, according to the carrier offset, and therefore the η value, does not degrades significantly the CCF isolation.

The former alternative descriptions of the embodiment of the present invention mainly described the methodology to design, assign and implement the frequency offsets for the different radio transmitters transmitting radio signal components, and to process the corresponding received radio signal components by a radio receiver with the objective to correlate the at least one radio signal component of interest comprised in the plurality of the received radio signal components. Once this step of correlation performed, the next steps necessary for the acquisition of the radio signal component of interest are similar to the ones described in the part for the back ground art. This concerns especially the generation of an acquisition detector based on the squared magnitude of the correlation function value calculated for a tested code delay and Doppler offset hypotheses. In order to improve acquisition performance the acquisition detector can be further enhanced by summing different squared magnitudes of correlation function values calculated for the same tested code delay and Doppler offset hypotheses. The corresponding acquisition detector is then compared to a detection threshold. As an alternative acquisition procedure, usually applied when different code delay and Doppler offset hypotheses tested simultaneously are available, the ratio between the largest and second largest values of the detection detectors computed over all sets of code delay and Doppler offset hypotheses are compared to another detection threshold. Those alternatives schemes for the decision regarding the correctness of the tested code delay and Doppler offset, based on detection thresholds set according to specified PFA and PMD levels are also described in the part for the back ground art.

In order to demonstrate the advantage of the proposed embodiment of the invention a criterion, C, has been set-up. This criterion is defined as following:

$$C = \frac{B[\text{Hz}] \times (L \times T_c)[s]}{Q \times F} = \frac{B[\text{Hz}] \times (L \times T_c)[s]}{P} \tag{44}$$

Where:

- B represents the bandwidth of the radio receiver, $R_x$, and expressed in [Hz]
- $L \times T_c$ represents the spreading code period, expressed in [s]
- Q represents the number of radio transmitters, or satellites, of the radio navigation service
- F represents the number of radio signal component transmitted per radio transmitter
- P represents the overall number of radio signal components comprised in the radio navigation system, and equals P=Q×F.

The following rationales are proposed to justify the criterion, C, applied for the embodiment of invention. First considering the spreading code length (expressed in chips) independently from the application appears quite arbitrary, as on a one side the spreading code length needs to be linked to the chip rate $f_c$ (for example the GPS L5 radio signal components have a spreading code length of 10230 chips for a chip rate of 10.23 MCps, while the GPS L1 C/A radio signal components have a spreading code length of 1023 chips for a chip rate of 1.023 MCps, so both yielding to the same spreading code period of 1 ms), and on the other side other terrestrial or non-terrestrial radio navigation systems might apply completely different spreading code lengths (also in relation to the chip rate), and still satisfy specified MAI and ranging performance requirement. The second important term at numerator is the radio receiver front-end bandwidth, B, expressed in Hz. The front-end bandwidth can be considered as an important criterion representative of the receiver complexity. Indeed, wider front-end bandwidths oblige using analogue or digital filters which might ask for larger implementation load. Further the sampling frequency is usually related, or proportional to the front-end bandwidth, according to the Nyquist theorem, implying thereof a larger power consumption of the radio receiver. Therefore by multiplying the radio receiver front-end bandwidth, B, expressed in unit of Hertz, with the spreading code period expressed in unit of seconds, the product becomes unitless, which creates a criterion "Agnostic" to the chip rate: an "Hypothetical" radio navigation system, based on a CDMA scheme, and using a spreading code length comprising 1023 chips transmitted at 1 KCps will require a radio receiver front-end bandwidth of minimum 2 KHz (width of the mainlobe for the BPSK(1) signal waveform), yielding to a product B [Hz]×($L \times T_c$) [s] equal to 2. This product value is identical to the case of the GPS C/A radio signal component with a spreading code length of 1023 chips, a Chip Rate of the 1 MCps and a radio receiver front-end Bandwidth of 2 MHz.

Generality speaking, the smaller the product B [Hz]×($L \times T_c$) [s], the better. Indeed having a lower bandwidth is beneficial for the complexity of the receiver, but this is also true for the spreading code length (as it requests less memory and less operations for the acquisition).

The denominator of the criterion, C, reflects the overall number of radio signal components transmitted by the radio navigation system, as it is the product of transmitters, Q, with the number, F, of radio signal components transmitted by each transmitter. This can also be interpreted as the system capacity of the radio navigation system. In order to justify the position of the overall number of radio signal components, P, at the denominator, the following explanation is given. Offering a larger capacity is to be considered as an advantageous feature of the radio navigation system, as the more transmitters, the larger the potential number of lines-of-sight that can be processed in order to improve positioning accuracy. Therefore, intuitively the system capacity shall be placed at denominator (the higher the capacity, the smaller the criterion, C and the better the overall performance). In the case of a CDMA scheme, it is however not possible to increase "indefinitely" the overall number of radio signal components else the Multiple-Access Interference between all radio signal components sharing the same frequency bandwidth would start being unacceptable. This is the reason why a second criterion defined by the specified cross-correlation isolation will help ensuring a reasonable number of radio signal components to level the MAI.

In order to justify of the proposed criterion, application will be made for the three main referenced use cases, with the GPS C/A radio signal component as a representative of the CDMA scheme, the GLONASS L1OCd radio signal component as a representative of the FDMA scheme, and finally the example taken from one embodiment of the present invention for the CDDMA scheme, when considering the same spreading code with a length of 31 chips. Furthermore, and in order to simplify the comparison, it is proposed to consider the same number of Q=24 satellites for all three radio satellite navigation systems (Q might extend to up to 6 or 8 additional operational satellites, according to the GPS or GLONASS system and cumulated number of satellites over the different launches and generations, but this excess will not fundamentally change the main quantitative outcomes of this comparison, as shown later). Finally, it is again highlighted that the outcomes for the proposed comparison exercise applied to the aforementioned radio signal components from the GPS and GLONASS systems can be broaden to other radio signal components from the same systems, or from other systems such as the Galileo or COMPASS ones.

When considering the case of the GPS C/A radio signal component transmitted in the L1 frequency band, the minimal bandwidth of a GPS C/A receiver front-end is equal to 2.046 MHz, corresponding to the main lobe width of the PSD of BPSK(1) waveform of the GPS C/A radio signal component. Furthermore, the spreading code length equal 1023 chips transmitted at a 1 MCps, yielding to 1E−3s for the spreading code period (expressed in seconds). Finally, because each GPS satellite only transmits one GPS C/A Signal (F=1), and considering as baseline Q=24 GPS satellites yields, the following criterion: $C_{GPS}$=2.046E6 [Hz]×1E−3 [s]/24=85,25.

When considering the case of the GLONASS L1OCd radio signal component transmitted in the L1 frequency band, the minimal bandwidth of the receiver front-end is equal to 12 MHz. Indeed each L1OCd signal is modulated with a BPSK (0.511) waveform and therefore the minimal bandwidth per FDMA channel equals ~1 MHz. Furthermore, antipodal satellites use the same frequency channel. In conclusion, the overall bandwidth ensuring no overlap between FDMA channels equals 24×1 MHz/2=12 MHz. The GLONAS L1OCd signals apply a spreading code length of 511 chips, and a chip rate of 0.511 MCps, yielding a spreading code period of 1E−3s (same as for the GPS C/A signal). Finally, because each GLONASS Satellite only transmits one L1OCd Signal (F=1), and considering as baseline Q=24 GLONASS satellites yields the following criterion value: $C_{GLONASS}$=12E6 [Hz]×1E−3 [s]/24=511. Note that this value corresponding to spreading code length of the L1OCd signal can be retrieved parametrically: assuming two radio signal components per FDMA channel and transmitted by two antipodal satellites, further assuming FDMA channels having the smallest bandwidth $B_{FDMA}$ equals to main lobe of a BPSK PSD ($2f_c$), the criterion equals $C_{FDMA}=(P/2)\times B_{FDMA}\times L\times f_c/P=P\times(2\times f_c)\times L\times(1/f_c)/P=L$. It can be verified that the larger front-end bandwidth, as consequence of the FDMA scheme represents the main differentiator between the GPS and GLONASS cases, impacting the criterion C.

The final case corresponds to the embodiment of the present invention and proposing a CDDMA scheme, applying the same spreading sequence, for example an m-sequence, with a spreading code length of 31 chips, transmitted with a chip rate of 1 MCps, and yielding a spreading code period of ~30.30E−6s. Furthermore, the required bandwidth for this scheme equals 2.046 MHz+12×8.5 KHz=2,148E6 Hz. For this result, it is considered that the offset between CDDMA channels equal 8.5 KHz (corresponding to span, D, for the interfering residual Doppler typical of MEO satellite orbits and 1.5 KHz for the frequency isolation margin, $\Delta Dopp_{isol}$). Furthermore it is also considered that antipodal satellites use the same CDDMA channel. Based on those numbers, and still considering Q=24 satellites transmitting each a single radio signal component (F=1), yields $C_{CDDMA}$=2,148E6 [Hz]×30,30E−6 [s]/24=2,71. It is noted that if the possibility to reuse the same CDDMA channel for antipodal satellites was not applied, the criterion would barely increase with 2.84, as the occupied bandwidth would hardly increase (2.046 MHz+24×8.5 KHz=2,148E6 Hz).

The former comparison therefore highlights that the proposed embodiment of the present invention outperforms both GPS (CDMA) and GLONASS (FDMA) schemes based on the proposed criterion. Nevertheless, for a fair comparison the additional criterion for the cross-correlation isolation shall also be considered. Indeed for the Gold Code applied by the GPS C/A radio signal component the maximal cross-correlation value equals ~−22 dB, while this isolation reduces to ~−15 dB when considering the same spreading code (e.g. m-sequence) with a length of 31 chips, for the CDDMA example (see FIG. 27). Hence, for a fair comparison, a shorter spreading code length of ~300 chips shall be proposed for a set of Q different spreading codes applied for the CDMA scheme, sharing the same bandwidth of 2.046 MHz and offering approximately a −15 dB of isolation. For this second "hypothetical" radio navigation system using a CDMA scheme, the former criterion becomes $C_{CDMA}$=2.046E6 [Hz]×0,29E−3 [s]/24=25. This value if 25 is therefore proposed as a preferable value for the threshold for the criterion C, but another higher value of 50 could also be proposed as alternative value for the criterion, C. Indeed, it is pointed out that the specified criterion of 25 is based on configurations corresponding to existing GNSS systems, such as GPS (CDMA) and GLONASS (FDMA), but that the proposed criterion also depends on the applications and therefore navigation or communication service.

[Ref 9]: *"Resource Efficient Parallel Acquisition Architecture for Modernized GNSS Signals"*. J.Leclère. *ÉCOLE POLYTECHNIQUE FÉDÉRALE DE LAUSANNE. THÈSE NO* 6190 (2014).

[Ref 10]: *"Performance Analysis of Modernized GNSS Signals Acquisition"*. M. Foucras. *Thesis*. 2015. *Ecole Nationale d'Aviation Civile* (*ENAC*).

In order to demonstrate the benefit of reducing the spreading code length, in term of receiver complexity reduction, it is proposed to apply a well-known technique based on the exploitation of Fast Fourier Transform (FFT). One option of FFT-based acquisition enables to test simultaneously all code hypotheses of the code uncertainty region, as the spreading code periodicity enables to apply the circular property of the Fourier Transform, as shown equation (eq. 45). Here s represents a vector of samples for the received signal, while $s_{rep}$ represents a vector of samples for the replica spreading code. It is noted that before the FFT blocks, the multiplication with the exponential, $e^{-j2\pi T samp \Delta f Dopp}$ (shown on FIG. 36*a*), enables to wipe-off the tested Doppler. For the sake of demonstration, it is finally proposed to consider only one coherent integration (i.e. without further non-coherent summations). The same conclusions would hold for further non-coherent summations.

$$CCF(\tau)=IFFT(FFT(s_{Rep})\times conj(FFT(s)))\tau\in\{\text{Code Uncertainty}\} \quad \text{(eq. 45)}$$

Figure 36A:
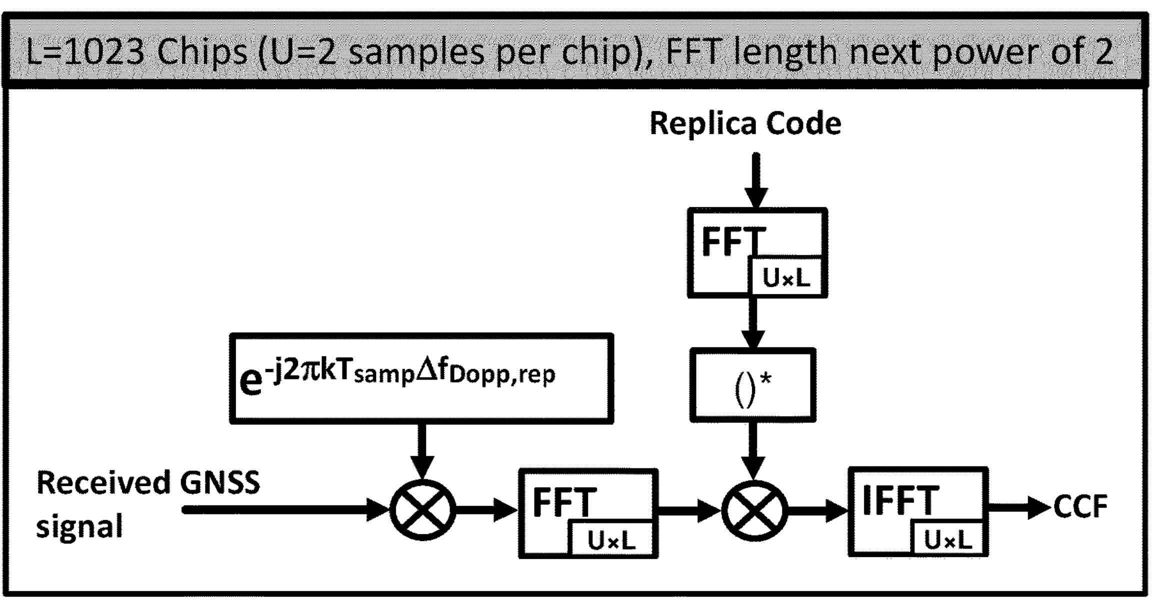
FIG. 36*a* and FIG. 36*b* represent respectively the implementation of a high-level model for an FFT-based acquisition architecture for a spreading code having a length L=1023 chips (FIG. 36*a*), and an adapted implementation of a high-level model for an FFT-based acquisition architecture for another spreading code having a shorter length L'=31 chips (FIG. 36*b*).
Figure 36B:
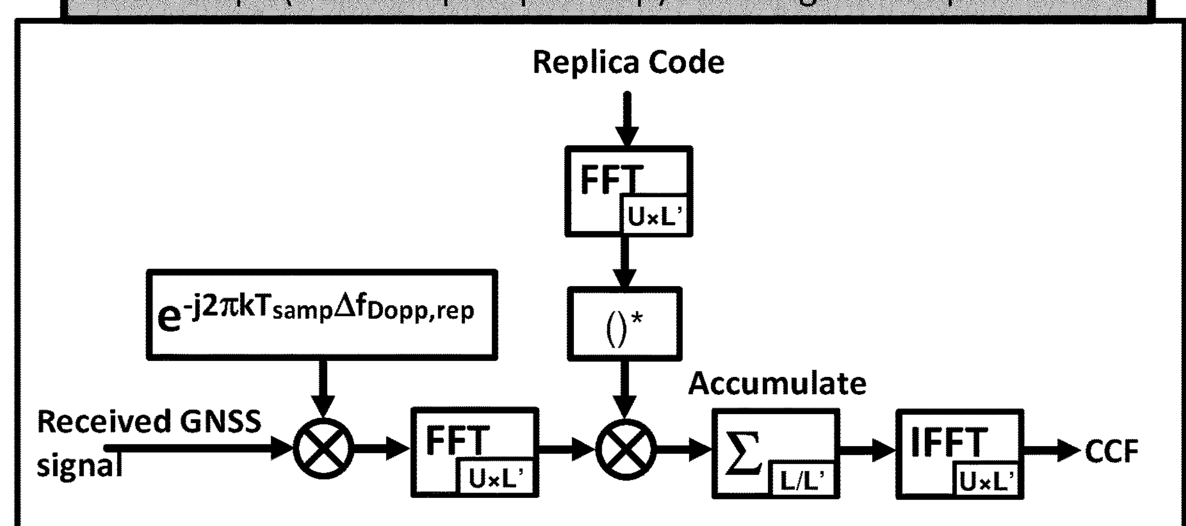

FIG. 36*a* represents one implementation of (eq. 45) when considering a code length L of 1023 chips, and with U=2 samples, per chip yielding to $N_s$=L×U=2046 samples or equivalently code hypotheses. FIG. 36*b* now represents the corresponding implementation when applying shorter codes with length L'=31 chips. In that case, the 1023 chips can be considered as 33 concatenations of the same spreading sequence of 31 chips. Therefore, the same cross-correlation function will be obtained by computing L'/L=33 times the product of FFT: FFT($s_{Rep}$)×conj(FFT(s')) where s' represents a new vector of $N'_s$=L'×U=62 samples for the received signal, and to accumulate (i.e. sum) those 33 FFT products, before applying the IFFT operation. In this process the FFT are calculated over 62 samples, again considering two samples per chip.

The use of 62-points FFT in place of 2046-points FFT has two main advantages. The first one is related to the memory usage, as the number of registers implemented in the DSP computing the FFT is (L×U)/(L'×U)=2046/62=33 times smaller. This significant memory reduction is even true despite the presence of an additional memory necessary for accumulation, which will marginally impact the overall memory needs. The second advantage concerns the number of operations necessary to compute the correlation function. At an high-level, the number of operations for an FFT is proportional to $\approx N_s\times\log_2 N_s$, yielding to a reduction $(N_s\times\log_2 N_s)/(N'_s\times\log_2 N'_s)\approx 61$. This semi-quantitative explanation does not pretend covering in details how this principle can be reflected into each of the many different implementations of FFT-based acquisition. A non-exhaustive list of such implementation covers for example, the Discrete Fourier Transform (DFT), which is calculated with a number of points, usually power of 2 and applying the related Radix 2, Radix 4, Split Radix algorithms, or other techniques based on Finite Impulse Response (FIR) schemes, as presented in [Ref 9]. However, the general principle according to which it is preferable to compute and combine many FFT calculated for short vector rather than a single FFT calculated for a large vector ([Ref 10]) is respected when considering short or very short codes. Short codes represent then an enabler for the application of this general principle. This advantage propagates into a relaxation of the hardware complexity remains.

The description of the proposed solution, which was provided beforehand often referred to satellite transmitters for transmitting radio (navigation) signals components as part of a Global Navigation Satellite System (GNSS) whose space segment comprises Medium Earth Orbit (MEO) satellites. Illustrations and quantitative examples for the implementation of the proposed solution have been provided for such GNSS-MEO satellites. Nevertheless, it is already emphasized, that the proposed solution is not restricted to this type of MEO platforms, but can also be applied to other types of space-based platforms, such as Low Earth Orbit (LEO) or Geostationary Earth Orbit (GEO) satellites or any alternative near-earth platforms such as High Altitude Platform Stations (HAPS), Balloon, or Drones, as part of a radio navigation system. This solution can even be proposed for terrestrial "static" platforms such as terrestrial Navigation Beacons, also called Pseudo-satellites or Pseudolites.

This solution can also be made applicable for radio communication systems where MAI also represents a degrading effect to be overcome. Such radio communication systems can for example comprise spaceborne platforms such satellite communication networks with satellites at GEO, MEO or LEO orbits, but also near-earth platforms such as HAPS and drones, but also terrestrial platforms such as Base Transceiver Stations (BTS) used in general for terrestrial mobile network infrastructures, Fixed or Mobile radio Transmitter in case of a wireless communication network, or device implemented in a V2V or V2X communication network.

Therefore, even if the description and the corresponding preliminary quantitative performances, used for justifications, are mainly based on GNSS, some aside statements can also be given when considering aforementioned and alternative types of platforms, or systems. For example, the generic signal generation chain presented on FIG. 2, and proposed for GNSS satellite can be re-used on-board of LEO, High Altitude Platform Systems (HAPS), or Drones. The main differences will be the dimension of the antenna, and possibly the range for the transmitted power of the corresponding navigation signals to be adapted for the resulting space losses (function of platform altitude) and to ensure a minimal and specified received power level on ground. This generic signal generation chain can be re-used for pseudolites, as well. Furthermore, for platforms ensuring a low or very low-dynamic between radio transmitters (as part of the communication or navigation systems) and the radio receiver, such as GEO satellite or terrestrial platforms, the corresponding span for the observed Doppler offset is expected to be smaller or much smaller, which will enable to reduce the frequency offsets implemented at each of the plurality of Q radio transmitters and therefore enable to increase the number of radio signal components, P, for the same levels of cross-correlation isolation.

Therefore the embodiments for the present invention described for Radio Navigation System context, can also be made applicable for Radio Communication Systems wherever the trade-off between transmitter and receiver bandwidth and complexity on a one side, and MAI performance one the other side has to be solved, in order to acquire radio signal components of a radio communication system.

The invention claimed is:

1. A method for acquisition of at least one radio signal component of interest of a plurality of radio signal components ($S_1, \ldots S_P$), at a radio receiver ($R_x$), each radio signal component of said plurality of radio signal components ($S_1 \ldots S_P$) being transmitted by a respective radio transmitter of a plurality of radio transmitters ($T_{X1} \ldots T_{XQ}$) of a radio navigation system, each radio signal component of said plurality of radio signal components ($S_1 \ldots S_P$) comprising a data signal carrier, for carrying a data signal component of said radio signal component, said data signal component comprising a spreading code, said spreading code comprising a predetermined number of chips (L), each chip of said spreading code having a duration ($T_c$) said method comprising the steps of:

applying by each of said radio transmitters ($T_{X1}, \ldots, T_{XQ}$), before transmission of each radio signal component, a frequency offset, ($\Delta f_{carr,p}$, $1 \le p \le P$) relative to a central carrier frequency ($f_{central}$), to said data signal carrier of said radio signal component to obtain a data signal carrier having a data signal carrier frequency ($f_{car,p} = f_{central} + \Delta f_{carr,p}$) with a frequency offset ($\Delta f_{carr,p}$, $1 \le p \le P$) said frequency offset corresponding to said radio signal component of a plurality of radio signal components; and transmitting, by a radio transmitter of said plurality of radio transmitters ($T_{X1}, \ldots, T_{XQ}$), at least one radio signal component, each radio signal component comprising a data signal carrier carrying a data signal component modulated onto said data signal carrier; and receiving, by said radio receiver ($R_x$), having an oscillator with stability ($D_{oscil,Rx}$), and having a velocity ($V_{TRX1} \ldots V_{TRXQ}$) relative to each radio transmitter of said plurality of radio transmitters ($T_{X1} \ldots T_{XQ}$), said plurality of radio signal components ($S_1 \ldots S_P$), each radio signal component having an observed Doppler offset ($D_{TRX1}, \ldots, D_{TRXP}$) depending on said velocity of said radio receiver ($R_x$) relative to said corresponding radio transmitters and on said data signal carrier frequency of said data signal carrier corresponding to said respective radio signal component; and acquiring, by said radio receiver ($R_x$), having a receiver front-end bandwidth (B), said at least one radio signal component of interest comprising said data signal carrier carrying said data signal component, from said at least one radio signal component of said plurality of radio signal components ($S_1 \ldots S_P$) being transmitted by a respective radio transmitter ($T_{Xq}$) of a plurality of radio transmitters ($T_{X1} \ldots T_{XQ}$), by comparing a detection threshold with an acquisition detector, said acquisition detector is based on at least one correlation value obtained for a tested code and Doppler hypothesis among a set of code and Doppler hypotheses to be tested, said correlation value being generated by correlating over a coherent integration time ($T_{int}$), by said radio receiver ($R_x$), a received signal(s) comprising a plurality of the received radio signal components with a local replica of said data signal component comprising a spreading code corresponding to said signal component of interest, said correlation value comprising a combination of cross-correlation function values corresponding to the interfering radio signal components and one auto-correlation function value corresponding to the radio signal component of interest, wherein said predetermined number of chips (L) is such that the criterion calculated as the ratio between the product of the radio receiver front-end bandwidth (B) with the spreading code Length (L) and with the chip duration ($T_c$), and the overall number (P) of radio signal components of the radio navigation system, shall not exceed 25; and said frequency offset value being smaller than said chip rate of said spreading code; and said frequency offset value depends on a specified cross-correlation isolation applied to each of the said cross-correlation function values calculated for the interfering Doppler residual values computed as the difference between the tested Doppler hypothesis, also accounting for said receiver oscillator stability, ($D_{oscil,Rx}$), and said observed Doppler offset ($D_{TRX1}, \ldots, D_{TRXP}$) for each of the said interfering radio signal components of said plurality of radio signal components, extended with the frequency offset corresponding to said interfering radio signal components.

2. The method for acquisition of at least one radio signal component of interest according to claim 1, wherein said method comprises the step of correlating said received signal(s) comprising said plurality of the received radio signal components, with a local replica comprising said spreading code and also said frequency offset ($\Delta f_{carr,p}$, $1 \le p \le P$) both corresponding to said signal component of interest.

3. The method for acquisition of at least one radio signal component of interest according to claim 1, wherein said method further comprises the step of:

wiping-off, by said radio receiver ($R_x$), said respective frequency offset corresponding to said signal component of interest ($\Delta f_{carr,p}$, $1 \le p \le P$) from the received signal(s) comprising said plurality of the received radio signal components; and said correlating said received signal(s) comprising said plurality of the received radio signal components and wherefrom said respective frequency offset ($\Delta f_{carr,p}$, $1 \le p \le P$) is wiped-off, with a local replica of said data signal component comprising a spreading code corresponding to said signal component of interest.

4. The method for acquisition of at least one radio signal component according to claim 1, wherein said spreading code is modulated with symbols, each symbol having a duration ($T_s$), implicating that the coherent integration time ($T_{int}$) used to compute said cross-correlation function values may be limited by said symbol duration ($T_s$).

5. A radio transmitter ($T_{xq}$), for use in a Radio navigation system comprising at least one radio receiver (Rx) and a plurality of radio transmitters ($T_{X1} \ldots T_{XQ}$), said radio system being configured for acquisition of at least one radio signal component of a plurality of radio signal components ($S_1 \ldots S_P$), at a radio receiver ($R_x$) of said radio navigation system, each radio signal component of said plurality of radio signal components ($S_1 \ldots S_P$) being transmitted by a respective radio transmitter of a plurality of radio transmitters ($T_{X1} \ldots T_{XQ}$) of said radio navigation system, each radio signal component of said plurality of radio signal components ($S_1 \ldots S_P$) comprising a data signal carrier, for carrying a data signal component of said radio signal component, said data signal component comprising a spreading code, said spreading code comprising a predetermined number of chips (L), each chip of said spreading code having a duration ($T_c$), said radio transmitter ($T_{xq}$) comprising:

a frequency offset applying means, configured to apply before transmission of each radio signal component, a frequency offset, ($\Delta f_{carr,p}$, $1 \le p \le P$) relative to a central carrier frequency ($f_{central}$), to said data signal carrier of said radio signal component to obtain a data signal carrier having a data signal carrier frequency ($f_{car,p} = f_{central} + \Delta f_{carr,p}$) with a frequency offset ($\Delta f_{carr,p}$, $1 \le p \le P$) said frequency offset corresponding to said radio signal component of a plurality of radio signal components; and a signal modulation means configured to modulate a data signal component comprising a spreading code onto said data signal carrier of said corresponding radio signal component having said frequency offset ($\Delta f_{carr,p}$, $1 \le p \le P$); and a transmission means, configured to transmit said at least one radio signal component, each radio signal component comprising a data signal carrier carrying a data signal component modulated onto said data signal carrier of said corresponding radio signal component, CHARACTERIZED IN THAT said predetermined number of chips (L) is such that the criterion calculated as the ratio between the product of a front-end bandwidth (B) of said radio receiver of said radio navigation system with the spreading code length (L) and with the chip duration ($T_c$), and the overall number (P) of radio signal components of the radio navigation system shall not exceed 25; and said frequency offset value being smaller than said chip rate of said spreading code; and said frequency offset value depends on a specified cross-correlation isolation applied to each of the said cross-correlation function values calculated for the interfering Doppler residual values computed as the difference between the tested Doppler hypothesis, also accounting for the oscillator stability ($D_{oscil,Rx}$) of said receiver of said radio navigation system, and said observed Doppler offset ($D_{TRX1}, \ldots, D_{TRXP}$) for each of the said interfering data signal components of said plurality of radio signal components, extended with the frequency offset corresponding to said interfering radio signal components.

6. The radio transmitter ($T_{xq}$) according to claim 5, wherein said modulation means is configured to modulate said spreading code with symbols, each symbol having a duration ($T_s$).

7. The radio transmitter ($T_{xq}$) according to claim 5, wherein said frequency offset applying means, further is configured to apply to said data signal carrier of said radio signal component, a frequency offset ($\Delta f_{carr,p}$, $1 \le p \le P$), relative to a central carrier frequency, ($f_{central}$), by multiplying with a complex or real offset carrier depending on said frequency offset.

8. The radio transmitter ($T_{xq}$) according to claim 5, wherein said frequency offset applying means, further is configured to apply to said data signal carrier of said radio signal component, a frequency offset ($\Delta f_{carr,p}$, $1 \le p \le P$), relative to a central carrier frequency, ($f_{central}$), by multiplying with a quantized complex or real offset carrier depending on said frequency offset.

9. The radio transmitter ($T_{xq}$) according to claim 5, wherein said frequency offset applying means, further is configured to apply to said data signal carrier of said radio signal component, a frequency offset ($\Delta f_{carr,p}$, $1 \le p \le P$), relative to a central carrier frequency, ($f_{central}$), by modulating a secondary NRZ code of complex or real symbols depending on said frequency offset onto said spreading code.

10. The radio transmitter ($T_{xq}$) according to claim 5, wherein said frequency offset applying means, further is configured to apply to said data signal carrier of said radio signal component, a frequency offset ($\Delta f_{carr,p}$, $1 \le p \le P$), relative to a central carrier frequency, ($f_{central}$), by modulating a longer spreading code obtained as combination of said secondary NRZ code of complex or real symbols depending on said frequency offset modulated with said spreading code.

11. A radio receiver ($R_x$), for use in a radio navigation system comprising said radio receiver (Rx) and a plurality of radio transmitters ($T_{X1} \ldots T_{XQ}$), said radio system being configured for acquisition of at least one radio signal component of interest of a plurality of radio signal components ($S_1 \ldots S_P$) at said radio receiver ($R_x$), each radio signal component of said plurality of radio signal components ($S_1 \ldots S_P$) being transmitted by a respective radio transmitter of a plurality of radio transmitters ($T_{X1} \ldots T_{XQ}$) of said radio navigation system, each radio signal component of said plurality of radio signal components ($S_1 \ldots S_P$) comprising a data signal carrier, ($D_{car,p}$), for carrying a data signal component of said radio signal component, said data signal component comprising a spreading code, said spreading code comprising a predetermined number of chips (L), each chip of said spreading code having a duration ($T_c$), said radio receiver ($R_x$) having an oscillator with stability, ($D_{oscil,Rx}$), and having a velocity ($V_{TRX1} \ldots V_{TRXQ}$) relative to each radio transmitter of said plurality of radio transmitters ($T_{X1} \ldots T_{XQ}$), said radio receiver ($R_x$) comprising:

a reception means (21) configured to receive, a plurality of radio signal components, each radio signal component having an observed Doppler offset depending on said velocity of said radio receiver ($R_x$) relative to said corresponding radio transmitters and on said data signal carrier frequency of said data signal carrier corresponding to said respective radio signal component; and a processing means, configured to acquire, having a receiver front-end bandwidth (B), said at least one radio signal component of interest comprising said data signal carrier carrying said data signal component, from said at least one radio signal component of said plurality of radio signal components ($S_1 \ldots S_P$), by comparing a detection threshold with an acquisition detector, said acquisition detector is based on at least one correlation value obtained for a tested code and Doppler hypothesis among a set of code and Doppler hypotheses to be tested, said correlation value being generated by correlating over a coherent integration time ($T_{int}$), a received signal(s) comprising said plurality of the received radio signal components with a local replica of said data signal component comprising a spreading code corresponding to said signal component of interest, said correlation value comprising a combination of cross-correlation function values corresponding to the interfering radio signal components and one auto-correlation function value corresponding to the radio signal component of interest, wherein said predetermined number of chips (L) is such that the criterion calculated as the ratio between the product of the radio receiver front-end bandwidth (B) of said radio receiver with the spreading code Length (L) and with the chip duration ($T_c$), and the overall number (P) of radio signal components of the radio navigation system, shall not exceed 25; and a frequency offset value, of a data signal carrier of said radio signal component, ($\Delta f_{carr,p}$, $1 \le p \le P$) being relative to a central carrier frequency ($f_{central}$), depends on a specified cross-correlation isolation applied to each of the said cross-correlation function values calculated for the interfering Doppler residual values computed as the difference between the tested Doppler hypothesis, also accounting for said receiver oscillator stability, ($D_{oscil,Rx}$), and said observed Doppler offset ($D_{TRX1}, \ldots, D_{TRXP}$) for each of the said interfering radio signal components of said plurality of radio signal components, extended with the frequency offset corresponding to said interfering radio signal components.

12. The radio receiver ($R_x$), for acquisition of at least one radio signal component of interest according to claim 11, wherein said processing means is configured to correlate said received signal(s) comprising said plurality of the received radio signal components, with a local replica comprising said spreading code and also said frequency offset ($\Delta f_{carr,p}$, $1 \le p \le P$) both corresponding to said signal component of interest.

13. The radio receiver ($R_x$), for acquisition of at least one radio signal component of interest according to claim 11, wherein said radio receiver ($R_x$), further comprises:

said processing means further is configured to wipe-off, said respective frequency offset corresponding to said signal component of interest ($\Delta f_{carr,p}$, $1 \le p \le P$) from the received signal(s) comprising said plurality of the received radio signal components; and said processing means further is configured to correlate said received signal(s) comprising said plurality of the received radio signal components and wherefrom said respective frequency offset ($\Delta f_{carr,p}$, $1 \le p \le P$) is wiped-off, with a local replica of said data signal component comprising a spreading code corresponding to said signal component of interest.

14. The radio receiver (Rx) according to claim 12, wherein said processing means is configured to generate said local replica by multiplying said spreading code with a complex or real offset carrier depending on said frequency offset.

15. The radio receiver (Rx) according to claim 12, wherein said processing means is configured to generate said local replica by multiplying said spreading code with a quantized complex or real offset carrier depending on said frequency offset.

16. The radio receiver (Rx) according to claim 12, wherein said processing means is configured to generate said local replica by modulating a secondary NRZ code of complex or real symbols depending on said frequency offset onto said spreading code.

17. The radio receiver (Rx) according to claim 12, wherein said processing means is configured to generate said local replica by generating a longer spreading code obtained by combining a secondary NRZ code of complex or real symbols depending on said frequency offset with said spreading code.

18. The radio receiver (Rx) according to claim 13, wherein said processing means is configured to wipe-off said frequency offset from said received signal(s) by multiplying said received signal(s) with a complex or real offset carrier depending on said frequency offset.

19. The radio receiver (Rx) according to claim 13, wherein said processing means is configured to wipe-off said frequency offset from said received signal(s) by multiplying said received signal(s) with a quantized complex or real offset carrier depending on said frequency offset.

20. A radio navigation system for acquisition of at least one radio signal component of a plurality of radio signal components ($S_1 \ldots S_P$), at a radio receiver ($R_x$) of said radio navigation system, each radio signal component of said plurality of radio signal components ($S_1 \ldots S_P$) being transmitted by a respective radio transmitter of a plurality of radio transmitters ($T_{X1} \ldots T_{XQ}$) of said radio navigation system, each radio signal component of said plurality of radio signal components ($S_1 \ldots S_P$) comprising a data signal carrier, for carrying a data signal component of said radio signal component, said data signal component comprising a spreading code, said spreading code comprising a predetermined number of chips (L), each chip of said spreading code having a duration ($T_c$) CHARACTERISED IN THAT said radio navigation system comprises at least one radio transmitter ($T_{Xq}$) for use in a Radio navigation system comprising at least one radio receiver (Rx) and a plurality of radio transmitters ($T_{X1} \ldots T_{XQ}$), said radio system being configured for acquisition of at least one radio signal component of a plurality of radio signal components ($S_1 \ldots S_P$), at a radio receiver ($R_x$) of said radio navigation system, each radio signal component of said plurality of radio signal components ($S_1 \ldots S_P$) being transmitted by a respective radio transmitter of a plurality of radio transmitters ($T_{X1} \ldots T_{XQ}$) of said radio navigation system, each radio signal component of said plurality of radio signal components ($S_1 \ldots S_P$) comprising a data signal carrier, for carrying a data signal component of said radio signal component, said data signal component comprising a spreading code, said spreading code comprising a predetermined number of chips (L), each chip of said spreading code having a duration ($T_c$), said radio transmitter ($T_{xq}$) comprising:

a frequency offset applying means, configured to apply before transmission of each radio signal component, a frequency offset, ($\Delta f_{carr,p}$, $1 \le p \le P$) relative to a central carrier frequency ($f_{central}$), to said data signal carrier of said radio signal component to obtain a data signal carrier having a data signal carrier frequency ($f_{car,p} = f_{central} + \Delta f_{carr,p}$) with a frequency offset ($\Delta f_{carr,p}$, $1 \le p \le P$) said frequency offset corresponding to said radio signal component of a plurality of radio signal components; and a signal modulation means configured to modulate a data signal component comprising a spreading code onto said data signal carrier of said corresponding radio signal component having said frequency offset ($\Delta f_{carr,p}$, $1 \le p \le P$); and a transmission means, configured to transmit said at least one radio signal component, each radio signal component comprising a data signal carrier carrying a data signal component modulated onto said data signal carrier of said corresponding radio signal component, CHARACTERIZED IN THAT said predetermined number of chips (L) is such that the criterion calculated as the ratio between the product of a front-end bandwidth (B) of said radio receiver of said radio navigation system with the spreading code length (L) and with the chip duration ($T_c$), and the overall number (P) of radio signal components of the radio navigation system shall not exceed 25; and said frequency offset value being smaller than said chip rate of said spreading code; and said frequency offset value depends on a specified cross-correlation isolation applied to each of the said cross-correlation function values calculated for the interfering Doppler residual values computed as the difference between the tested Doppler hypothesis, also accounting for the oscillator stability ($D_{oscil,Rx}$) of said receiver of said radio navigation system, and said observed Doppler offset ($D_{TRX1}, \ldots, D_{TRXP}$) for each of the said interfering data signal components of said plurality of radio signal components, extended with the frequency offset corresponding to said interfering radio signal components, and said radio navigation system further comprises:

said radio receiver (Rx) according to claim 11.

* * * * *